(12) United States Patent
Kuriki et al.

(10) Patent No.: US 12,395,944 B2
(45) Date of Patent: Aug. 19, 2025

(54) COMMUNICATION CONTROL DEVICE AND COMMUNICATION CONTROL METHOD

(71) Applicant: SONY GROUP CORPORATION, Tokyo (JP)

(72) Inventors: Hiroto Kuriki, Tokyo (JP); Ryota Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 308 days.

(21) Appl. No.: 18/005,180

(22) PCT Filed: Jul. 13, 2021

(86) PCT No.: PCT/JP2021/026337
§ 371 (c)(1),
(2) Date: Jan. 11, 2023

(87) PCT Pub. No.: WO2022/019180
PCT Pub. Date: Jan. 27, 2022

(65) Prior Publication Data
US 2023/0262611 A1   Aug. 17, 2023

(30) Foreign Application Priority Data
Jul. 21, 2020   (JP) .................. 2020-124607

(51) Int. Cl.
*H04W 52/30* (2009.01)
*H04W 16/14* (2009.01)

(52) U.S. Cl.
CPC ........... *H04W 52/30* (2013.01); *H04W 16/14* (2013.01)

(58) Field of Classification Search
CPC ................................................. H04B 17/345
See application file for complete search history.

(56) References Cited

U.S. PATENT DOCUMENTS 8,374,080 B2 * 2/2013 Chu ................ H04W 72/52
370/254
10,333,301 B2 * 6/2019 Gubba Ravikumar ............
H02J 13/0004
(Continued)

FOREIGN PATENT DOCUMENTS

EP   3849229 A1   7/2021
EP   3952385 A1   2/2022
(Continued)

OTHER PUBLICATIONS

International Search Report and Written Opinion of PCT Application No. PCT/JP2021/026337, issued on Sep. 21, 2021, 09 pages of ISRWO.
(Continued)

*Primary Examiner* — Dominic E Rego
(74) *Attorney, Agent, or Firm* — CHIP LAW GROUP

(57) ABSTRACT

A communication control device according to one embodiment of the present disclosure includes: a setting unit that sets a plurality of protection points in the protective space that protects a first radio system from a second radio system that performs shared use of the radio wave used by the first radio system; a determination unit that determines the target protection point to be the calculation target of the interference power received from the second radio system based on the plurality of protection points set by the setting unit; an interference power calculation unit that calculates the representative value of the interference power based on the interference power calculated for the target protection point determined by the determination unit; and an allowable power calculation unit that calculates the allowable power indicating the allowable interference power at the target protection point based on the representative value of the
(Continued)

interference power calculated by the interference power calculation unit.

20 Claims, 31 Drawing Sheets

(56) References Cited

U.S. PATENT DOCUMENTS

| | | | |
|---|---|---|---|
| 2008/0208936 A1* | 8/2008 | Lee | G11B 27/105 |
| 2009/0213776 A1* | 8/2009 | Chu | H04W 16/14 |
| | | | 370/312 |
| 2013/0217429 A1* | 8/2013 | Kimura | H04W 52/244 |
| | | | 455/509 |
| 2018/0137630 A1* | 5/2018 | Ma | G06T 7/74 |
| 2019/0007889 A1 | 1/2019 | Jayawickrama et al. | |
| 2020/0120615 A1 | 4/2020 | Kalenahalli | |
| 2020/0314659 A1* | 10/2020 | Hannan | H04W 52/243 |
| 2021/0332821 A1* | 10/2021 | Zhang | F04D 29/026 |

FOREIGN PATENT DOCUMENTS

| | | |
|---|---|---|
| JP | 2017-092813 A | 5/2017 |
| WO | WO-2018215974 A1 | 11/2018 |
| WO | 2019/230156 A1 | 12/2019 |
| WO | WO-2020049992 A1 | 3/2020 |
| WO | 2020/137922 A1 | 7/2020 |

OTHER PUBLICATIONS

"CBRS Coexistence Technical Specification", CBRS Alliance, CBRSA-TS-2001, vol. 1.0.0, Feb. 1, 2018, 20 pages.

"Requirements for Commercial Operation in the U.S. 3550-3700 MHZ Citizens Broadband Radio Service Band", Wireless Innovation Forum, Spectrum Sharing Committee WG1, CBRS Operational and Functional Requirements, WINNF-TS-0112, Version V1.9.1, Mar. 11, 2020, 81 pages.

"Technical and operational requirements for the operation of white space devices under geo-location approach", ECC (Electronic Communications Committee) Report 186, CEPT ECC, Jan. 2013, 181 pages.

"The Wireless Telegraphy (White Space Devices) (Exemption) Regulations 2015", Electronic Communications, Statutory Instruments, The National Archives, No. 2066, 2015, 9 pages.

"Signaling Protocols and Procedures for Citizens Broadband Radio Service (CBRS): WInnForum Recognized CBRS Grouping Information", Wireless Innovation Forum, WINNF-SSC-0010, Version 4.2.0, Jun. 30, 2021, 11 pages.

"47 CFR Part 96 Citizens Broadband Radio Service", Code of Federal Regulations, National Archives, Sep. 12, 2022, pp. 1-24.

"Evolved Universal Terrestrial Radio Access (E-UTRA); Base Station (BS) Radio Transmission and Reception (Release 8)." 3rd Generation Partnership Project (3GPP), Technical Specification, 3GPP, TS 36.104, V8.0.0, Dec. 2007, 47 pages.

"NR; Base Station (BS) radio transmission and reception", 3rd Generation Partnership Project (3GPP), Technical Specification Group Radio Access Network, Release 16, 3GPP, TS 38.104, 239 pp., Dec. 2019.

"White Space Devices (WSD); Wireless Access Systems operating in the 470 MHz to 790 MHz frequency band; Harmonized EN covering the essential requirements of article 3.2 of the R&TTE Directive", Harmonized European Standard, ETSI EN 301 598, 2022.

"Prediction Procedure for the Evaluation of Microwave Interference Between Stations on the Surface of the Earth at Frequencies Above About 0.7 Ghz", ITU-R P.452-10, 1999, 36 pages.

\* cited by examiner

FIG.11

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

FIG.12

| SCS (kHz) | 50 MHz | 100 MHz | 200 MHz | 400 MHz |
|---|---|---|---|---|
| 60 | 1210 | 2450 | 4930 | N.A |
| 120 | 1900 | 2420 | 4900 | 9860 |

FIG.13

| SCS (kHz) | 100 MHz | 200 MHz | 400 MHz |
|---|---|---|---|
| 240 | 3800 | 7720 | 15560 |

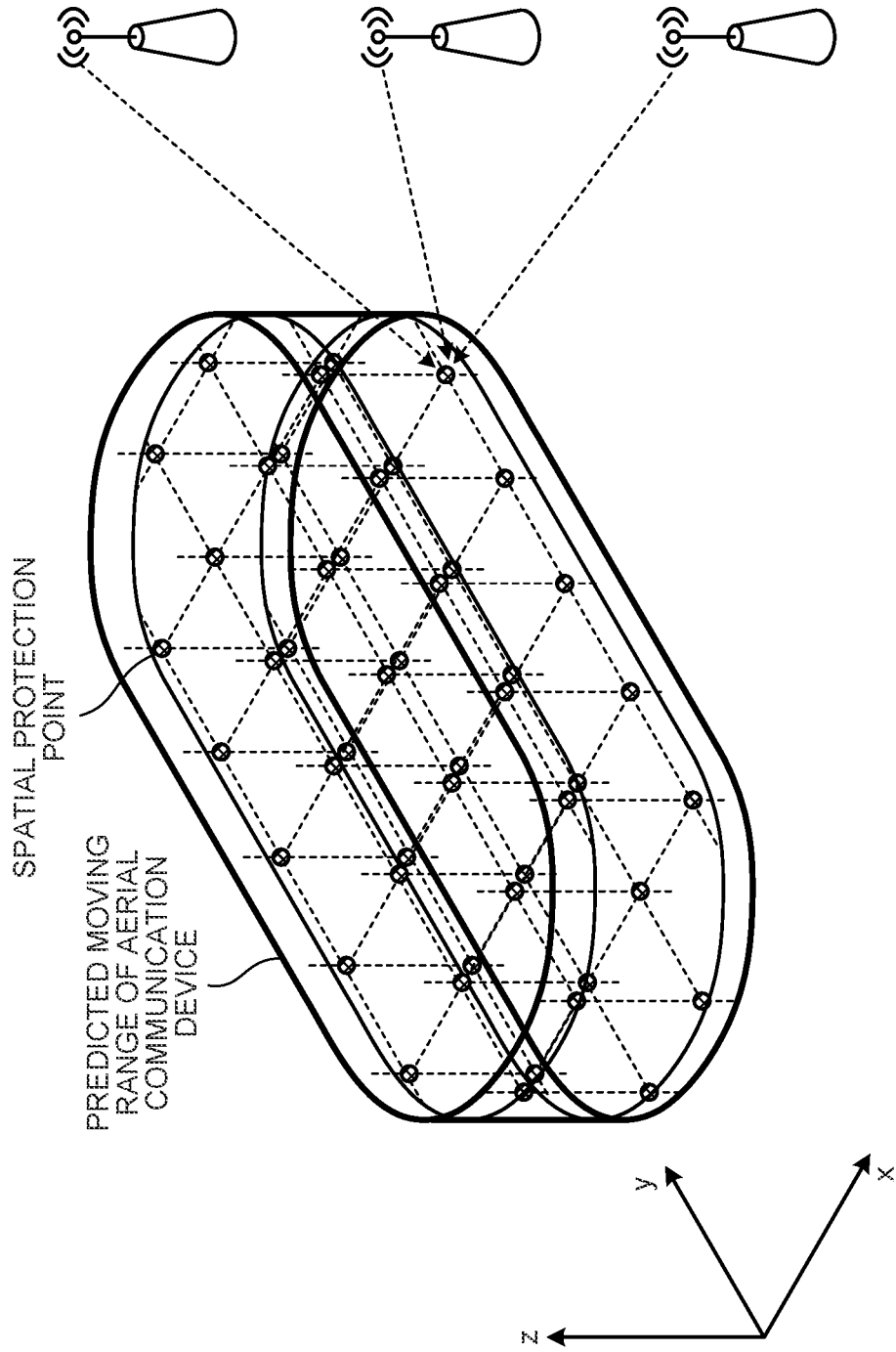

FIG.21

REFERENCE CLUTTER HEIGHT AND INTERVALS

| CLUTTER CATEGORY | REFERENCE HEIGHT (m) | REFERENCE INTERVAL (km) |
|---|---|---|
| VAST FIELD<br>PARK<br>SPARSELY PLANTED TREES WITH IRREGULAR INTERVALS<br>ORCHARD(REGULAR INTERVALS)<br>SPARSELY LOCATED HOUSES | 4 | 0.1 |
| CENTER OF VILLAGE | 5 | 0.07 |
| DECIDUOUS TREES (IRREGULAR INTERVALS)<br>DECIDUOUS TREES (REGULAR INTERVALS)<br>MIXED FOREST | 15 | 0.05 |
| NEEDLE LEAF TREES (IRREGULAR INTERVALS)<br>NEEDLE LEAF TREES (REGULAR INTERVALS) | 20 | 0.05 |
| TROPICAL RAINFOREST | 20 | 0.03 |
| SUBURBAN AREAS | 9 | 0.025 |
| DENSE SUBURBAN AREAS | 12 | 0.02 |
| URBAN AREAS | 20 | 0.02 |
| DENSE URBAN AREAS | 25 | 0.02 |
| INDUSTRIAL ZONE | 20 | 0.05 |

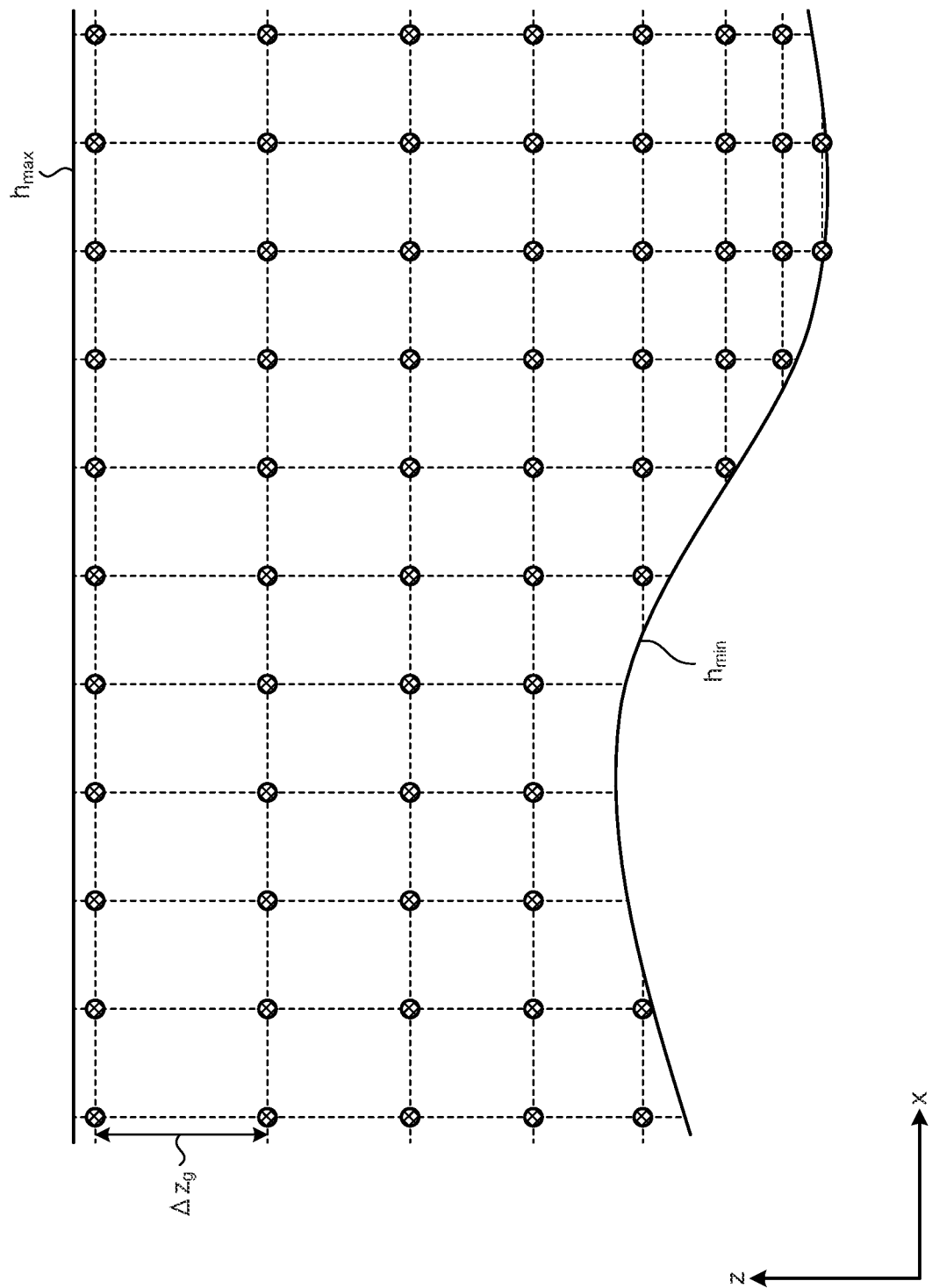

ms_pubrec/itu-r/rec/p/R-REC-P.452-16-201507-I!!PDF-E.pdf

COMMUNICATION CONTROL DEVICE AND COMMUNICATION CONTROL METHOD

CROSS REFERENCE TO RELATED APPLICATIONS

This application is a U.S. National Phase of International Patent Application No. PCT/JP2021/026337 filed on Jul. 13, 2021, which claims priority benefit of Japanese Patent Application No. JP 2020-124607 filed in the Japan Patent Office on Jul. 21, 2020. Each of the above-referenced applications is hereby incorporated herein by reference in its entirety.

FIELD

The present disclosure relates to a communication control device and a communication control method.

BACKGROUND

In recent years, methods of protecting a primary system such as the Citizens Broadband Radio Service (CBRS) using a spectrum sharing technology has been formulated in the legislation or a standard, or the like.

In addition, it is supposed, in Japan, to use a field pickup unit (FPU), which is a type of microwave link operated in the 2.3 GHz band, as a target of spectrum sharing.

CITATION LIST

Non Patent Literature

Non Patent Literature 1: CBRS Alliance "CBRSA-TS-2001" Feb. 1, 2018 "https://www.cbrsalliance.org/wp-content/uploads/2018/06/CBRSA-TS-2001-V1.0.0.pdf"
Non Patent Literature 2: WINNF, "WINNF-TS-0112", "https://winnf.memberclicks.net/assets/CBRS/WINNF-TS-0112.pdf"
Non Patent Literature 3: CEPT ECC, "ECC Report 186 Technical and operational requirements for the operation of white space devices under geo-location approach", January 2013, "https://www.ecodocdb.dk/download/124023a2-73ee/ECCREP186.PDF"
Non Patent Literature 4: The National Archives, "The Wireless Telegraphy (White Space Devices) (Exemption) Regulations 2015", http://www.legislation.gov.uk/uksi/2015/2066/contents/made
Non Patent Literature 5: WINNF, "WINNF-SSC-0010", https://winnf.memberclicks.net/assets/CBRS/WINNF-SSC-0010.pdf
Non Patent Literature 6: FCC (Federal Communications Commissions), "C.F.R (Code of Federal Regulations) Part 96", https://www.ecfr.gov/cgi-bin/retrieveECFR?gp=&SID=2dd346ae3b51f2866ab6fb907e755526&mc=true&r=PART&n=pt47.5.96
Non Patent Literature 7: 3GPP (3rd Generation Partnership Project), "TS (Technical Specification) 36.104", "https://portal.3gpp.org/desktopmodules/Specifications/SpecificationDetails.aspx?specification Id=2412"
Non Patent Literature 8: 3GPP, "TS38.104", https://portal.3gpp.org/desktopmodules/Specifications/SpecificationDetails.aspx?specification Id=3202
Non Patent Literature 9: ETSI (European Telecommunications Standards Institute), "EN 301 598", httph://www.etsi.org/deliver/etsi_en/301500_301599/301598/01.01.01_60/en_301598v010101p.pdf
Non Patent Literature 10: ITU-R P.452-16, "Prediction procedure for the evaluation of microwave interference between stations on the surface of the Earth at frequencies above about 0.7 GHz", https://www.itu.int/dms_pubrec/itu-r/rec/p/R-REC-P.452-16-201507-I!!PDF-E.pdf

SUMMARY

Technical Problem

Here, in a case where the 2.3 GHz band is a target band for spectrum sharing, for example, there is a possibility that the FPU radio station being a primary system is applied to an aerial moving body such as a helicopter. In a case where such an FPU radio station as an aerial body is to be protected against a secondary system, protection points set for conventional primary system protection need to be set also in an altitude direction.

However, since a moving body such as a helicopter is assumed to move over a very wide range, it would be necessary to set a large number of protection points in order to protect the entire moving range, leading to enormous calculation volume for the interference power and the like.

Therefore, the present disclosure proposes a communication control device and a communication control method capable of reducing the calculation volume while ensuring the primary system protection accuracy.

Solution to Problem

A communication control device according to one embodiment of the present disclosure includes: a setting unit that sets a plurality of protection points in the protective space that protects a first radio system from a second radio system that performs shared use of the radio wave used by the first radio system; a determination unit that determines the target protection point to be the calculation target of the interference power received from the second radio system based on the plurality of protection points set by the setting unit; an interference power calculation unit that calculates the representative value of the interference power based on the interference power calculated for the target protection point determined by the determination unit; and an allowable power calculation unit that calculates the allowable power indicating the allowable interference power at the target protection point based on the representative value of the interference power calculated by the interference power calculation unit.

BRIEF DESCRIPTION OF DRAWINGS

FIG. 11 is a diagram cited from Table 5.3.3-1 in 3GPP TS38.104 and is a diagram related to Minimum guardband (kHz) (FR1).

FIG. 12 is a diagram cited from Table 5.3.3-2 in 3GPP TS38.104 and is a diagram related to Minimum guardband (kHz) (FR2).

FIG. 13 is a diagram cited from 3GPP TS38.104 Table 5.3.3-3 and is a diagram related to Minimum guardband (kHz) of SCS 240 kHz SS/PBCH block (FR2).

FIG. 20 is a diagram exemplifying a method of setting a spatial protection point.

FIG. 21 is a diagram exemplifying a method of setting a spatial protection point.

FIG. 22 is a diagram exemplifying a method of setting a spatial protection point.

DESCRIPTION OF EMBODIMENTS

Figure 1:
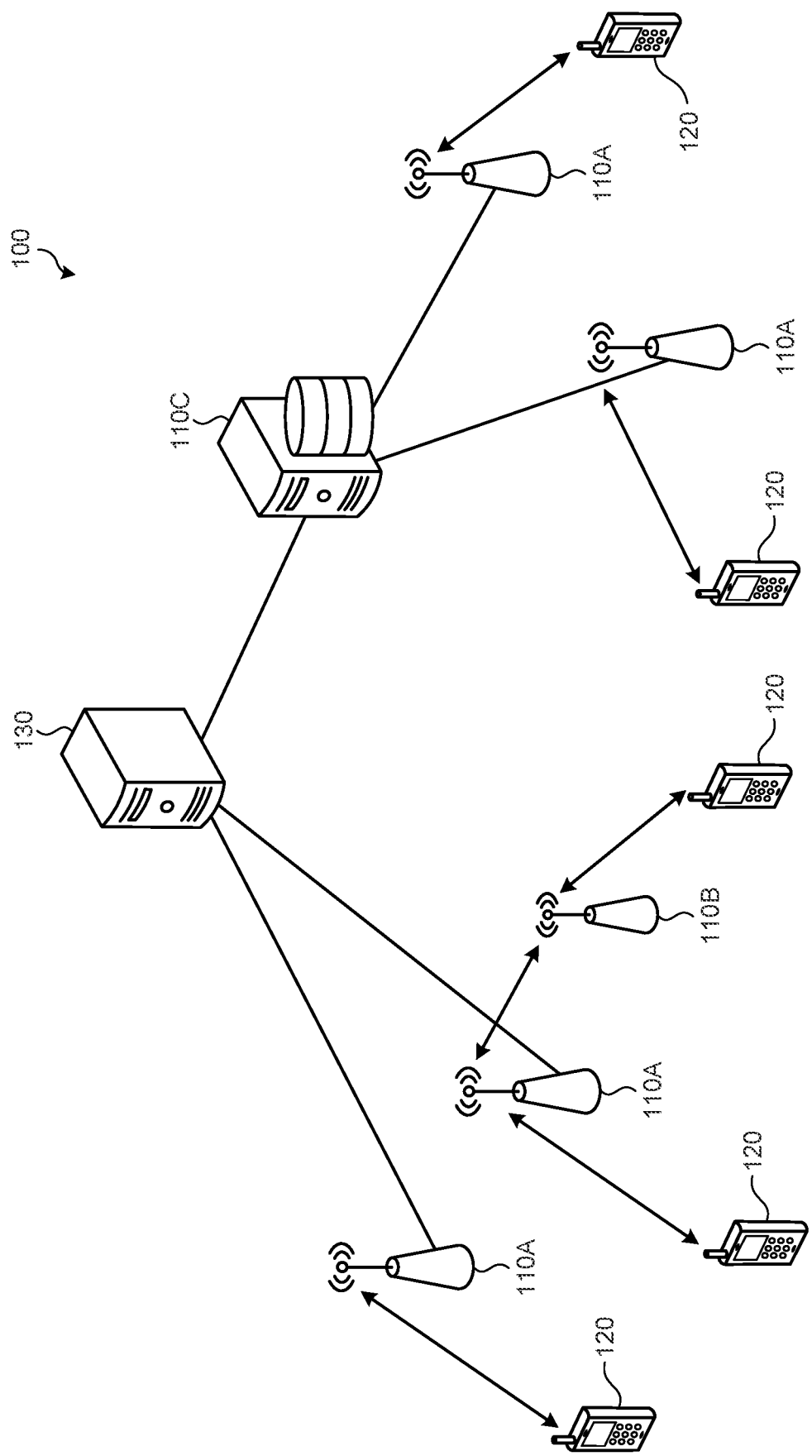
FIG. 1 is a diagram illustrating a configuration example of a communication network system.

Embodiments of the present disclosure will be described below in detail with reference to the drawings. In each of the following embodiments, the same parts are denoted by the same reference symbols, and a repetitive description thereof will be omitted.

The present disclosure will be described in the following order.

1. Introduction
  1-1. Control of radio system for achieving spectrum sharing
  1-2. Terms related to spectrum and sharing
2. Configuration of communication network system
  2-1. Configuration of terminal device
  2-2. Configuration of communication device
  2-3. Configuration of intermediate device
  2-4. Configuration of communication control device
3. Description of various procedures assumed in present embodiment
  3-1. Registration procedure
  3-1-1. Details of required parameters
  3-1-1-1. Supplement to required parameters
  3-1-2. Details of registration process
  3-2. Available spectrum query procedure
  3-2-1. Details of required parameters
  3-2-2. Details of available spectrum evaluation process
  3-3. Spectrum grant procedure
  3-3-1. Details of spectrum grant process
  3-4. Spectrum use notification/heartbeat
  3-5. Supplement to various procedures
  3-6. Various procedures related to terminal
  3-7. Procedure occurring between communication control devices
  3-7-1. Information exchange
  3-7-2. Command/request procedure
  3-8. Information transmission means
  3-8-1. Signaling between communication control device 130 and communication device 110
  3-8-2. Signaling between communication device 110 and terminal device 120
4. Operation related to protection of aerial communication device
  4-1. Assumed system to be protected
  4-2. Interference calculation in present embodiment
  4-3. Method of setting protective space
  4-3-1. Method of predicting protective space
  4-4. Spatial protection point setting method
  4-5. Calculating interfering power
  4-6. Method of allocating interference margin
5. Modification
6. Conclusion

1. INTRODUCTION

With recent increase and diversification of radio environments having a mixture of various radio systems and the volume of content transferred via radio communications, there has been an emerging problem of exhaustion of radio resources (for example, frequency/spectrum) available for allocation to the radio systems. However, many radio bands are already used by incumbent radio systems, making it difficult to allocate new radio resources. In view of this, in recent years, more effective use of radio resources by utilization of cognitive radio technology has started to attract attention.

In the cognitive radio technology, radio resources are worked out by utilizing temporally and spatially unused radio spectrum (white space) of the incumbent radio system (for example, by using dynamic spectrum sharing (Dynamic Spectrum Access (DSA))). In the United States, for example, with the aim of opening a Federal use band (3.55-3.70 GHz), which overlaps with a frequency band that is worldwide 3GPP bands 42 and 43, to the general public, legislation and standardization of a Citizens Broadband Radio Service (CBRS) utilizing a spectrum sharing technology are accelerating.

Note that the cognitive radio technology contributes not merely to dynamic spectrum sharing but also to improvement of spectrum use efficiency by a radio system. For example, ETSI EN 303 387 and IEEE 802.19.1-2014 define a technology of inter-radio system coexistence technology using unused radio spectrum.

<1-1. Control of Radio System for Achieving Spectrum Sharing>

In general case of spectrum sharing, it is required, by the National Regulatory Authority (NRA) of each country/region, to protect the radio system (primary system) of the primary user licensed or authorized for the use of a frequency band. Typically, an acceptable interference reference value regarding the primary system is defined by the NRA, and the radio system (secondary system) of the secondary user is required to suppress the interference occurring by sharing to a value below the acceptable interference reference value.

In the following description, a "system" represents a set of a plurality of components (devices, modules (components), and the like). At this time, it would not matter whether or not all the components are in the same housing. For example, each of a plurality of devices housed in separate housings and connected via a network or the like, and one device in which a plurality of modules is housed in one housing, is a "system" in each case. That is, a radio system such as a primary system and a secondary system may each be configured by a plurality of devices or may be configured by one device.

In order to achieve spectrum sharing, for example, a communication control device (for example, the spectrum management database) controls communication of the secondary system so as not to give fatal interference to the primary system. The communication control device is a device that manages communication and the like of the communication device. For example, the communication control device is a system for managing radio resources (for example, spectrum), such as a geo-location database (GLDB) and a spectrum access system (SAS). In the present embodiment, the communication control device corresponds to a communication control device 130 described below. The communication control device 130 will be described in detail below.

Here, the primary system is, for example, a system (for example, an incumbent system) that preferentially uses a predetermined frequency band over other systems. In addition, the secondary system is, for example, a system that performs secondary use (for example, dynamic spectrum sharing) of a frequency band used by the primary system. Each of the primary system and the secondary system may include a plurality of communication devices or may include one communication device. Moreover, in the following, regarding the primary system, the communication control device for the communication devices allocates an interference tolerance to one or a plurality of communication devices constituting the secondary system such that interference aggregation of the one or a plurality of communication devices toward the primary system would not exceed an interference tolerance (also referred to as an interference margin) of the primary system. At this time, the interference tolerance may be an interference amount preliminarily determined by an operator of the primary system, a public organization that manages radio waves, or the like. In the following description, the interference margin refers to the interference tolerance. In addition, interference aggregation may be referred to as aggregated interfering power.

As illustrated in FIG. 1, the present system model is represented by a communication network system 100 including radio communication, and typically includes the following entities. FIG. 1 is a diagram illustrating a configuration example of the communication network system 100.

Communication device 110
Terminal device 120
Communication control device 130

The present system model also includes at least the primary system and the secondary system utilizing the communication network system 100. The primary system and the secondary system are constituted with the communication device 110 or the communication device 110 and the terminal device 120. Although various communication systems can be handled as a primary system or a secondary system, in the present embodiment, the primary system is assumed to be a radio system that uses a specific frequency band, and the secondary system is assumed to be a radio system that shares a part or all of the frequency band. That is, the present system model will be described as a model of a radio communication system related to dynamic spectrum sharing (Dynamic Spectrum Access (DSA)). Note that the present system model is not limited to a system related to dynamic spectrum sharing.

Typically, the communication device 110 is a radio device that provides a radio communication service to the terminal device 120, such as a radio base station (Base Station, Node B, eNB, gNB, etc.) or a radio access point. That is, the communication device 110 provides a radio communication service to enable radio communication of the terminal device 120. Furthermore, the communication device 110 may be a wireless relay device or an optical link device referred to as a remote radio head (RRH). In the following description, unless otherwise specified, the communication device 110 will be described as an entity constituting the secondary system.

The coverage (communication area) of the communication device 110 is allowed to have various sizes from a large size such as a macro cell to a small size such as a pico cell. Like a distributed antenna system (DAS), a plurality of communication devices 110 may form one cell. Furthermore, in a case where the communication device 110 has a beamforming capability, a cell or a service area may be formed for each beam.

The present disclosure assumes that there are two different types of communication devices 110. Specifically, as illustrated in FIG. 1, types of a "communication device 110A" and a "communication device 110B" are assumed.

In the present disclosure, a communication device 110 that can access the communication control device 130 without using a wireless path involving permission of the communication control device 130 is referred to as a "communication device 110A". Specifically, for example, a communication device 110 capable of wired Internet connection can be regarded as the "communication device 110A". In addition, for example, even in the case of a wireless relay device having no wired Internet connection function, the wireless relay device may be regarded as the "communication device 110A" when a radio backhaul link using a spectrum that does not require the permission of the communication control device 130 is constructed with another communication device 110A.

In the present disclosure, the communication device 110 that cannot access the communication control device 130 without a wireless path requiring the permission of the communication control device 130 is referred to as a "communication device 110B". For example, a wireless relay device that needs to construct a backhaul link using a spectrum that requires permission of the communication control device 130 can be regarded as the "communication device 110B". Furthermore, for example, it is allowable to handle a device such as a smartphone having a wireless network providing function represented by tethering and using a spectrum that requires permission of the communication control device 130 for both the backhaul link and the access link, as the "communication device 110B".

The communication device 110 does not need to be installed as a stationary device. For example, the communication device 110 may be installed on a moving object such as an automobile. Furthermore, the communication device 110 does not need to exist on the ground. For example, the communication device 110 may be included in an object existing in the air or space, such as an aircraft, a drone, a helicopter, a high altitude platform station (HAPS), a balloon, or a satellite. Furthermore, for example, the communication device 110 may be included in an object existing on the sea or under the sea, such as a ship or a submarine. Typically, such a mobile communication device 110 corresponds to the communication device 110B, and performs wireless communication with the communication device 110A, thereby ensuring an access path to the communication control device 130. As a matter of course, even a mobile communication device 110 can be handled as the communication device 110A as long as the frequency/spectrum used in the wireless communication with the communication device 110A is not managed by the communication control device 130.

In the present disclosure, unless otherwise specified, the description "communication device 110" semantically includes both the communication device 110A and the communication device 110B, and may be replaced with either one.

The communication device 110 can be used, operated, or managed by various business operators. Assumable examples of the business operators involving the communication device 110 include a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (incorporated educational institutions, boards of education of local governments, and the like), a real estate (building, apartment, etc.) administrator, or an individual. Note that the business operator involving the communication device 110 is not particularly limited. Furthermore, the communication device 110A may be a shared facility used by a plurality of business operators. In addition, installation, use, and management of the facilities may be performed by individual business operators.

The communication device 110 operated by business operators is typically connected to the Internet via a core network. Furthermore, operation management, and maintenance is performed by a function referred to as Operation, Administration & Maintenance (OA & M). Furthermore, for example, as illustrated in FIG. 1, there may be an intermediate device (network manager) 110C that integrally controls the communication device 110 in the network. Note that the intermediate device 110C may be the communication device 110 or the communication control device 130.

The terminal device 120 (also referred to as User Equipment, User Terminal, User Station, Mobile Terminal, Mobile Station, and the like) is a device that performs radio communication by a radio communication service provided by the communication device 110. Typically, a communication device such as a smartphone corresponds to the terminal device 120. Note that a device having a radio communication function can correspond to the terminal device 120. For example, a device such as a business camera having a radio communication function can also correspond to the terminal device 120 even when the radio communication is not a main application. In addition, a communication device that transmits data to the terminal device 120, such as a broadcasting radio station (referred to as broadcasting field pickup unit (FPU)) that transmits an image for television broadcasting or the like from the outside (field) of the broadcasting station to the broadcasting station in order to perform sports live broadcasting or the like, also corresponds to the terminal device 120. Note that the terminal device 120 does not necessarily have to be used by a person. For example, like a form of machine type communication (MTC), a device such as a machine in a factory or a sensor installed in a building may be connected to a network to operate as the terminal device 120. In addition, a device refer to customer premises equipment (CPE) provided for Internet connection may behave as the terminal device 120.

Furthermore, the terminal device 120 may include a relay communication function as represented by Device to Device (D2D) and Vehicle to everything (V2X).

Similarly to the communication device 110, the terminal device 120 does not need to be installed as a stationary device or exist on the ground. For example, an object existing in the air or space, such as an aircraft, a drone, a helicopter, a satellite, or the like, may operate as the terminal device 120. Furthermore, for example, an object existing on the sea or in the sea, such as a ship or a submarine, may operate as the terminal device 120.

In the present disclosure, unless otherwise specified, the terminal device 120 corresponds to an entity that terminates a radio link using the spectrum that requires permission of the communication control device 130. However, the terminal device 120 can perform an operation equivalent to that of the communication device 110 depending on a function included in the terminal device 120 or a network topology to be applied. In other words, depending on the network topology, a device that can correspond to the communication device 110 such as a radio access point may correspond to the terminal device 120, or a device that can correspond to the terminal device 120 such as a smartphone may correspond to the communication device 110.

The communication control device 130 is typically a device that performs determination, permission, instruction, and/or management of communication parameters of the communication device 110. For example, a database server referred to as a TV white space database (TVWSDB), geolocation database (GLDB), spectrum access system (SAS), or automated frequency coordination (AFC) corresponds to the communication control device 130. In addition, for example, control devices that perform radio wave interference control between devices, defined by standards represented by European Telecommunications Standards Institute (ETSI) EN 303 387, Institute of Electrical and Electronics Engineers (IEEE) 802.19.1-2018, and CBRSA-TS-2001, also correspond to the communication control device 130. Furthermore, for example, a Registered Location Secure Server (RLSS) defined in IEEE 802.11-2016 can also corresponds to the communication control device 130. That is, not limited to these examples, an entity responsible for determination, use permission, instruction, management, and the like of the communication parameters of the communication device 110 may be referred to as the communication control device 130. Basically, the communication control device 130 has the communication device 110 as a control target, but the communication control device 130 may also control the terminal device 120 under the communication device 110.

There may be a plurality of communication control devices 130. In a case where there is a plurality of communication control devices 130, at least one of at least the following three types of decision-making topologies can be applied to the communication control device 130.

Figure 2:
FIG. 2 is a diagram illustrating a case where a plurality of communication control devices is disposed in a distributed manner.

Autonomous decision-making
Centralized decision-making
Distributed decision-making Autonomous decision-making is a decision-making topology in which an entity that makes a decision (decision-making entity; here, corresponds to the communication control device 130) makes a decision independently from another decision-making entity. The communication control device 130 independently calculates necessary frequency allocation and interference control. The autonomous decision-making can be applied to a case, for example, where a plurality of communication control devices 130 is disposed in a distributed manner as illustrated in FIG. 2. FIG. 2 is a diagram illustrating a case where a plurality of communication control devices 130 is disposed in a distributed manner.

Figure 3:
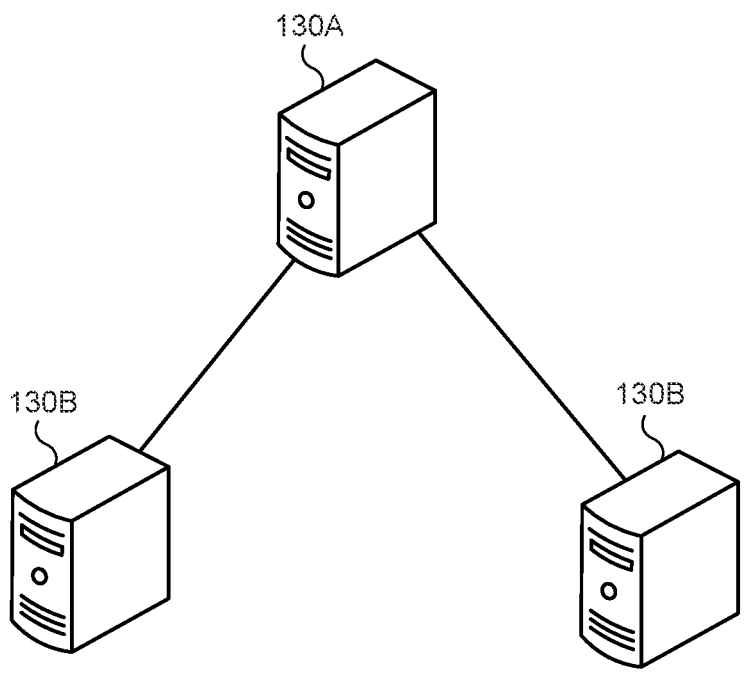
FIG. 3 is a diagram illustrating a model in which one communication control device centrally controls a plurality of communication control devices.

Centralized decision-making is a decision-making topology in which a decision-making entity delegates decision-making to another decision-making entity. In a case where middle-sized decision-making is performed, a model as illustrated in FIG. 3 is assumed, for example. FIG. 3 is a diagram illustrating a model (referred to as a master-slave model) in which one communication control device 130A centrally controls a plurality of the communication control devices 130B. In the model of FIG. 3, the communication control device 130A, which is the master, can control the communication control devices 130B, which are the plurality of slaves, to intensively make decisions.

Distributed decision-making is a decision-making topology in which a decision-making entity makes a decision in cooperation with another decision-making entity. For example, the form in which the plurality of communication control devices 130 independently makes a decision as in autonomous decision-making in FIG. 2, and mutual adjustment of decision making results, negotiation, and the like is performed by each communication control device 130 after making a decision can correspond to "distributed decision-making". Furthermore, for example, in the centralized decision-making as illustrated in FIG. 3, dynamically conducting, by the communication control device 130A as a master, delegation, discarding, and the like of the decision-making authority to each communication control device 130B as a slave for the purpose of load balancing, and the like, can also be considered as "distributed decision-making".

Figure 4:
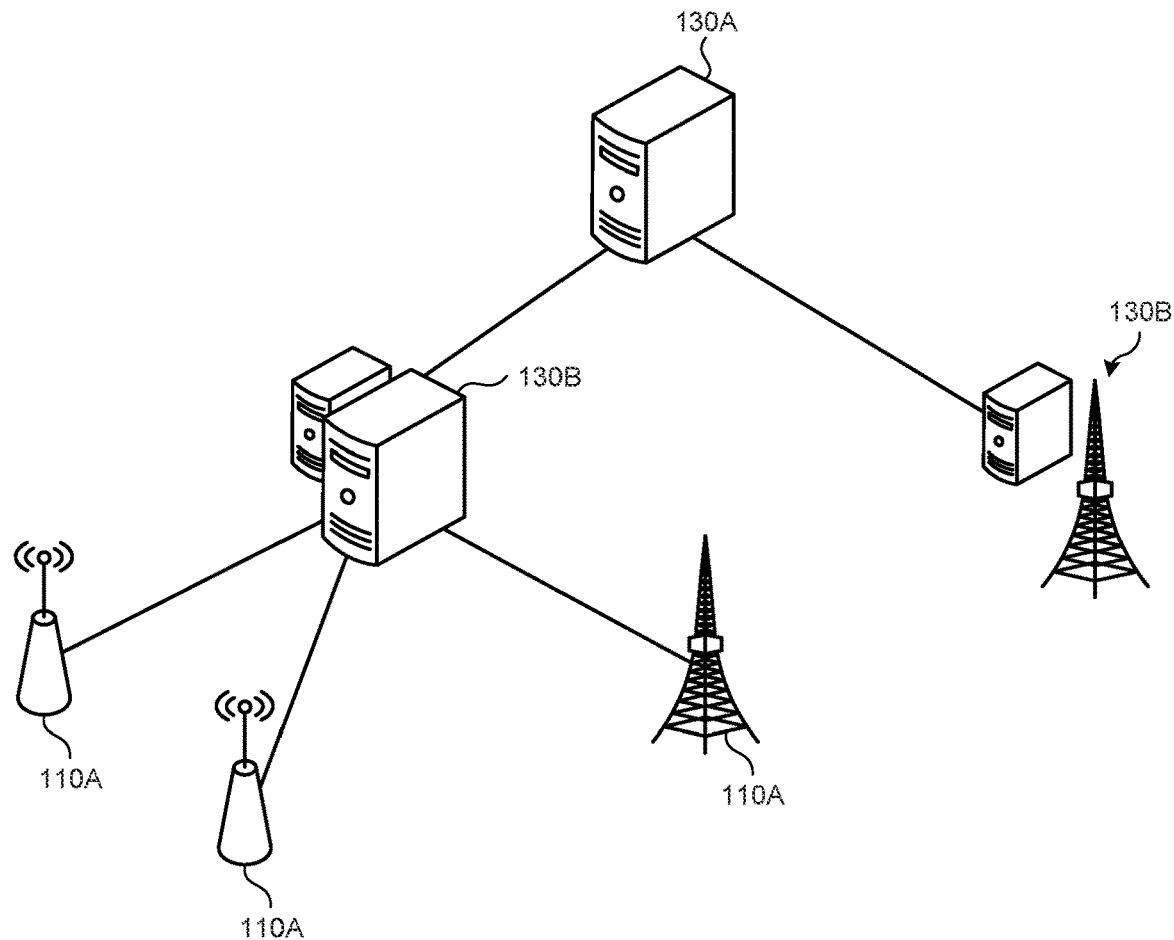
FIG. 4 is a diagram illustrating an example in which a slave communication control device operates as an intermediate device that supervises a plurality of communication devices.

There can be a case where both centralized decision making and distributed decision-making are applied. FIG. 4 is a diagram illustrating an example in which the communication control device 130B as a slave operates as an intermediate device that supervises a plurality of communication devices 110A. The communication control device 130A as a master need not control the communication device 110 supervised by the communication control device 130B as a slave, that is, need not control the secondary systems constituted with the communication control device 130B as a slave.

In order to conduct its own role, the communication control device 130 can also obtain necessary information from entities, other than the communication device 110 and the terminal device 120 of the communication network system 100. Specifically, there is a case of acquiring information necessary for protection of the primary system, from a database (regulatory database) managed and operated by a national or regional radio administration agency (National Regulatory Authority (NRA)), for example. An example of the regulatory database is a Universal Licensing System (ULS) operated by the United States Federal Communications Commissions (FCC). Examples of information necessary for protection of the primary system include information such as location information regarding the primary system, communication parameters of the primary system, out-of-band emission (OOBE) limit, Adjacent Channel Leakage Ratio (ACLR), Adjacent Channel Selectivity, fading margin, and protection ratio (PR). In a district where a fixed numerical value, an acquisition method, a derivation method, and the like are defined by the legislation in order to protect the primary system, it is desirable to use information defined by the legislation as information necessary for protecting the primary system.

In addition, a database that records information about the communication device 110 and the terminal device 120 that have received conformity authentication such as an Equipment Authorization System (EAS) managed by an Office of Engineering and Technology (OET) of the FCC also corresponds to the regulatory database. It is possible to acquire, from such a regulatory database, information regarding the operable frequency of the communication device 110 and the terminal device 120, information regarding the maximum EIRP, and the like. Naturally, the communication control device 130 may use these pieces of information for protecting the primary system.

Furthermore, it is also conceivable that the communication control device 130 acquires radio wave sensing information from a radio wave sensing system installed and operated for the purpose of radio wave detection in the primary system. As a specific example, in the Citizens Broadband Radio Service (CBRS) in the United States, the communication control device 130 acquires radio wave detection information regarding the in-ship radar as the primary system from a radio wave sensing system referred to as an Environmental Sensing Capability (ESC). Furthermore, in a case where the communication device 110 or the terminal device 120 has a sensing function, the communication control device 130 may acquire the radio wave detection information of the primary system from these devices.

The interface between the entities constituting the present system model may be either wired or wireless. For example, an interface between the communication control device 130 and the communication device 110 may be implemented by using not only a wired line but also a wireless interface that does not depend on frequency sharing. Examples of the wireless interface that does not depend on spectrum sharing include a wireless communication line provided by a mobile communication carrier (network operator) via a licensed band, and a Wi-Fi communication using an incumbent license-exempt band.

<1-2. Terms Related to Spectrum and Sharing>

As described above, the present embodiment will be described as being operated under a dynamic spectrum sharing (Dynamic Spectrum Access) environment. As a representative example of dynamic spectrum sharing, a mechanism defined in CBRS of the United States (that is, a mechanism defined in the United States FCC Regulation Part 96 Citizens Broadband Radio Service) will be described.

Figure 5:
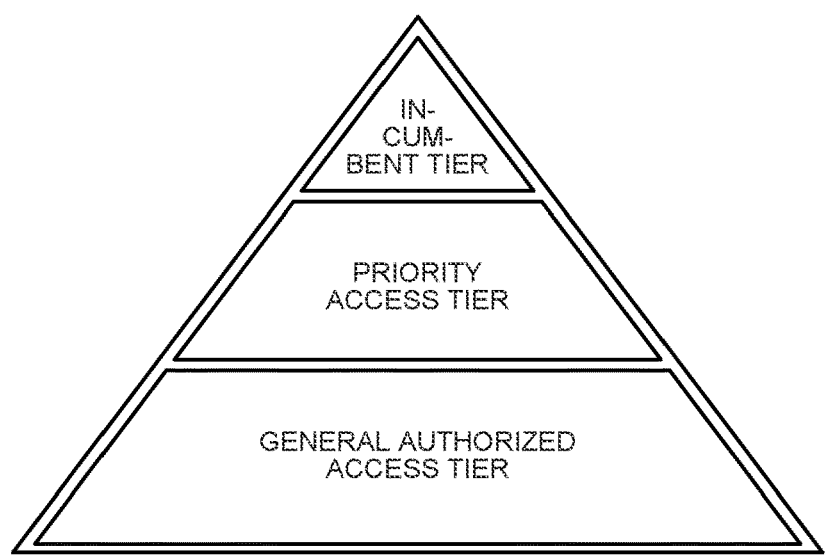
FIG. 5 is a diagram illustrating a hierarchical structure in CBRS.

In CBRS, as illustrated in FIG. 5, each of users in a shared frequency band is classified into one of three groups. FIG. 5 is a diagram illustrating a hierarchical structure in the CBRS. This group is referred to as a tier. The three groups are referred to as an Incumbent Tier, a Priority Access Tier, and a General Authorized Access (GAA) Tier.

The Incumbent Tier is a group including incumbent users who conventionally use a frequency band defined as a shared frequency band. The incumbent user is also generally referred to as a primary user. The incumbent users defined in the CBRS include: US Department of Defense (DOD), fixed satellite service operators, and Grandfathered Wireless Broadband Licensees (GWBL). The incumbent tier is not required to avoid interference to the Priority Access Tier and the GAA tier with lower priorities or to suppress utilization of the shared frequency band. On the other hand, the Incumbent Tier is protected against the interference from the Priority Access Tier and the GAA Tier. That is, the user of the Incumbent Tier can use the shared frequency band without considering the presence of other groups.

The Priority Access Tier is a group of users who utilizes the shared frequency band based on the Priority Access License (PAL) described above. A user of the priority access tier is also generally referred to as a secondary user. When using the shared frequency band, the Priority Access Tier is required to avoid interference and to suppress the use of the shared frequency band against the Incumbent Tier having a higher priority over the Priority Access Tier. On the other hand, the Priority Access Tier is not require to implement neither interference avoidance nor suppression of use of the shared frequency band against the GAA tier having a lower priority than the Priority Access Layer. In addition, the Priority Access Tier is not protected against the interference against the higher priority tier, namely, the Incumbent Tier, but is protected against the interference from the lower priority tier, namely, the General Authorized Access Tier (GAA Tier).

The GAA tier is a group including shared frequency band users that do not belong to either the Incumbent Tier or the Priority Access Tier. Similar to the Priority Access Tier user, the user of the GAA Tier is also referred to as a secondary user in typical cases. Due to the lower priority in shared use compared to the Priority Access Tier, the GAA Tier user is also referred to as a low priority secondary user. When using the shared frequency band, the GAA Tier is required to avoid interference and to suppress the use of the shared frequency band against the Incumbent Tier and the Priority Access Tier having a higher priority over the GAA Tier. Moreover, the GAA tier is not protected against the interference from the Incumbent Tier and Priority Access Tier which are higher priority tiers. That is, the GAA Tier is a tier that is legislatively required to conduct opportunistic use of shared frequency band.

Although the CBRS mechanism has been described above as a representative example of dynamic spectrum sharing, the present embodiment is not limited to the definition of CBRS. For example, although the CBRS typically adopts a three-tier structure as illustrated in FIG. 5, a two-tier structure may be adopted in the present embodiment. Typical examples of the two-tier structure include Authorized Shared Access (ASA), Licensed Shared Access (LSA), evolved LSAs (eLSAs), and TV band White Space (TVWS). The ASA, the LSA, and the eLSA include no GAA tiers, and adopt a structure equivalent to a combination of the Incumbent Tier and the Priority Access Tier. In addition, the TVWS includes no priority access tier, and adopts a structure equivalent to a combination of the Incumbent Tier and the GAA Tier. In addition, there may be four or more Tiers. Specifically, for example, by providing a plurality of intermediate layers corresponding to the Priority Access Tier and giving different priorities to each intermediate layers, four or more Tiers may be generated. In addition, for example, the tier may be further increased by similarly dividing the GAA tier and giving priority to each. That is, each group may be divided.

In addition, the primary system of the present embodiment is not limited to the definition of CBRS. Assumable examples of the primary system include radio systems such as a TV broadcast, a fixed microwave line (Fixed System (FS)), a meteorological radar, a radio altimeter, a communications-based train control, and radio astronomy, and not limited to these, all types of radio systems can be the primary system of the present embodiment.

In addition, as described above, the present embodiment is not limited to the environment of spectrum sharing. In a typical case of spectrum sharing or secondary utilization of spectrum, an incumbent system that uses a target frequency band is referred to as a primary system, and a secondary user is referred to as a secondary system. However, when the present embodiment is applied to an environment other than a spectrum sharing environment, the system should be read by replacing the system with another term. For example, a macro cell base station in a heterogeneous network (HetNet) may be defined as a primary system, and a small cell base station or a relay station may be defined as a secondary system. In addition, the base station may be defined as a primary system, and a relay User Equipment (UE) or a vehicle UE implementing D2D or V2X present in its coverage may be defined as a secondary system. The base station is not limited to a fixed type, and may be a portable/mobile type. In such a case, for example, the communication control device 130 of the present embodiment may be included in a core network, a base station, a relay station, a relay UE, or the like.

When the present embodiment is applied to an environment other than the spectrum sharing environment, the term "spectrum" (or "frequency") in the present disclosure is replaced with another term shared by the application destination. For example, the term may be replaced with terms such as "resource", "resource block", "resource element", "resource pool", "channel", "component carrier", "carrier", "subcarrier", "Bandwidth Part (BWP)", or other terms having equivalent or similar meanings.

Hereinafter, configurations of individual devices included in the communication network system 100, together with an external device, will be specifically described.

2. CONFIGURATION OF COMMUNICATION NETWORK SYSTEM

<2-1. Configuration of Terminal Device>

Figure 6:
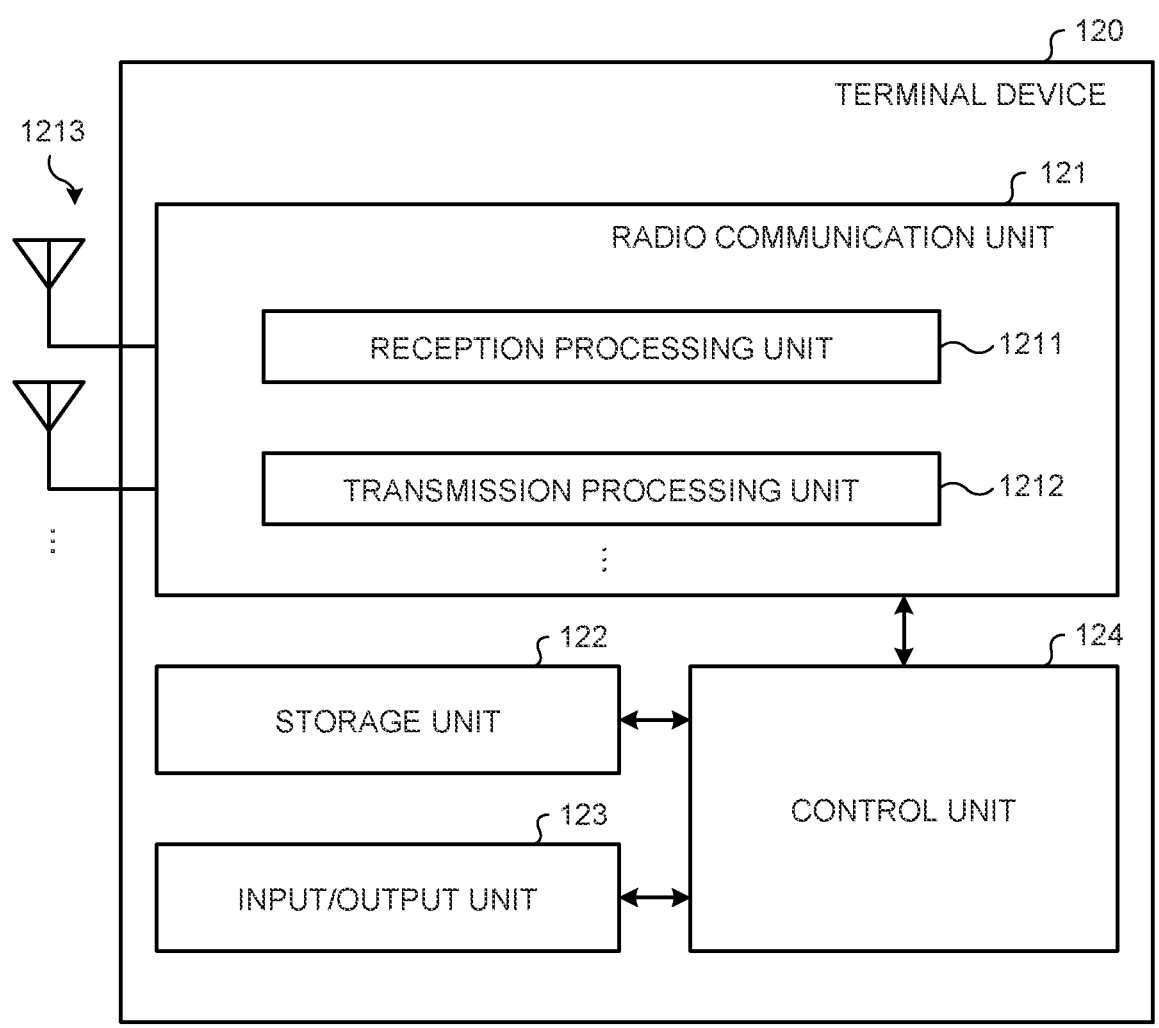
FIG. 6 is a diagram illustrating a configuration example of a terminal device according to the embodiment of the present disclosure.

Next, a configuration of the terminal device 120 will be described. FIG. 6 is a diagram illustrating a configuration example of the terminal device 120 according to the embodiment of the present disclosure. The terminal device 120 is a communication device (radio system) that performs radio communication with the communication device 110 and/or the communication control device 130. The terminal device 120 is a type of information processing device.

The terminal device 120 includes a radio communication unit 121, a storage unit 122, an input/output unit 123, and a control unit 124. Note that the configuration illustrated in FIG. 6 is a functional configuration, and the hardware configuration may be different from this. Furthermore, the functions of the terminal device 120 may be implemented in a distributed manner in a plurality of physically separated configurations.

The radio communication unit 121 is a radio communication interface that performs radio communication with other communication devices (for example, the communication device 110 and other terminal device(s) 120). The radio communication unit 121 operates under the control of the control unit 124. The radio communication unit 121 may support one or a plurality of radio access methods. For example, the radio communication unit 121 supports both NR and LTE. The radio communication unit 121 may support other radio access methods such as W-CDMA and cdma2000.

The radio communication unit 121 includes a reception processing unit 1211, a transmission processing unit 1212, and an antenna 1213. The radio communication unit 121 may include a plurality of the reception processing units 1211, a plurality of the transmission processing units 1212, and a plurality of the antennas 1213. In a case where the radio communication unit 121 supports a plurality of radio access methods, individual portions of the radio communication unit 121 can be configured separately for each of the radio access methods. For example, the reception processing unit 1211 and the transmission processing unit 1212 may be individually configured for LTE and NR. The configurations of the reception processing unit 1211 and the transmission processing unit 1212 are similar to those of a reception processing unit 1111 and a transmission processing unit 1112 of the communication device 110.

The storage unit 122 is a data readable/writable storage device such as dynamic random access memory (DRAM), static random access memory (SRAM), a flash drive, or a hard disk. The storage unit 122 functions as a storage means in the terminal device 120.

The input/output unit 123 is a user interface for exchanging information with the user. For example, the input/output unit 123 is an operation device such as a keyboard, a mouse, operation keys, and a touch panel, used by a user to perform various operations. Alternatively, the input/output unit 123 is a display device such as a liquid crystal display, or an organic electroluminescence (EL) display. The input/output unit 123 may be an acoustic device such as a speaker or a buzzer. Furthermore, the input/output unit 123 may be a lighting device such as a light emitting diode (LED) lamp. The input/output unit 123 functions as an input/output means (input means, output means, operation means, or notification means) provided on the terminal device 120.

The control unit 124 is a controller that controls individual components of the terminal device 120. The control unit 124 is implemented by a processor such as a central processing unit (CPU) or a micro processing unit (MPU), for example. For example, the control unit 124 is actualized by execution of various programs stored in the storage device inside the terminal device 120 by the processor using random access memory (RAM) or the like as a work area. Note that the control unit 124 may be implemented by an integrated circuit such as an application specific integrated circuit (ASIC) or a field programmable gate array (FPGA). The CPU, MPU, ASIC, and FPGA can all be regarded as controllers. Note that the control unit 124 may include individual functional blocks included in the control unit of the communication device 110.

The control unit 124 may be illustrated by functional blocks indicating functions executed by the control unit 124. The functional blocks may be software blocks or hardware blocks. For example, each of the functional blocks may be one software module actualized by software (including a microprogram) or one circuit block on a semiconductor chip (die). Needless to say, each of a plurality of functional blocks may be formed as one processor or one integrated circuit. The functional block may be configured by using any method. Note that the control unit 124 can be configured in any functional unit.

<2-2. Configuration of Communication Device>

Figure 7:
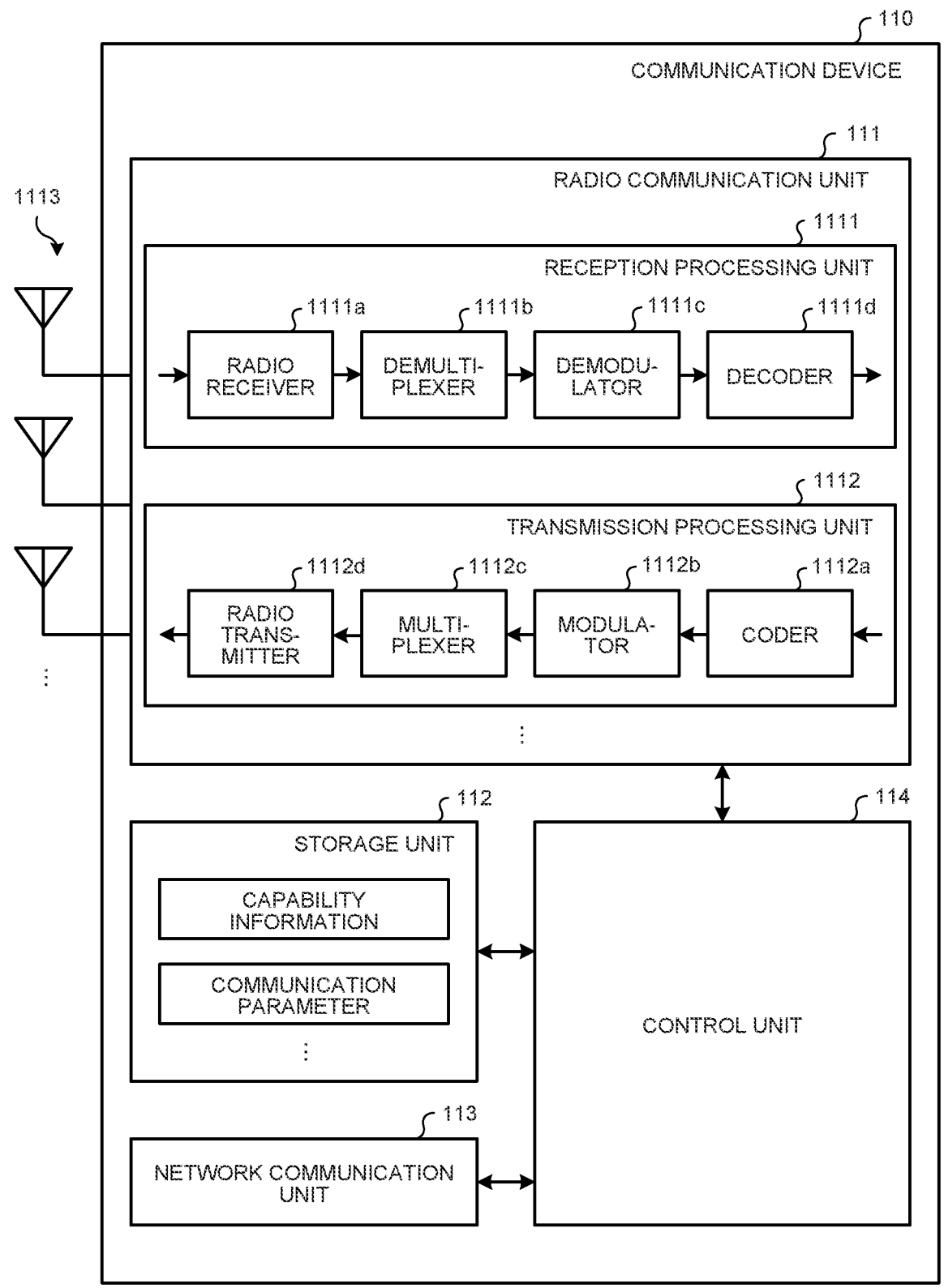
FIG. 7 is a diagram illustrating a configuration example of a communication device according to an embodiment of the present disclosure.

Next, a configuration of the communication device 110 will be described. FIG. 7 is a diagram illustrating a configuration example of the communication device 110 according to an embodiment of the present disclosure. The communication device 110 is a communication device (radio system) that performs radio communication with the terminal device 120 under the control of the communication control device 130. The communication device 110 is a type of information processing device.

The communication device 110 includes a radio communication unit 111, a storage unit 112, a network communication unit 113, and a control unit 114. Note that the configuration illustrated in FIG. 7 is a functional configuration, and the hardware configuration may be different from this. Furthermore, the functions of the communication device 110 may be distributed and implemented in a plurality of physically separated devices.

The radio communication unit 111 is a radio communication interface that performs radio communication with other communication devices (for example, the terminal device 120, the communication control device 130, the intermediate device 110C, and other communication device(s) 110). The radio communication unit 111 operates under the control of the control unit 114. The radio communication unit 111 may support a plurality of radio access methods. For example, the radio communication unit 111 may support both NR and LTE. The radio communication unit 111 may support other cellular communication methods such as W-CDMA and cdma2000. For example, the radio communication unit 111 may support the wireless LAN communication method in addition to the cellular communication method. Needless to say, the radio communication unit 111 may be configured to support a single radio access method.

The radio communication unit 111 includes a reception processing unit 1111, a transmission processing unit 1112, and an antenna 1113. The radio communication unit 111 may include a plurality of the reception processing units 1111, a plurality of the transmission processing units 1112, and a plurality of the antennas 1113. In a case where the radio communication unit 111 supports a plurality of radio access methods, individual portions of the radio communication unit 111 can be configured separately for each of the radio access methods. For example, if the communication device 110 is compatible with NR and LTE, the reception processing unit 1111 and the transmission processing unit 1112 may be configured separately for NR and LTE.

The reception processing unit 1111 processes an uplink signal received via the antenna 1113. The reception processing unit 1111 includes a radio receiver 1111a, a demultiplexer 1111b, a demodulator 1111c, and a decoder 1111d.

The radio receiver 1111a performs processes on the uplink signal, such as down-conversion, removal of unnecessary frequency components, amplification level control, orthogonal demodulation, conversion to digital signal, removal of guard interval, and frequency domain signal extraction using fast Fourier transform. For example, it is assumed that the radio access method of the communication device 110 is a cellular communication method such as LTE. At this time, the demultiplexer 1111b demultiplexes an uplink channel such as a physical uplink shared channel (PUSCH) or a physical uplink control channel (PUCCH) and an uplink reference signal from the signal output from the radio receiver 1111a. Using a modulation scheme such as binary phase shift keying (BPSK) or quadrature phase shift keying (QPSK) for the modulation symbol of the uplink channel, the demodulator 1111c demodulates the received signal. The modulation scheme used by the demodulator 1111c may be multi-valued quadrature amplitude modulation (QAM) such as 16 QAM, 64 QAM, or 256 QAM. The decoder 1111d performs decoding processing on the demodulated coded bits of the uplink channel. The decoded uplink data and uplink control information are output to the control unit 114.

The transmission processing unit 1112 performs transmission processing of downlink control information and downlink data. The transmission processing unit 1112 includes a coder 1112a, a modulator 1112b, a multiplexer 1112c, and a radio transmitter 1112d.

The coder 1112a encodes the downlink control information and the downlink data input from the control unit 114 by using a coding method such as block coding, convolutional coding, or turbo coding. The modulator 1112b modulates the coded bits output from the coder 1112a by a predetermined modulation scheme such as BPSK, QPSK, 16 QAM, 64 QAM, or 256 QAM. The multiplexer 1112c multiplexes the modulation symbol of each of channels and the downlink reference signal and allocates the multiplexed signals on a predetermined resource element. The radio transmitter 1112d performs various types of signal processing on the signal from the multiplexer 1112c. For example, the radio transmitter 1112d performs processes such as conversion to the time domain using fast Fourier transform, addition of a guard interval, generation of a baseband digital signal, conversion to an analog signal, quadrature modulation, upconvert, removal of extra frequency components, and power amplification. The signal generated by the transmission processing unit 1112 is transmitted from the antenna 1113.

The storage unit 112 is a data readable/writable storage device such as DRAM, SRAM, a flash drive, and a hard disk. The storage unit 112 functions as a storage means for the communication device 110. The storage unit 112 stores desired transmission power information, operational parameters, resource holding information, and the like.

The desired transmission power information is information regarding transmission power required by the communication device 110 for information regarding transmission power necessary for transmission of radio waves, to the communication control device 130.

The operational parameter is information (for example, the setting information) related to the radio transmission operation of the communication device 110. For example, the operational parameter is information regarding the maximum value of the transmission power (maximum allowable transmission power) allowed for the communication device 110. Note that the operational parameter is not limited to the information of the maximum allowable transmission power.

In addition, the resource holding information is information related to holding of radio resources of the communication device 110. For example, the resource holding information is information of radio resources currently usable by the communication device 110. For example, the resource holding information is information regarding a holding amount of the interference margin allocated from the communication control device 130 to the communication device 110. The information regarding the holding amount may be information in units of resource blocks described below. That is, the resource holding information may be information regarding the resource block held by the communication device 110 (for example, the resource block holding amount).

The network communication unit 113 is a communication interface for communicating with other devices (for example, the communication control device 130, the intermediate device 110C, and other communication devices 110). An example of the network communication unit 113 is a local area network (LAN) interface such as a Network Interface Card (NIC). The network communication unit 113 may be a universal serial bus (USB) interface including a USB host controller, a USB port, and the like. Furthermore, the network communication unit 113 may be a wired interface or a wireless interface. The network communication unit 113 functions as a network communication means of the communication device 110. The network communication unit 113 communicates with other devices under the control of the control unit 114.

The control unit 114 is a controller that controls individual components of the communication device 110. The control unit 114 is implemented by a processor such as a central processing unit (CPU) or a micro processing unit (MPU), for example. For example, the control unit 114 is actualized by execution of various programs stored in the storage device inside the communication device 110 by the processor using random access memory (RAM) or the like as a work area. Note that the control unit 114 may be implemented by an integrated circuit such as an application specific integrated circuit (ASIC) or a field programmable gate array (FPGA). The CPU, MPU, ASIC, and FPGA can all be regarded as controllers.

The control unit 114 may be illustrated by functional blocks indicating functions executed by the control unit 114. The functional blocks may be software blocks or hardware blocks. For example, each of the functional blocks may be one software module actualized by software (including a microprogram) or one circuit block on a semiconductor chip (die). Needless to say, each of a plurality of functional blocks may be formed as one processor or one integrated circuit. The functional block may be configured by using any method. Note that the control unit 114 can be configured in any functional unit.

As described above, the control unit 124 of the terminal device 120 may have individual functional blocks included in the control unit 114 of the communication device 110. In this case, the description of the "communication device 110" in the following description can be appropriately replaced with the "terminal device 120". In addition, the description of "control unit 124" appearing in the following description can also be replaced with "control unit 114" as appropriate.

<2-3. Configuration of Intermediate Device>

Figure 8:
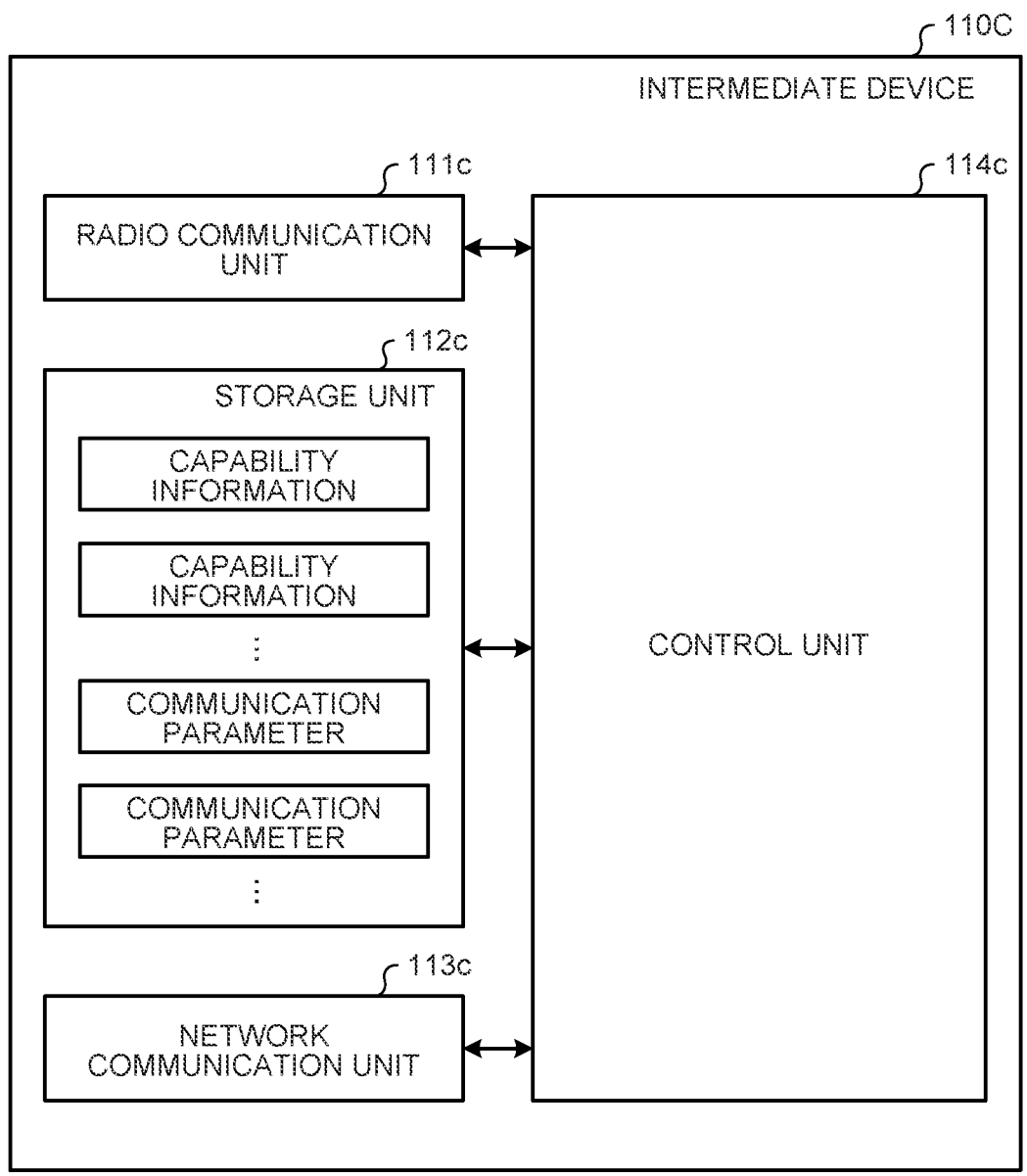
FIG. 8 is a diagram illustrating a configuration example of an intermediate device according to the embodiment of the present disclosure.

Next, a configuration of the intermediate device 110C will be described. FIG. 8 is a diagram illustrating a configuration example of the intermediate device 110C according to the embodiment of the present disclosure. The intermediate device 110C is a communication device that communicates with the communication device 110 and the communication control device 130. The intermediate device 110C is a type of information processing device.

The intermediate device 110C includes a radio communication unit 111c, a storage unit 112c, a network communication unit 113c, and a control unit 114c. Note that the configuration illustrated in FIG. 8 is a functional configuration, and the hardware configuration may be different from this. Furthermore, the functions of the intermediate device 110C may be implemented in a distributed manner in a plurality of physically separated configurations.

The radio communication unit 111c is a radio communication interface that performs radio communication with other communication devices (for example, the communication device 110, the terminal device 120, the communication control device 130, and another intermediate device 110C). The radio communication unit 111c operates under the control of the control unit 114c. The radio communication unit 111c may support one or a plurality of radio access methods. For example, the radio communication unit 111c supports both NR and LTE. The radio communication unit 111c may support other radio access methods such as W-CDMA and cdma2000. The configuration of the radio communication unit 111c is similar to that of the radio communication unit 111c of the communication device 110.

The storage unit 112c is a data readable/writable storage device such as DRAM, SRAM, a flash drive, and a hard disk. The storage unit 112c functions as a storage means in the intermediate device 110C. The storage unit 112c may store unique information, communication parameters, and the like of each of the subordinate communication device 110 (alternatively, the terminal device 120 further subordinate to the subordinate communication device 110).

The network communication unit 113c is a communication interface for communicating with other devices (for example, the communication device 110, the communication control device 130, and other intermediate devices 110C). For example, the network communication unit 113c is a LAN interface such as an NIC. The network communication unit 113c may be a USB interface including a USB host controller, a USB port, and the like. Furthermore, the network communication unit 113c may be a wired interface or a wireless interface. The network communication unit 113c functions as a network communication means of the intermediate device 110C. The network communication unit 113c communicates with other devices under the control of the control unit 114c.

The control unit 114c is a controller that controls individual parts of the intermediate device 110C. The control unit 114c is actualized by a processor such as a CPU or an MPU, for example. For example, the control unit 114c is actualized by the processor executing various programs stored in the storage device inside the intermediate device 110C using RAM or the like as a work area. Note that the control unit 114c may be implemented by an integrated circuit such as an ASIC or an FPGA. The CPU, MPU, ASIC, and FPGA can all be regarded as controllers.

The control unit 114c may be illustrated by functional blocks indicating functions executed by the control unit 114c. The functional blocks may be software blocks or hardware blocks. For example, each of the functional blocks may be one software module actualized by software (including a microprogram) or one circuit block on a semiconductor chip (die). Needless to say, each of a plurality of functional blocks may be formed as one processor or one integrated circuit. The functional block may be configured by using any method. Note that the control unit 114c can be configured in any functional unit.

The operations of individual functional blocks constituting the control unit 114c may be similar to the operations of individual blocks constituting the control unit 114 of the communication device 110. In this case, the description of the "intermediate device 110C" in the following description can be appropriately replaced with the "communication device 110". Similarly, the description of "control unit 114" in the following description can be appropriately replaced with the "control unit 114c".

<2-4. Configuration of Communication Control Device>

The communication control device 130 is a device that controls radio communication of the communication device 110. The communication control device 130 may control radio communication of the terminal device 120 via the communication device 110 or directly. The communication control device 130 is a type of information processing device.

Figures 9, 10:
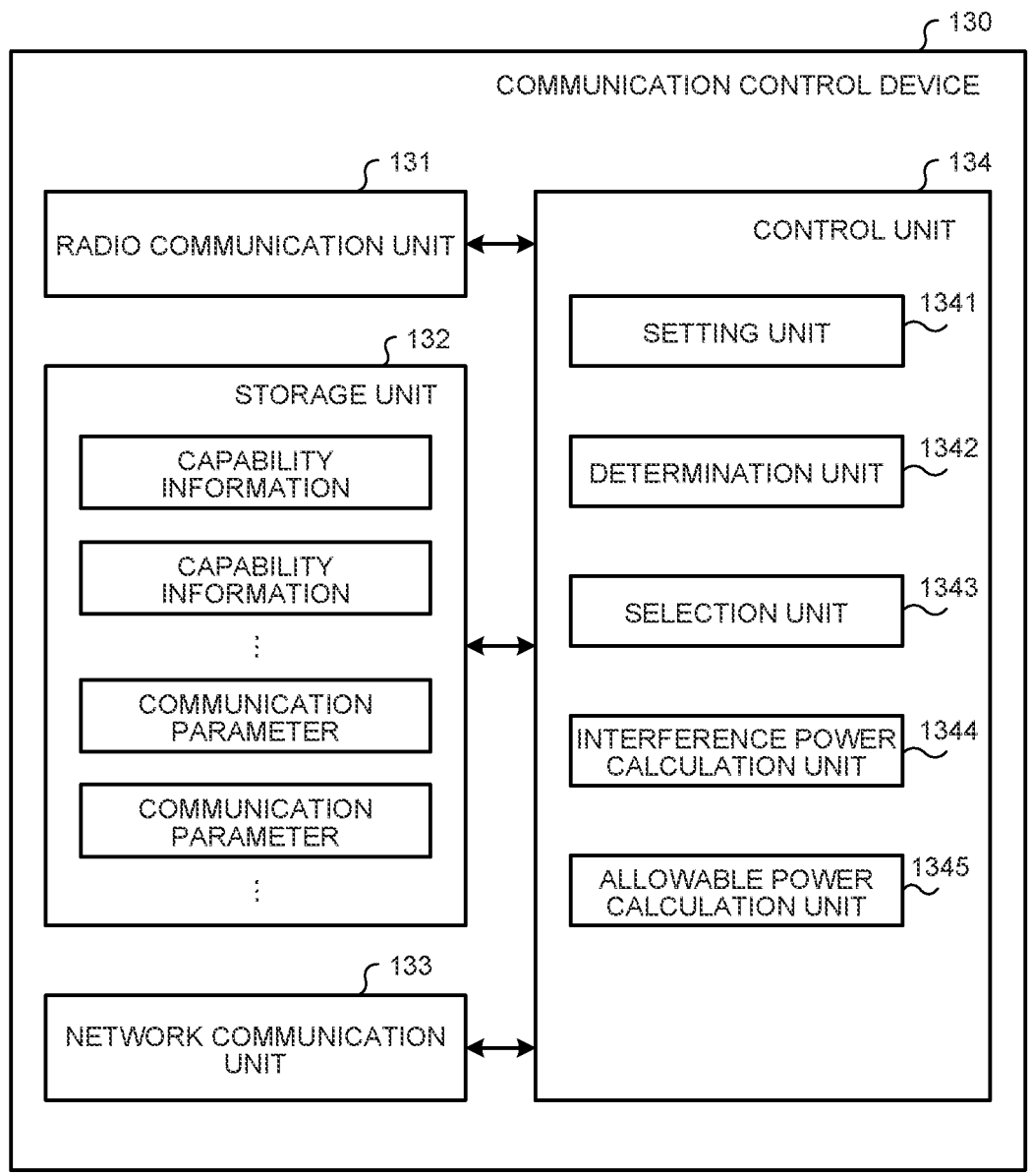
FIG. 9 is a diagram illustrating a configuration example of a communication control device according to the embodiment of the present disclosure.
FIG. 10 is a diagram cited from Table 5.6-1 of 3GPP TS36.104 and is a diagram related to Transmission bandwidth configuration NRB in E-UTRA channel bandwidths.

FIG. 9 is a diagram illustrating a configuration example of the communication control device 130 according to the embodiment of the present disclosure. The communication control device 130 includes a radio communication unit 131, a storage unit 132, a network communication unit 133, and a control unit 134. Note that the configuration illustrated in FIG. 9 is a functional configuration, and the hardware configuration may be different from this. Furthermore, the functions of the communication control device 130 may be implemented in a distributed manner in a plurality of physically separated configurations. For example, the communication control device 130 may be constituted with a plurality of server devices.

The radio communication unit 131 is a radio communication interface that performs radio communication with other communication devices (for example, the communication device 110, the terminal device 120, the intermediate device 110C, and other communication control device(s) 130). The radio communication unit 131 operates under the control of the control unit 134. The radio communication unit 131 may support one or a plurality of radio access methods. For example, the radio communication unit 131 supports both NR and LTE. The radio communication unit 131 may support other radio access methods such as W-CDMA and cdma2000. The configuration of the radio communication unit 131 is similar to that of the radio communication unit 111 of the communication device 110.

The storage unit 132 is a data readable/writable storage device such as DRAM, SRAM, a flash drive, and a hard disk. The storage unit 132 functions as a storage means for the communication device 110. The storage unit 132 stores operational parameters of each of the plurality of communication devices 110 constituting the communication network system 100. Note that the storage unit 132 may store the resource holding information of each of the plurality of communication devices 110 constituting the communication network system 100. As described above, the resource holding information is information regarding holding of the radio resource of the communication device 110.

The network communication unit 133 is a communication interface for communicating with other devices (for example, the communication device 110, the intermediate device 110C, and other communication control device(s) 130). The network communication unit 133 may be a network interface or a device connection interface. For example, the network communication unit 133 may be a local area network (LAN) interface such as a Network Interface Card (NIC). In addition, the network communication unit 133 may be a universal serial bus (USB) interface including a USB host controller, a USB port, and the like. Furthermore, the network communication unit 133 may be a wired interface or a wireless interface. The network communication unit 133 functions as a communication means in the communication control device 130. Under the control of the control unit 134, the network communication unit 133 communicates with the communication device 110, the terminal device 120, and the intermediate device 110C.

The control unit 134 is a controller that controls individual parts of the communication control device 130. The control unit 134 is actualized by a processor such as a CPU or an MPU, for example. For example, the control unit 134 is actualized by a processor executing various programs stored in a storage device inside the communication control device 130 using RAM or the like as a work area. Note that the control unit 134 may be implemented by an integrated circuit such as an ASIC or an FPGA. The CPU, MPU, ASIC, and FPGA can all be regarded as controllers.

As illustrated in FIG. 9, the control unit 134 includes a setting unit 1341, a determination unit 1342, a selection unit 1343, an interference power calculation unit 1344, and an allowable power calculation unit 1345. Individual functional blocks (the setting unit 1341 to the allowable power calculation unit 1345) constituting the control unit 134 are functional blocks individually indicating functions of the control unit 134. These functional blocks may be software blocks or hardware blocks. For example, each of the functional blocks described above may be one software module realized by software (including a microprogram) or one circuit block on a semiconductor chip (die). Needless to say, each of the functional blocks may be formed as one processor or one integrated circuit. The functional block may be configured by using any method. Note that the control unit 134 may be configured in a functional unit different from the above-described functional block. The operation of individual blocks constituting the control unit 134 will be described below.

Note that the control unit 114 of the communication device 110 and the control unit 114c of the intermediate device 110C may have respective functional blocks (the setting unit 1341 to the allowable power calculation unit 1345) included in the control unit 134 of the communication control device 130. In this case, the description of the "communication control device 130" in the following description can be appropriately replaced with the "communication device 110" or the "intermediate device 110C". In addition, the description of the "control unit 134", the "setting unit 1341", the "determination unit 1342", the "selection unit 1343", the "interference power calculation unit 1344", and the "allowable power calculation unit 1345" in the following description can also be appropriately replaced with the "control unit 114" or the "control unit 114c".

3. DESCRIPTION OF VARIOUS PROCEDURES ASSUMED IN PRESENT EMBODIMENT

Here, a basic procedure applicable in the implementation of the present embodiment will be described. Note that description up to <3-5.> below will be given on the assumption that the communication device 110 is mainly implemented in the communication device 110A (or the communication device 110B).

<3-1. Registration Procedure>

The registration procedure is a procedure of registering information of a radio system (primary system or secondary system) that intends to use the shared frequency band. More specifically, the registration procedure is a procedure of registering a device parameter related to the communication device 110 of the radio system onto the communication control device 130. Typically, a registration procedure is started when the communication device 110 representing a radio system to use the shared frequency band notifies the communication control device 130 of a registration request including a device parameter. Note that, in a case where a plurality of communication devices 110 belong to a radio system to use the shared frequency band, the device parameter of each of the plurality of communication devices 110 is included in the registration request. Furthermore, a device that transmits the registration request as a representative of the radio system may be appropriately determined.

<3-1-1. Details of Required Parameters>

The device parameter refers to the following information, for example.

Information regarding the user of the communication device 110 (hereinafter, described as user information.)

Information unique to the communication device 110 (hereinafter, described as unique information.)

Information regarding the position of the communication device 110 (hereinafter, described as location information.)

Information regarding an antenna included in the communication device 110 (hereinafter, referred to as antenna information.)

Information regarding the wireless interface included in the communication device 110 (hereinafter, it is described as wireless interface information.)

Legal information regarding communication device 110 (hereinafter, described as legal information.)

Information regarding the installer of the communication device 110 (hereinafter, described as installer information.)

Information regarding the group to which the communication device 110 belongs (group information)

Note that the device parameter is not limited to the above. Information other than these may be handled as device parameters. Note that the device parameter does not need to be transmitted by one registration request, and may be divided and transmitted a plurality of times. That is, a plurality of registration requests may be transmitted for one registration procedure. In this manner, one procedure or one process in one procedure may be performed a plurality of times. The similar applies to the procedure described below.

The user information is information related to the user of the communication device 110. Assumable examples include a user ID, an account name, a user name, a user contact, and a call sign. The user ID and the account name may be independently generated by the user of the communication device 110 or may be issued in advance by the communication control device 130. Regarding the call sign, it is desirable to use a call sign issued by the NRA.

The user information can be used for the purpose of interference resolution, for example. As a specific example, user information is utilized when the communication control device 130 performs use suspension determination on the spectrum being used by the communication device 110 in the spectrum use notification/heartbeat procedure to be described below and gives an instruction based on the use suspension determination, or when the spectrum use notification/heartbeat request of the spectrum is continuously notified. In this case, the communication control device 130 can notify the user contact included in the user information of the behavior confirmation request of the communication device 110 regarding possible occurrence of a failure in the communication device 110. Not limited to this example, when it is determined that the communication device 110 is performing an operation against the communication control performed by the communication control device 130, the communication control device 130 is capable of making a contact using user information.

The unique information is information that can specify the communication device 110, product information of the communication device 110, information regarding hardware or software of the communication device 110, and the like.

The information that can specify the communication device 110 can include, for example, a manufacturing number (serial number) of the communication device 110, an ID of the communication device 110, and the like. The ID of the communication device 110 may be uniquely assigned by the user of the communication device 110, for example.

The product information regarding the communication device 110 can include, for example, an authentication ID, a product model number, manufacturer information, and the like. The authentication ID is ID given from an authentication organization in each country or region, such as an FCC ID in the United States, CE number in Europe, and a technical standard conformity certification (technical standard) in Japan, for example. An ID issued by an industry association or the like based on a unique authentication program may also be regarded as the authentication ID.

The unique information unique represented by these can be used for the purpose of whitelist or blacklist application. For example, in a case where any information regarding the communication device 110 in operation is included in the blacklist, the communication control device 130 can instruct the communication device 110 to perform spectrum use suspension in the spectrum use notification/heartbeat procedure to be described below. Furthermore, the communication control device 130 can take a behavior of not canceling the action of use suspension until the communication device 110 is removed from the blacklist. Furthermore, for example, the communication control device 130 can reject registration of the communication device 110 included in the blacklist. Furthermore, for example, the communication control device 130 can perform an operation of not taking the communication device 110 corresponding to information included in a blacklist into consideration at the interference calculation described in the present disclosure, or operation of taking only the communication device 110 corresponding to information included in a whitelist into consideration at the interference calculation.

The information regarding the hardware of the communication device 110 can include transmission power class information, for example. For example, the US FCC Code of Federal Regulations (C.F.R) Part 96 defines two types of classes Category A and Category B as the transmission power class information. Information regarding the hardware of the communication device 110 conforming to the definition can include information indicating which of the two types of classes the transmission power belongs to. In addition, 3rd Generation Partnership Project (3GPP) Technical Specification (TS) 36.104 and TS 38.104 also define some classes of eNodeB and gNodeB, and these definitions are also applicable.

The transmission power class information may be used, for example, in an application of interference calculation. The interference calculation can be performed using the maximum transmission power defined for each class as the transmission power of the communication device 110.

The information regarding the software of the communication device 110 can include, for example, version information, a build number, and the like regarding an execution program in which processing necessary for interaction with the communication control device 130 is described. In addition, the information may include version information, a build number, and the like of software for operating as the communication device 110.

The location information is typically information that can specify the geographical position of the communication device 110. For example, the location information is coordinate information acquired by a positioning function represented by a global positioning system (GPS), Beidou, a Quasi-Zenith Satellite System (QZSS), Galileo, or an assisted global positioning system (A-GPS). Typically, the location information can include information regarding latitude, longitude, altitude, ground level/sea level, and positioning error. Alternatively, for example, the location information may be location information registered in an information management device managed by a National Regulatory Authority (NRA) or its agency. Alternatively, for example, it is allowable to use coordinates of an x-axis, a y-axis, and a z-axis having its origin in a specific geolocation. In addition, together with such coordinate information, an identifier indicating whether the communication device 110 exists outdoors or indoors may be attached.

Furthermore, the location information may be information indicating a region in which the communication device 110 is located. For example, it is allowable to use information indication the region defined by the government, such as a postal code and a postal address. Furthermore, for example, the region may be indicated by a set of three or more geographic coordinates. The information indicating these regions may be provided together with coordinate information.

Furthermore, in a case where the communication device 110 is located indoors, information indicating the floor of a building where the communication device 110 is located can also be included in the location information. For example, an identifier indicating which floor, whether it is on the ground or the underground, or the like, may be included in the location information. Furthermore, information indicating a further details of spatial information inside the building, such as a room number and a room name in the building, can be included in the location information, for example.

Typically, the positioning function is desirably provided by the communication device 110. However, there is a case where the performance of the location positioning function does not satisfy the required accuracy. In addition, even if the performance of the positioning function satisfies the required accuracy, the location information that satisfies the required accuracy cannot necessarily be acquired depending on the installation position of the communication device 110. Therefore, a device different from the communication device 110 may include the positioning function, and the communication device 110 may acquire information related to the position from the different device. The device having the positioning function may be an incumbent device available, or may be provided by an installer of the communication device 110. In such a case, the location information measured by the installer of the communication device 110 is to be desirably written in the communication device 110.

The antenna information is typically information indicating performance, a configuration, and the like of an antenna included in the communication device 110. Typically, for example, the antenna information can include information such as an antenna installation height, a tilt angle (Downtilt), a horizontal direction (Azimuth), an aim (Boresight), an antenna peak gain, and an antenna model.

The antenna information can also include information regarding a formable beam. For example, it is allowable to include information such as a beamwidth, a beam pattern, and an analog or digital beamforming capability.

In addition, the antenna information can also include information related to performance and a configuration of Multiple Input Multiple Output (MIMO) communication. For example, information such as the number of antenna elements and the maximum number of spatial streams can be included. In addition, codebook information to be used, weight matrix information, and the like can also be included. The weight matrix information includes a unitary matrix, a zero-forcing (ZF) matrix, and a minimum mean square error (MMSE) matrix, and these are obtained by techniques such as singular value decomposition (SVD), eigen value decomposition (EVD), and block diagonalization (BD). Furthermore, in a case where the communication device 110 includes a function such as maximum likelihood detection (MLD) that requires nonlinear calculation, information indicating the included function may be included in the antenna information.

The antenna information may include Zenith of Direction, Departure (ZoD). The ZoD is a type of radio wave arrival angle. Note that, instead of being notified from the communication device 110, ZoD may be estimated and notified by another communication device 110 based on the radio waves emitted from the antenna of the communication device 110. In this case, the communication device 110 may be a device that operates as a base station or an access point, a device that performs D2D communication, a moving relay base station, or the like. The ZoD can be estimated by a radio wave arrival direction estimation technology such as Multiple Signal Classification (MUSIC) or Estimation of Signal Propagation via Rotation Invariance Techniques (ESPRIT). The ZoD can also be used as measurement information by the communication control device 130.

The wireless interface information is typically information indicating a wireless interface technology provided in the communication device 110. For example, identifier information indicating a technology used in GSM (registered trademark), CDMA 2000, UMTS, E-UTRA, E-UTRA NB-IoT, 5G NR, 5G NR NB-IoT, or a cellular system in subsequent generations can be included as the wireless interface information. Moreover, identifier information indicating a derivative technology based on Long Term Evolution (LTE)/5G such as MulteFire, Long Term Evolution-Unlicensed (LTE-U), or NR-Unlicensed (NR-U) can be included. In addition, identifier information indicating a standard technology such as a metropolitan area network (MAN) such as WiMAX or WiMAX2+, or a wireless LAN of the IEEE 802.11 series, can also be included. Further, the information may be identifier information indicating an extended global platform (XGP) or a shared XGP (sXGP). The information may be identifier information of a communications technology for Local Power, Wide Area (LPWA). Identifier information indicating a proprietary radio technology can also be included. In addition, a version number or a release number of the technical specification that specifies these technologies may also be included as the wireless interface information.

The wireless interface information can also include frequency band information supported by the communication device 110. For example, the frequency band information may be represented by an upper limit frequency, a lower limit frequency, a center frequency, a bandwidth, a 3GPP Operating Band number, or a combination of at least two of these. In addition, one or more pieces of frequency band information may be included in the wireless interface information.

The frequency band information supported by the communication device 110 can further include information indicating capability regarding bandwidth extension technology such as carrier aggregation (CA) and channel bonding. For example, combinable band information or the like can be included. Furthermore, the carrier aggregation can also include information regarding a band to be used as a primary component carrier (PCC) or a secondary component carrier (SCC). Also, the number of component carriers (the number of CCs) that can be aggregated at the same time can be included.

The frequency band information supported by the communication device 110 may further include combination information of frequency bands supported by Dual Connectivity and Multi Connectivity. In addition, information regarding other communication devices 110 that cooperatively provide the Dual Connectivity and Multi Connectivity may be provided together. The communication control device 130 may determine the communication control disclosed in the present embodiment in consideration of another communication device 110 having a cooperative relationship or the like in the subsequent procedures.

The frequency band information supported by the communication device 110 may also include information indicating radio wave utilization priority such as PAL and GAA.

The wireless interface information can also include modulation scheme information supported by the communication device 110. For example, as a representative example, information indicating a primary modulation scheme such as frequency shift keying (FSK), n-value Phase Shift Keying (PSK, where n is a multiplier of 2, such as 2, 4, 8, etc.), and n-value Quadrature Amplitude Modulation (QAM, where n is a multiplier of 4, such as 4, 16, 64, 256, 1024, etc.) can be included. Furthermore, information indicating a secondary modulation scheme such as orthogonal frequency division multiplexing (OFDM), scalable OFDM, DFT spread OFDM (DFT-s-OFDM), Generalized Frequency Division Multiplexing (GFDM), and filter bank multi carrier (FBMC) may be included.

The wireless interface information can also include information related to an error correction code. For example, the information can include capabilities regarding a turbo code, a low density parity check (LDPC) code, a polar code, and an erasure correction code, as well as coding rate information to be applied.

The modulation scheme information and the information related to the error correction code can also be expressed by a Modulation and Coding Scheme (MCS) index as another aspect.

In addition, the wireless interface information can also include information indicating functions specific to each of radio technology specification supported by the communication device 110. For example, there is transmission mode (TM) information defined in LTE, as a representative example. In addition, information having two or more modes with respect to a specific function can be included in the wireless interface information as in the TM information. In addition, in a case where, in the technical specification, the communication device 110 supports a function that is not essential in the specification even in the absence of two or more modes, information indicating the support function can also be included.

The wireless interface information can also include radio access method (radio access technology (RAT)) information supported by the communication device 110. For example, the information can include information indicating Time Division Multiple Access (TDMA), Frequency Division Multiple Access (FDMA), Orthogonal Frequency Division Multiple Access (OFDMA), Power Division Multiple Access (PDMA), Code Division Multiple Access (CDMA), Sparse Code Multiple Access (SCMA), Interleave Division Multiple Access (IDMA), Spatial Division Multiple Access (SDMA), Carrier Sense Multiple Access/Collision Avoidance (CSMA/CA), and Carrier Sense Multiple Access/Collision Detection (CSMA/CD). Note that TDMA, FDMA, and OFDMA are classified into Orthogonal Multiple Access (OMA). PDMA, CDMA, SCMA, IDMA, and SDMA are classified into Non-Orthogonal Multiple Access (NOMA). A representative example of the PDMA is a method implemented by a combination of Superposition Coding (SPC) and Successive Interference Canceller (SIC). CSMA/CA and CSMA/CD are classified into a connection scheme referred to as opportunistic access scheme.

When information indicating an opportunistic access scheme is included in the wireless interface information, information indicating details of the access scheme may be further included. As a specific example, the information may include information indicating the wireless interface information indicates which one of Frame Based Equipment (FBE) and Load Based Equipment (LBE) defined in ETSI EN 301 598.

When the wireless interface information indicates LBE, it is allowable to further include information specific to LBE, such as Priority Class defined in ETSI EN 301 598.

In addition, the wireless interface information can also include information regarding a duplex mode supported by the communication device 110. As a representative example, information regarding schemes such as frequency division duplex (FDD), time division duplex (TDD), and full duplex (FD) can be included.

In a case where TDD is included as the wireless interface information, TDD frame structure information used or supported by the communication device 110 can be added. Furthermore, information regarding the duplex mode may be included for each frequency band indicated by frequency band information.

When the FD is included as the wireless interface information, information related to an interference power detection level may be included.

The wireless interface information can also include information related to a transmission diversity method supported by the communication device 110. For example, space time coding (STC) or the like may also be included.

The wireless interface information can also include guardband information. For example, it is possible to include information related to a predetermined guardband size predetermined for the wireless interface. Alternatively, for example, information regarding a guardband size desired by the communication device 110 may be included.

The wireless interface information may be provided for each frequency band regardless of the above-described aspect.

The legal information typically corresponds to information related to regulations that the communication device 110 must comply with, which are defined by radio administration agencies in different countries and regions or equivalent organizations, authentication information acquired by the communication device 110, and the like. The information regarding regulations typically includes, for example, upper limit value information of out-of-band emission, information regarding a blocking characteristic of the receiver, and the like. Typically, the authentication information can include information such as type approval information, legal/regulatory information serving as a reference of authentication acquisition, for example. The type approval information corresponds to, for example, FCC ID of the United States, technical standard conformity certification of Japan, and the like. The legal/regulatory information corresponds to, for example, an FCC regulation number of the United States, an ETSI Harmonized Standard number of Europe, and the like.

Among the legal information, information related to a numerical value may be substituted by information defined in the specification of the wireless interface technology. The specification of the wireless interface technology corresponds to 3GPP TS 36.104 and TS 38.104, for example. These specifications define an Adjacent channel leakage ratio (ACLR). Instead of the upper limit value information of the out-of-band radiation, the upper limit value of the out-of-band radiation may be derived and used by using the ACLR defined in the specification. In addition, the ACLR itself may be used as necessary. Furthermore, adjacent channel selectivity (ACS) may be used instead of the blocking characteristic. In addition, these may be used in combination, or an adjacent channel interference ratio (ACIR) may be used. In general, ACIR has a relationship with ACLR and ACS as in the following Formula (1). Although Formula (1) uses true value expression, it may be expressed by logarithmic expression.

$$ACIR = \left(\frac{1}{ACS} + \frac{1}{ACLR}\right)^{-1} \tag{1}$$

The installer information can include information capable of specifying a person who installs the communication device 110 (installer), unique information associated with the installer, and the like. Typically, the installer information can include information related to a person responsible for the location information of the communication device 110, which is a Certified Professional Installer (CPI) defined in Non Patent Literature 3. For example, CPI discloses Certified Professional Installer Registration ID (CPIR-ID) and a CPI name. In addition, for example, a postal address (mailing address or contact address), an e-mail address, a telephone number, a Public Key Identifier (PKI), and the like are disclosed as unique information associated with CPI. The information is not limited thereto, and other information related to the installer may be included in the installer information as necessary.

The group information can include information related to a communication device group to which a communication device 110 belongs. Specifically, for example, the information can include information related to the same or equivalent type of group as disclosed in WINNF-SSC-0010. Furthermore, in a case where a network operator manages the communication devices 110 in units of groups based on its own operation policy, for example, the group information can include information related to the group.

The information listed so far need not be provided by the communication device 110 to the communication control device 130 but may be estimated by the communication control device 130 from other information provided from the communication device 110. Specifically, for example, the guardband information can be estimated from the wireless interface information. In a case where the wireless interface used by the communication device 110 is E-UTRA or 5G NR, the guardband information can be estimated based on the E-UTRA transmission bandwidth specification described in 3GPP T536.104, the 5G NR transmission bandwidth specification described in 3GPP TS38.104, and the table described in TS38.104 illustrated in FIGS. 10 to 13.

FIG. 10 is a diagram cited from Table 5.6-1 of 3GPP TS36.104 and is a diagram related to Transmission bandwidth configuration NRB in E-UTRA channel bandwidths. FIG. 11 is a diagram cited from Table 5.3.3-1 in 3GPP TS38.104 and is a diagram related to Minimum guardband (kHz) (FR1). FIG. 12 is a diagram cited from Table 5.3.3-2 in 3GPP TS38.104 and is a diagram related to Minimum guardband (kHz) (FR2). FIG. 13 is a diagram cited from 3GPP TS38.104 Table 5.3.3-3 and is a diagram related to Minimum guardband (kHz) of SCS 240 kHz SS/PBCH block (FR2).

In other words, it is sufficient that the communication control device 130 can acquire the information listed so far, and the communication device 110 is not necessarily required to supply the information to the communication control device 130. Furthermore, the intermediate device 110C (for example, a network manager) that supervises the plurality of communication devices 110 does not need to supply the information to the communication control device 130A. Supply of information from the communication device 110 or the intermediate device 110C to the communication control device 130 or 130A is merely one means of supply of information in the present embodiment. The information listed so far represents information that can be necessary for the communication control device 130 to normally complete the present procedure, and any means of information supply may be used.

<3-1-1-1. Supplement of Required Parameters>

In the registration procedure, depending on the cases, it is assumed that not only the device parameter related to the communication device 110 but also the device parameters related to the terminal device 120 are required to be registered in the communication control device 130. In such a case, the term "communication device" in the above description <3-1-1.> may be replaced with a term "terminal device" or an equivalent term for application. In addition, a parameter specific to the "terminal device" that is not described <3-1-1.> may also be handled as a required parameter in the registration procedure. Examples of the parameters specific to the terminal device include a User Equipment (UE) category specified in 3GPP.

<3-1-2. Details of Registration Process>

As described above, the communication device 110 representing the radio system to use the shared frequency band generates a registration request including the device parameters and notifies the registration request to the communication control device 130.

Here, in a case where the device parameter includes installer information, the communication device 110 may perform falsification prevention processing or the like on the registration request by using the installer information. In addition, a part or all of the information included in the registration request may be subjected to an encryption process. Specifically, for example, a specific public key may be shared in advance between the communication device 110 and the communication control device 130, and the communication device 110 may encrypt information using a secret key corresponding to the public key. Examples of the encryption target include security sensitive information such as location information.

There may be a case where the ID and the location information of the communication device 110 is disclosed, and the communication control device 130 holds in advance the ID and the position information of the main communication device 110 existing in the coverage of the communication control device 130. In such a case, the communication control device 130 can acquire the location information from the ID of the communication device 110 that has transmitted the registration request, and thus, the position information does not need to be included in the registration request. Furthermore, it is also conceivable that the communication control device 130 returns a necessary device parameter to the communication device 110 that has transmitted the registration request, and in response to this, the communication device 110 transmits a registration request including the device parameter necessary for registration. In this manner, the information included in the registration request may be different depending on the case.

After receiving the registration request, the communication control device 130 performs a registration process regarding the communication device 110, and returns a registration response according to a processing result. When there is no lack or abnormality of information necessary for registration, the communication control device 130 records the information to an internal or external storage device and notifies normal completion. Otherwise, a registration failure is notified. In a case of normal completion of registration, the communication control device 130 may assign an ID to each communication device 110 and may notify the communication device 110 of the ID information at the time of response. In a case of the registration failure, the communication device 110 may notify the corrected registration request again. Furthermore, the communication device 110 may change the registration request and try the registration procedure until the normal completion of the process.

Note that the registration procedure might be executed even after the registration is normally completed. Specifically, for example, when the location information is changed beyond a predetermined standard due to movement of the device, accuracy improvement, or the like, the registration procedure can be executed again. The predetermined standard is typically determined by the legal system in each country or district. For example, according to 47 C.F.R. Part 15 in the United States, when a device using Mode II personal/portable white space device, that is, a device using a free frequency changes its position by 100 meters or more, the device is required to perform registration again.

<3-2. Available Spectrum Query Procedure>

The available spectrum query procedure is a procedure used by the radio system that is going to utilize the shared frequency band to make a query about information regarding the available spectrum to the communication control device 130. Note that the available spectrum query procedure does not necessarily need to be performed. Furthermore, the communication device 110 that raises a query on behalf of the radio system that is to use the shared frequency band may be the same as or different from the communication device 110 that has generated the registration request. Typically, the communication device 110 that raises a query notifies the communication control device 130 of a query request including information that can specify the communication device 110, whereby the procedure is started.

Here, typically, the available spectrum information is information indicating a spectrum that can be safely provided as a secondary use without giving fatal interference to the primary system by the communication device 110.

The available spectrum information is determined based on a secondary use prohibited area referred to as an exclusion zone, for example. Specifically, in a case where the communication device 110 is installed in a secondary use prohibited area provided for the purpose of protecting the primary system using the frequency channel F1, for example, the frequency channel F1 is not notified as an available channel to the communication device 110.

The available spectrum information can also be determined by the degree of interference given to the primary system, for example. Specifically, when it is determined, for example, that fatal interference might be given to the primary system even outside the secondary use prohibited area, the frequency channel would not be notified as an available channel in some cases. An example of a specific calculation method is described in <3-2-2.> below.

Moreover, as described above, there can also be frequency channels not to be notified as available channels because of conditions other than the primary system protection requirements. Specifically, in order to previously avoid interference that can occur between the communication devices 110, for example, a frequency channel being used by another communication device 110 existing in the neighborhood of the communication device 110 might not be notified as an available channel in some cases. In this manner, the available spectrum information set in consideration of interference with other communication devices 110 may be set as "recommended spectrum information" for example, and may be provided together with the available spectrum information. That is, the "recommended spectrum information" is desirably a subset of the available spectrum information.

Even in a case where there is an influence on the primary system, when the influence can be avoided by reducing the transmission power, the same frequency as that of the primary system or the neighboring communication device 110 can be notified as an available channel. In such a case, typically, the maximum allowable transmission power information is included in the available spectrum information. The maximum allowable transmission power is typically expressed by Equivalent Isotropic Radiated Power (EIRP). The power is not necessarily limited to this, and may be provided by a combination of conducted power and antenna gain, for example. Furthermore, the antenna gain may have an allowable peak gain set for each spatial direction.

<3-2-1. Details of Required Parameters>

Assumable information that can specify the radio system that is to use the shared frequency band includes information such as unique information registered at the time of the registration procedure, and the above-described ID information, for example.

The query request can also include query requirement information. The query requirement information can include, for example, information indicating a frequency band availability of which is desired to be obtained. Also, for example, transmission power information can be included. For example, the communication device 110 that raises a query can include the transmission power information when it is desired to know only the spectrum information likely to be available for utilization of desired transmission power.

The query requirement information does not necessarily need to be included in the query request.

The query request can also include a measurement report. The measurement report includes a result of measurement performed by the communication device 110 and/or the terminal device 120. Some or all of the measurement results may be represented by raw data or may be represented by processed data. For example, it is possible to use standardized metrics represented by Reference Signal Received Power (RSRP), Reference Signal Strength Indicator (RSSI), and Reference Signal Received Quality (RSRQ) for the measurement.

<3-2-2. Details of Available Spectrum Evaluation Process>

After receiving the query request, evaluation of the available spectrum is performed based on the query requirement information. For example, as described above, the available spectrum can be evaluated in consideration of the existence of the primary system, the secondary use prohibited area thereof, and the neighboring communication device 110.

Maximum allowable transmission power information may be derived. Typically, the maximum allowable transmission power is calculated by using allowable interference power information in the primary system or its protection zone (protective space), location information about a reference point for calculating an interference power level experienced by the primary system, registration information of the communication device 110, and a propagation loss estimation model. Specifically, as an example, calculation is performed by the following Formula (2).

$$P_{MaxTx(dBm)} = I_{Th(dBm)} + PL(d)_{(dB)} \tag{2}$$

Here, PMaxTx(dBm) is maximum allowable transmission power, ITh(dBm) is allowable interference power (limit value of allowable interference power), d is a distance between a predetermined reference point and the communication device 110, and PL(d) (dB) is a propagation loss at the distance d. Although the antenna gain in the transceiver is not included in Formula (2), the antenna gain in the transceiver may be included in accordance with a method of expressing the maximum allowable transmission power (EIRP, conducted power, etc.) or a reference point for the reception power (antenna input point, antenna output point, and the like). In addition, the feeder loss may be taken in consideration as necessary. The present embodiment is applied when deriving the maximum allowable transmission power information, for example. Details will be described below.

In addition, Formula (2) is described based on the assumption that a single communication device 110 is an interference source (single station interference). For example, in a case where it is necessary to consider aggregated interference from a plurality of communication devices 110 at the same time, a correction value may be added. Specifically, for example, the correction value can be determined based on three types (Fixed/Predetermined, Flexible, and Flexible Minimized) of interference margin methods disclosed in Non Patent Literature 4 (ECC Report 186).

Note that the allowable interference power information itself is not necessarily directly available as in Formula (2). For example, when a required signal power-to-interference power ratio (SIR), a signal to interference plus noise ratio (SINR), an interference-to-noise ratio (INR), and the like of the primary system are available, they may be converted into allowable interference power and used. Such conversion processing is not limited to this processing, and may be applied to processing of other procedures.

Note that, although Formula (2) is expressed using logarithms, the mathematical expression may naturally be converted into a true number to be used at the time of implementation. In addition, all parameters in logarithmic notation described in the present disclosure may be appropriately converted into true numbers and used.

Further, when the above-described transmission power information is included in the query requirement information, the available frequency can be evaluated by a method different from the above method. Specifically, in an exemplary case where it is assumed that desired transmission power indicated by transmission power information is used and when an estimated interfering amount is less than the allowable interference power in the primary system or its protection zone, it is determined that the frequency channel is available, and the communication device 110 is notified of the information.

Furthermore, in a case where an area or a space in which the communication device 110 can use the shared frequency band is determined in advance, similarly to an area of a radio environment map (REM), for example, the available spectrum information may be derived simply based on only coordinates (x-axis, y-axis, and z-axis coordinates of latitude, longitude, and ground level of the communication device 110) included in the location information of the communication device 110. Furthermore, in a case where a lookup table associating the coordinates of the location of the communication device 110 with available spectrum information is prepared, for example, it is also allowable to derive the available spectrum information based on only the location information of the communication device 110. In this manner, there are various methods for determining the available spectrum, and the method is not limited to the example of the present disclosure.

Furthermore, in a case where the communication control device 130 has acquired information regarding capability of a bandwidth extension technology such as carrier aggregation (CA) or channel bonding as frequency band information supported by the communication device 110, the communication control device 130 may include an available combination, a recommended combination, or the like of these pieces of information in the available spectrum information.

Furthermore, in a case where the communication control device 130 has acquired information regarding a combination of frequency bands supported by the dual connectivity and the multi connectivity as the frequency band information supported by the communication device 110, the communication control device 130 may include information such as an available spectrum and a recommended spectrum in the available spectrum information for the dual connectivity and the multi connectivity.

In addition, when the imbalance of the maximum allowable transmission power occurs between the plurality of frequency channels in a case of providing the available frequency information for the bandwidth extension technology as described above, the available spectrum information may be provided after adjusting the maximum allowable transmission power of each frequency channel. For example, it is allowable, from a perspective of primary system protection, to set the maximum allowable transmission power of each frequency channel to be equalized with the maximum allowable transmission power of a frequency channel having a low maximum power spectral density (PSD).

The evaluation of the available spectrum does not necessarily need to be performed after reception of the query request. For example, after the normal completion of the above-described registration procedure, the communication control device 130 may proactively perform the procedure without any query request. In such a case, it is also allowable to create an REM or a lookup table exemplified above or an equivalent information table.

In addition, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, as disclosed in Non Patent Literature 3, in a case where information regarding the communication device 110 (referred to as Cluster List in Non Patent Literature 3) that performs high priority use (for example, PAL) is registered in the communication control device 130 in advance by the user, evaluation may be performed based on the information.

After the evaluation of the available spectrum is completed, the communication control device 130 notifies the communication device 110 of the evaluation result.

The communication device 110 may select a desired communication parameter by using the evaluation result received from the communication control device 130.

<3-3. Spectrum Grant Procedure>

The spectrum grant procedure is a procedure for the radio system that is to use the shared frequency band to receive the secondary use grant for the spectrum from the communication control device 130. The communication device 110 that performs the spectrum grant procedure as a representative of the radio system may be the same as or different from the communication device 110 that has performed the procedure so far. Typically, the communication device 110 notifies the communication control device 130 of a spectrum grant request including information that can specify the communication device 110, whereby the procedure is started. As described above, the available spectrum query procedure is not essential. Therefore, the spectrum grant procedure may be performed next to the available spectrum query procedure, or may be performed next to the registration procedure.

In the present embodiment, it is assumed that at least the following two types of spectrum grant request method are usable.

Designation method
Flexible method

The designation method is a request method in which the communication device 110 designates a desired communication parameter and requests the communication control device 130 to permit operation based on the desired communication parameter. The desired communication parameter includes, but is not particularly limited to, a frequency channel to be used, a maximum transmission power, and the like. For example, a wireless interface technology specific parameter (such as a modulation scheme or a duplex mode) may be designated. In addition, information indicating radio wave utilization priority such as PAL and GAA may be included in the parameter.

The flexible method is a request method in which the communication device 110 designates only a requirement regarding a communication parameter and requests the communication control device 130 to designate a communication parameter that can achieve secondary use grant while satisfying the requirement. Examples of the requirement related to the communication parameter include, but are not particularly limited to, a bandwidth, a desired maximum transmission power, or a desired minimum transmission power. For example, a wireless interface technology specific parameter (such as a modulation scheme or a duplex mode) may be designated. Specifically, for example, one or more parameters of TDD Frame Structure may be selected in advance and notified.

Similarly to the query request, the spectrum grant request may also include the measurement report in either the designation method or the flexible method. The measurement report includes a result of measurement performed by the communication device 110 and/or the terminal device 120. The measurement may be represented by raw data or processed data. For example, it is possible to use standardized metrics represented by Reference Signal Received Power (RSRP), Reference Signal Strength Indicator (RSSI), and Reference Signal Received Quality (RSRQ) for the measurement.

The scheme information used by the communication device 110 may be registered in the communication control device 130 at the time of the registration procedure described in <3-1.>.

<3-3-1. Details of Spectrum Grant Process>

After receiving the spectrum grant request, the communication control device 130 performs spectrum grant process based on the spectrum grant request method. For example, using the method described in <3-2.>, it is possible to perform the spectrum grant process in consideration of the primary system, the secondary use prohibited area, the presence of the communication device 110 in the vicinity, and the like. The present embodiment is applied to the spectrum grant process, for example. Details will be described below.

When the flexible method is used, the maximum allowable transmission power information may be derived using the method described in <3-2-2.>. Typically, the maximum allowable transmission power is calculated by using allowable interference power information in the primary system or its protection zone, location information regarding the reference point for calculating an interference power level experienced by the primary system, registration information of the communication device 110, and a propagation loss estimation model. Specifically, as an example, calculation is performed by the following Formula (2).

In addition, as described above, Formula (2) is described based on the assumption that a single communication device 110 is an interference source. For example, in a case where it is necessary to consider aggregated interference from a plurality of communication devices 110 at the same time, a correction value may be added. Specifically, for example, the correction value can be determined based on three types of method (Fixed/Predetermined, Flexible, and Flexible Minimized) disclosed in Non Patent Literature 4 (ECC Report 186).

The communication control device 130 can use various propagation loss estimation models in a spectrum grant procedure, an available spectrum evaluation process for an available spectrum query request, and the like. When a model is designated for each application, it is desirable to use the designated model. For example, in Non Patent Literature 3 (WINNF-TS-0112), a propagation loss model such as Extended Hata (eHATA) or Irregular Terrain Model (ITM) is adopted for each application. Certainly, the propagation loss model is not limited thereto.

There are also propagation loss estimation models that require information related to radio wave propagation paths. The information regarding the radio wave propagation path may include information such as information indicating presence or absence of line-of-sight (line-of-sight: LOS, Non line-of-sight: NLOS), terrain information (undulations, sea levels, etc.), and environmental information (Urban, Suburban, Rural, Open Sky, etc.). When using the propagation loss estimation model, the communication control device 130 may estimate these pieces of information from the already acquired registration information of the communication device 110 or information of the primary system. Alternatively, when there is a parameter designated in advance, it is desirable to use the parameter.

When a propagation loss estimation model is not designated in a given application, the model may be selectively used as necessary. As a specific example, for example, it is possible to selectively use models in such a way as to use a model that calculates the loss as low such as a free space loss model when estimating the interfering power to another communication device 110 and use a model that calculates the loss as high when estimating the coverage of the communication device 110.

In addition, in a case where the designated propagation loss estimation model is used, as an example, the spectrum grant process can be performed by evaluating the interfering risk. Specifically, in an exemplary case where it is assumed that desired transmission power indicated by transmission power information is used and when an estimated interfering amount is less than the allowable interference power in the primary system or its protection zone, it is determined that the use of the frequency channel is allowable, and the communication device 110 is notified of the information.

In any method of the designation method and the flexible method, similarly to the query request, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, in a case where information regarding the communication device 110 that performs high priority use (for example, PAL) is registered in the communication control device 130 in advance from the user, evaluation may be performed based on the information. For example, in Non Patent Literature 3 (WINNF-TS-0112), information regarding the communication device 110 is referred to as a cluster list.

The spectrum grant process does not necessarily have to be performed in response to the reception of the spectrum grant request. For example, after normal completion of the registration procedure described above, the communication control device 130 may proactively perform the spectrum grant process without any spectrum grant request. Furthermore, for example, the spectrum grant process may be performed at regular intervals. In such a case, it is also allowable to create the above-described REM, lookup table, or an information table similar to these. This determines the frequency to be permitted only by the location information, making it possible for the communication control device 130 to quickly return a response after receiving the spectrum grant request.

<3-4. Spectrum Use Notification/Heartbeat>

The spectrum use notification/heartbeat is a procedure in which the radio system using the shared frequency band notifies the communication control device 130 of the spectrum use based on the communication parameter allowed to be used in the spectrum grant procedure. The communication device 110 that performs the spectrum use notification/heartbeat as a representative of the radio system may be the same as or different from the communication device 110 that has performed the procedure so far. Typically, the communication device 110 notifies the communication control device 130 of a notification message including information that can specify the communication device 110.

The spectrum use notification/heartbeat is desirably performed periodically until the use of the spectrum is rejected from the communication control device 130. In that case, the spectrum use notification/heartbeat is also referred to as a heartbeat.

After receiving the spectrum use notification/heartbeat, the communication control device 130 may determine whether to start or continue the spectrum use (in other words, radio wave transmission at the permissible frequency). Examples of the determination method include confirmation of the spectrum use information of the primary system. Specifically, the start/continuation permission or refusal for the spectrum use (radio transmission in permitted spectrum) can be determined based on a change in the spectrum used by the primary system, a change in the status of spectrum used by the primary system with no steady use of radio waves (for example, United States CBRS in-ship radar), or the like. After permission of the start or continuation, the communication device 110 may start or continue spectrum utilization (radio wave transmission at a permitted spectrum).

After receiving the spectrum use notification/heartbeat, the communication control device 130 may instruct the communication device 110 to reconfiguration of the communication parameters. Typically, the reconfiguration of the communication parameters can be instructed in the response of the communication control device 130 to the spectrum use notification/heartbeat. For example, information regarding recommended communication parameters (hereinafter, referred to as recommended communication parameter information) can be provided. The communication device 110 to which the recommended communication parameter information has been provided desirably performs the spectrum grant procedure described in <3-4.> again using the recommended communication parameter information.

<3-5. Supplement to Various Procedures>

Here, the various procedures described above do not necessarily need to be individually implemented as described below. For example, the two different procedures may be implemented by substituting a third procedure with the roles of the two different procedures. Specifically, the registration request and the available spectrum information query request may be integrally notified, for example. Furthermore, for example, the spectrum grant procedure and the spectrum use notification/heartbeat may be integrally performed. Naturally, the implementation of procedures is not limited to these combinations, and three or more procedures may be performed integrally. Furthermore, as described above, one procedure may be separately performed a plurality of times.

In addition, the expression of "acquire" or an expression equivalent thereto in the present disclosure does not necessarily mean that the information is acquired precisely following the procedure described in the present disclosure. For example, even with a description that the location information of the communication device 110 is used in the available spectrum evaluation process, it means it is not always necessary to use the information acquired in the registration procedure. For example, when the location information is included in the available spectrum query procedure request, the location information may be used. In other words, the procedure for acquisition described in the present disclosure is an example, and acquisition by other procedures is also permitted within the scope of the present disclosure and within the scope of technical feasibility.

In addition, the information described to be included in the response from the communication control device 130 to the communication device 110 may be actively notified from the communication control device 130 by the push method when applicable. As a specific example, available spectrum information, recommended communication parameter information, radio transmission continuation/refusal notification, and the like may be notified by push notification.

<3-6. Various Procedures Related to Terminal>

The description has been made mainly on the assumption of the processing in the communication device 110A. However, in some embodiments, not only the communication device 110A but also the terminal device 120 and the communication device 110B can operate under the management of the communication control device 130. That is, there is a conceivable scenario in which the communication parameter is determined by the communication control device 130. Even in these cases, it is basically possible to use individual procedures described in <3-1.> to <3-4.>. However, unlike the communication device 110A, the terminal device 120 and the communication device 110B need to use the spectrum managed by the communication control device 130 for the backhaul link, and cannot perform radio transmission without permission. Therefore, it is desirable to start backhaul communication for the purpose of accessing the communication control device 130 only after detecting a radio wave or an authorization signal transmitted by the communication device 110A (communication device 110 capable of providing wireless communication service or master communication device 110 in master-slave system).

On the other hand, under the management of the communication control device 130, it is conceivable to set allowable communication parameters for the purpose of primary system protection also in the terminal and the communication device 110B. However, the communication control device 130 has no prior knowledge of location information and the like regarding these devices. These devices are also likely to have mobility. That is, the location information is dynamically updated. Depending on the legislation, when the change in the location information is a certain level or more, re-registration to the communication control device 130 would be required in some cases.

In consideration of these various use modes of the terminal device 120 and the communication device 110, in an operation mode of TVWS defined by the Office of Communication (Ofcom) in UK (refer to Non Patent Literature 5), the following two types of communication parameters are defined.

Generic operational parameters
Specific operational parameters

The generic operational parameters are communication parameters defined as "parameters usable by any slave WSD located within the coverage area of a predetermined master WSD (corresponding to the communication device 110)" in Non Patent Literature 5. The parameter is characterized by being calculated by the WSDB without using the location information of the slave WSD.

The generic operational parameters can be provided by unicast/broadcast from the communication device 110 that is already permitted to perform radio transmission by the communication control device 130. For example, a broadcast signal represented by Contact Verification Signal (CVS) defined in United States FCC Regulation Part 15 Subpart H can be used. Alternatively, the information may be provided by a broadcast signal specific to a wireless interface. This enables the generic operational parameters to be handled as communication parameters to be used by the terminal device 120 or the communication device 110B in radio transmission for the purpose of accessing the communication control device 130.

The specific operational parameters are communication parameters defined as "parameters that can be used by a specific slave White Space Device (WSD)" in Non Patent Literature 5. In other words, the parameter is a communication parameter calculated by using the device parameter of the slave WSD corresponding to the terminal device 120. The parameter is characterized by being calculated by a White Space Database (WSDB) using the location information of the slave WSD.

<3-7. Procedure Occurring Between Communication Control Devices>

<3-7-1. Information Exchange>

The communication control device 130 can exchange management information with another communication control device 130. At least the following information is desirably exchanged:

Information related to communication device 110
Area information
Protection target system information The information related to the communication device 110 includes at least registration information and communication parameter information regarding the communication device 110 operating under permission of the communication control device 130. Registration information of a communication device 110 that having no permitted communication parameter may be included.

The registration information of the communication device 110 is typically a device parameter of the communication device 110 to be registered in the communication control device 130 in the registration procedure described above. There is no need to exchange all the registered information. For example, there is no need to exchange information that might correspond to personal information. Furthermore, when the registration information of the communication device 110 is exchanged, encrypted registration information may be exchanged, or the information that has undergone obfuscation may be exchanged. For example, information converted into a binary value or information signed using an electronic signature mechanism may be exchanged.

Typically, the communication parameter information regarding the communication device 110 is information related to a communication parameter currently used by the communication device 110. It is desirable that the information includes at least information indicating the spectrum being used and the transmission power. The information may include other communication parameters.

The area information is typically information indicating a predetermined geographical zone. The information can include zone information of various attributes in various modes.

For example, the area information may include protection zone information of the communication device 110 to be a high priority secondary system such as PAL Protection Area (PPA) disclosed in Non Patent Literature 3 (WINNF-TS-0112). The area information in this case can be expressed by a set of three or more coordinates representing geolocations, for example. Furthermore, for example, when a plurality of communication control devices 130 can refer to a common external database, the area information is expressed by a unique ID, and the actual geographical zone can be referred to from the external database using the ID.

Furthermore, the information may include information indicating the coverage of the communication device 110, for example. The area information in this case can also be expressed by a set of three or more coordinates representing geolocations, for example. Furthermore, for example, assuming that the coverage is a circular area centered on the geolocation of the communication device 110, the area information can also be expressed by information indicating the radius of the circle. Furthermore, for example, in a case where a plurality of communication control devices 130 can refer to a common external database that records area information, the information indicating the coverage is expressed by a unique ID, and the actual coverage can be referred to from the external database using the ID.

Furthermore, as another aspect, the area information can include information regarding an area section determined in advance by the government or the like. Specifically, for example, it is possible to indicate a certain region by indicating a postal address. Furthermore, for example, a license area or the like can be similarly expressed.

Furthermore, as still another aspect, the area information does not necessarily have to express a planar area, and may express a three-dimensional space. For example, it may be expressed using a spatial coordinate system. In addition, for example, information indicating a predetermined closed space, such as a floor number, a floor, or a room number of a building, may be used.

The protection target system information is, for example, information of a radio system treated as a protection target, such as the Incumbent Tier described above. Examples of the situation in which this information needs to be exchanged include cross-border coordination. It is highly probable that different objects as protection targets exist in the same region between neighboring countries or regions. In such a case, the protection target system information can be exchanged as necessary between the communication control devices 130 in different countries or regions to which the systems belong.

As another aspect, the protection target system information can include information regarding a secondary licensee and information regarding a radio system operated by the secondary license. The secondary licensee is specifically the lessee of the license, and for example, it is assumed that the secondary licensee uses a leased PAL from the owner and operates a radio system owned by the secondary licensed person. In a case where the communication control device 130 independently performs lease management, the communication control device 130 can exchange information regarding the secondary licensee and information regarding a radio system operated by the secondary license with another communication control device for the purpose of protection.

These pieces of information can be exchanged between the communication control devices 130 regardless of the decision-making topology applied to the communication control device 130.

In addition, these pieces of information can be exchanged in various methods. Example of methods will be described below.

ID designation method
Period designation method
Zone designation method
Dump method The ID designation method is a method of acquiring information corresponding to an ID assigned in advance to specify information managed by the communication control device 130 by using the ID. For example, it is assumed that a first communication control device 130 manages a communication device 110 with ID: AAA. At this time, the second communication control device 130 designates the ID: AAA and makes an information acquisition request to the first communication control device 130. After receiving the request, the first communication control device 130 searches for information of ID: AAA, and notifies of information regarding the communication device 110 of ID: AAA, for example, registration information, communication parameter information, and the like by response.

The period designation method is a method in which information satisfying a predetermined condition can be exchanged during a specific period designated.

Examples of the predetermined condition include the presence or absence of information update. For example, in a case where acquisition of information regarding the communication device 110 in a specific period is designated by a request, registration information of the communication device 110 newly registered within the specific period can be notified by a response. Furthermore, the registration information of the communication device 110 having a communication parameter changed within the specific period, or the information regarding the communication parameter, can also be notified in response.

Examples of the predetermined condition include whether the information has been recorded by the communication control device 130. For example, in a case where acquisition of the information regarding the communication device 110 in a specific period is designated by the request, the registration information or communication parameter information recorded by the communication control device 130 in the period can be notified by a response. In a case where the information is updated in the period, the latest information in the period can be notified. Alternatively, the update history may be notified for each piece of information.

The zone designation method is a method of designating a specific zone, and exchanging information regarding the communication device 110 belonging to the zone. For example, in a case where acquisition of information regarding the communication device 110 in a specific zone is designated by a request, registration information or communication parameter information regarding the communication device 110 installed in the zone can be notified by the response.

The dump method is a method of providing all information recorded by the communication control device 130. At least information and area information regarding the communication device 110 are desirably provided by the dump method.

All the above description of the information exchange between the communication control devices 130 is based on a pull method. That is, information exchange is performed in a mode in which information corresponding to the parameter designated in the request is given as a response, and can be implemented by the HTTP GET method as an example. However, the present invention is not limited to the pull method, and information may be actively provided to another communication control device 130 by a push method. The push method can be implemented by the HTTP POST method, as an example.

<3-7-2. Command/Request Procedure>

The communication control device 130 may send a command or a request to each other. A specific example of this is reconfiguration of communication parameters of the communication device 110. For example, when it is determined that the first communication device 110 managed by the first communication control device 130 is experiencing large interference from the second communication device 110 managed by the second communication control device 130, the first communication control device 130 may request the second communication control device 130 to change the communication parameter of the second communication device 110.

Another example is reconfiguration of area information. For example, when incompletion is found in calculation of the coverage information and the protection zone information regarding the second communication device 110 managed by the second communication control device 130, the first communication control device 130 may request the second communication control device 130 to reconfigure the area information. Besides this, the area information reconfiguration request may be made for various reasons.

<3-8. Information Transmission Means>

Notification (signaling) between the entities described above can be implemented via various types of media. The case of E-UTRA or 5G NR will be described as an example. As a matter of course, the embodiment is not limited to these.

<3-8-1. Signaling Between Communication Control Device 130 and Communication Device 110>

The notification from the communication device 110 to the communication control device 130 may be performed in an application layer, for example. For example, the hyper text transfer protocol (HTTP) may be used for notification. Signaling can be performed by describing required parameters in a message body of the HTTP according to a predetermined format. Furthermore, in the case of using HTTP, notification from the communication control device 130 to the communication device 110 is also performed according to the HTTP response mechanism.

<3-8-2. Signaling Between Communication Device 110 and Terminal Device 120>

The notification from the communication device 110 to the terminal device 120 may be performed by using at least one of radio resource control (RRC) signaling, system information (SI), or downlink control information (DCI), for example. Additionally, the notification may be implemented by using at least one of downlink physical channels including Physical Downlink Control Channel (PDCCH), Physical Downlink Shared Channel (PDSCH), Physical Broadcast Channel (PBCH), NR-PDCCH, NR-PDSCH, or NR-PBCH.

The notification from the terminal device 120 to the communication device 110 may be performed by using radio resource control (RRC) signaling or using uplink control information (UCI), for example. Additionally, the notification may be implemented by using uplink physical channels (including Physical Uplink Control Channel (PUCCH), Physical Uplink Shared Channel (PUSCH), or Physical Random Access Channel (PRACH).

The signaling is not limited to the physical layer signaling described above, and the signaling may be performed in a higher layer. For example, at the time of implementation in the application layer, signaling may be implemented by describing a required parameter in a message body of HTTP according to a predetermined format.

4. OPERATION RELATED TO PROTECTION OF AERIAL COMMUNICATION DEVICE

<4-1. Assumed System to be Protected>

Figure 14:
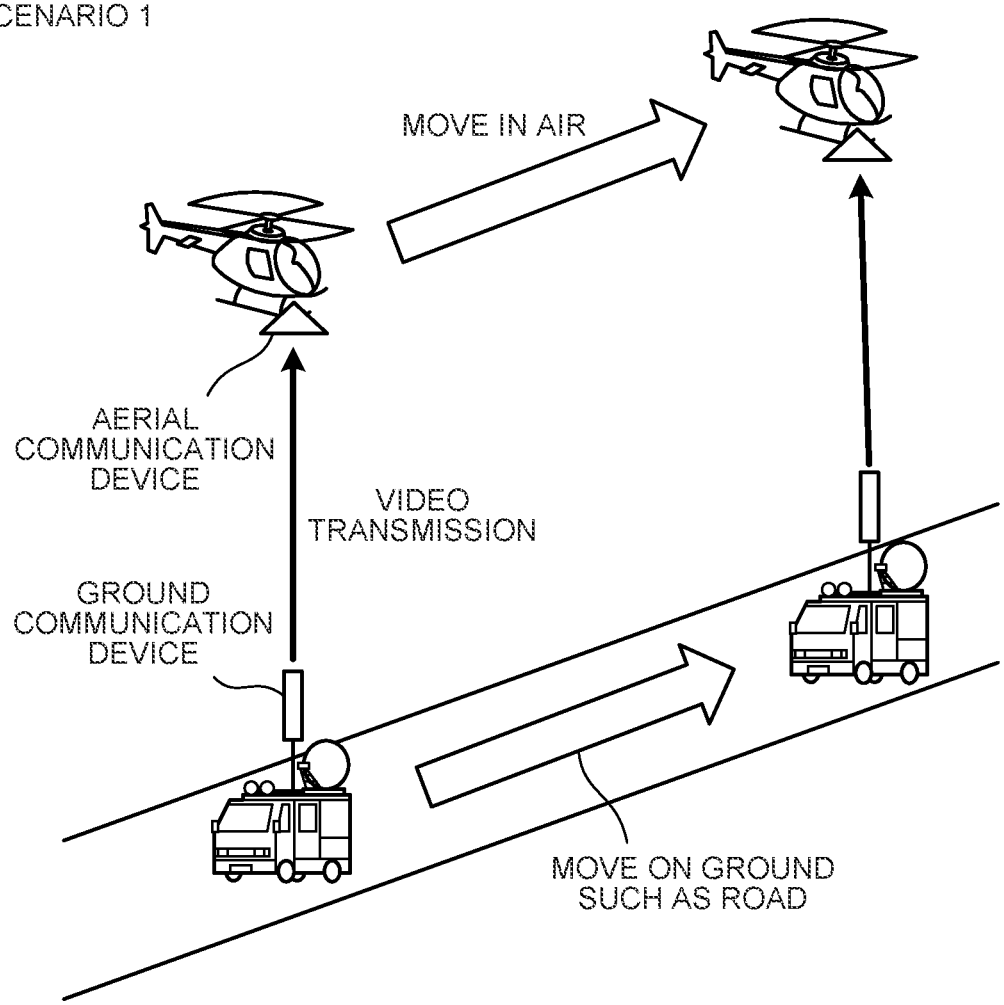
FIG. 14 is a diagram illustrating use scenario 1 for a communication network system.
Figure 15:
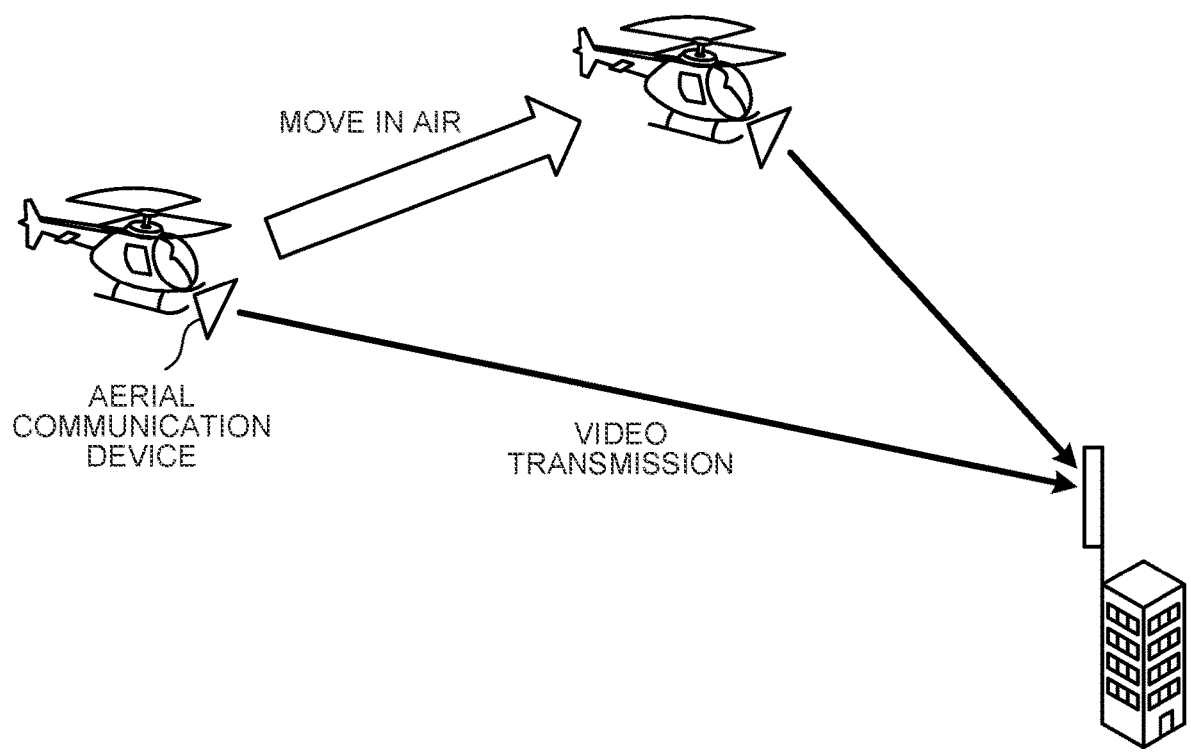
FIG. 15 is a diagram illustrating use scenario 2 for the communication network system.

Next, a use scenario for the communication network system 100 will be described with reference to FIGS. 14 and 15. FIG. 14 is a diagram illustrating use scenario 1 for the communication network system 100. FIG. 15 is a diagram illustrating use scenario 2 for the communication network system 100. In the present embodiment, a field pickup unit (FPU) system (primary system) operated by a broadcaster in Japan is set as a protection target system. In particular, as illustrated in FIG. 14, here is an assumable use scenario in which a video is transmitted from a transmitting station such as an outside broadcast vehicle moving on the ground toward a helicopter which is a receiving station of the FPU. An aerial communication device (an example of a primary system), mounted on a helicopter being a receiving station to move three-dimensionally in the air, is protected against a secondary system.

In addition, the technology is also applicable to a ground communication device that is mounted on an outside broadcast vehicle or the like serving as a transmission station in use scenario 1 and moves on the ground when the moving range of the device expands three-dimensionally.

Furthermore, as illustrated in FIG. 15, in use scenario 2, the technology is also applicable to an aerial communication device (an example of a primary system) mounted on a helicopter being an FTP transmission station in a scenario in which a helicopter serves as an FPU transmission station and a video is transmitted to a fixed reception station of the FPU installed on the rooftop of a building or the like.

In addition, the object on which the communication device is mounted is not limited to a helicopter or an outside broadcast vehicle. The present embodiment can be applied to general communication devices that are mounted on an object that moves three-dimensionally in a space, such as an aircraft, and perform communication somewhere in the space. Such communication devices will be collectively referred to as aerial communication devices.

Furthermore, the system as a protection target, to which the present invention is applicable, is not limited to the FPU. The present invention is also applicable to other radio systems, for example, a radio system for public works in a 2.3 GHz band, a satellite mobile communication service or a broadband mobile radio access system in a 2.6 GHz band, a 5 GHz band radio access system, Dedicated Short Range Communications (DSRC), and an armature radio, a 5.8 GHz band image transmission system, an FPU as well as Studio to Transmitter Link (STL)/Transmitter to Transmitter Link (TTL)/Transmitter to Studio Link (TSL) for video transmission, using a microwave band in the vicinity of 5 to 7 GHz, a 6 GHz band electrical communication business fixed radio system, and a mobile satellite uplink (C band), a 26 GHz band Fixed Wireless Access (FWA), and an Airport Surface Detection Equipment (radar), a 25 GHz band Low Power Data communication system, and a satellite uplink (Ka band), an image transmission (public works) using a 40 GHz band, a radio system for public and general works using the 40 GHz band, and an aerial communication device used in an FPU or the like using the 40 GHz band. Furthermore, the present invention is not necessarily limited, in application, to the aerial communication device, and may be applied to protection of a radio station fixed to the ground or a radio station moving on the ground.

<4-2. Interference Calculation in Present Embodiment>

Figure 16:
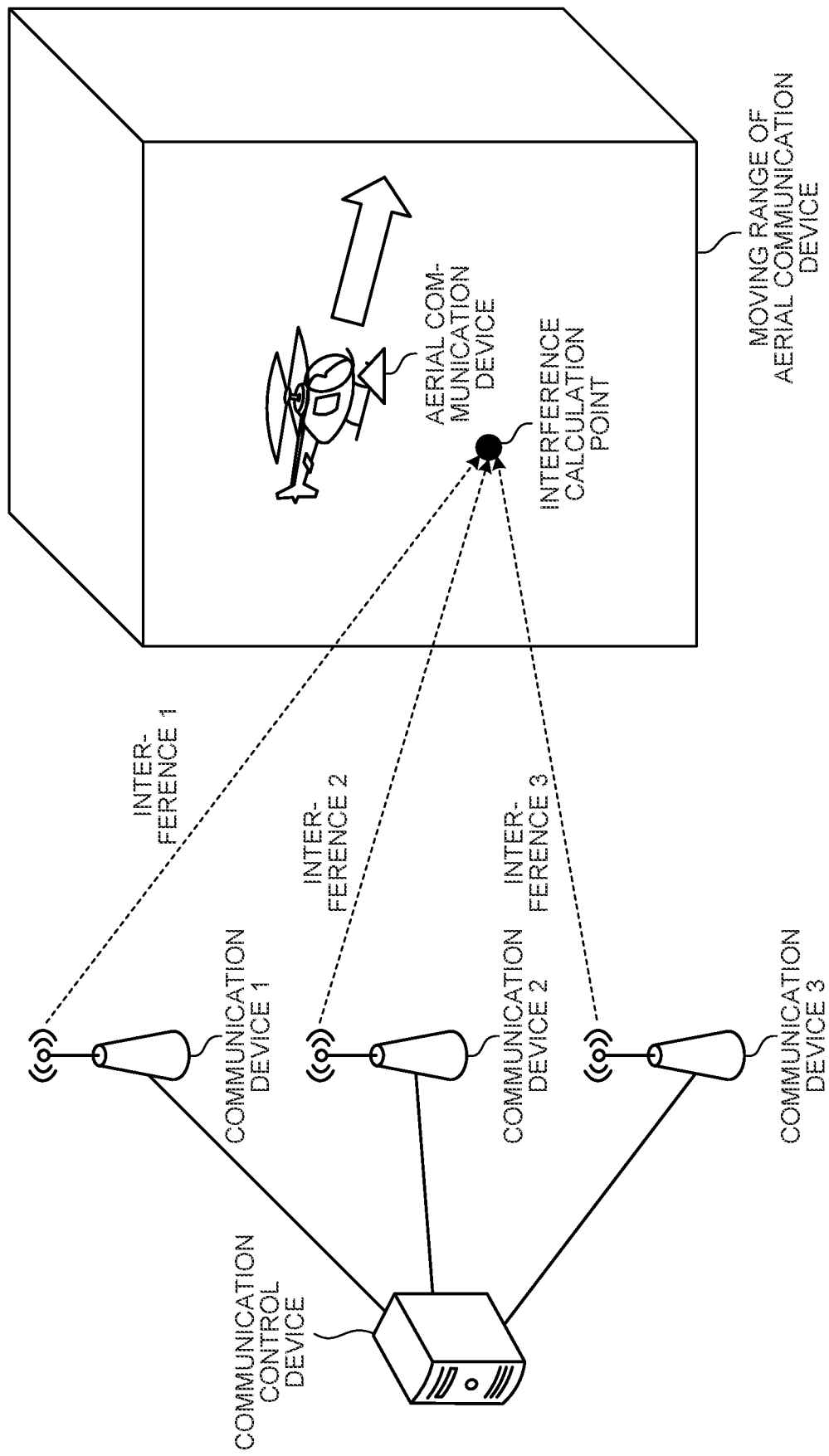
FIG. 16 is a diagram related to protection of a three-dimensional space in which the aerial communication device moves.

In the present embodiment, the entire three-dimensional space in which the aerial communication device as the primary system moves is the protection target. FIG. 16 is a diagram related to protection of a three-dimensional space in which the aerial communication device moves. For example, there is a need to protect a certain range in which the aerial communication device moves as illustrated in FIG. 16 against a plurality of other communication devices (secondary systems). In order to implement such protection, the concept of area protection in the CBRS is extended. Specifically, as illustrated in FIG. 16, a protection point as an interference calculation point is to be set not only in a plane but also in a certain space where the aerial communication device moves (hereinafter, a spatial protection point). Interference from the communication device (secondary system) to a spatial protection point in the space including the aerial communication device is calculated, and the communication device that is the secondary system is controlled so that the interference level at the spatial protection point is below a prescribed value. Note that, while the communication device is controlled by the communication control device 130 in the present embodiment, connection forms of individual entities are not limited to this FIG. 16 as described in <1-1.>. In addition, any entity may perform interference calculation. For example, the calculation can be performed by the communication control device 130 or the intermediate device 110C. That is, the intermediate device 110C can behave like the communication control device 130. The present embodiment describes an example in which the communication control device 130 performs interference calculation.

Figure 17:
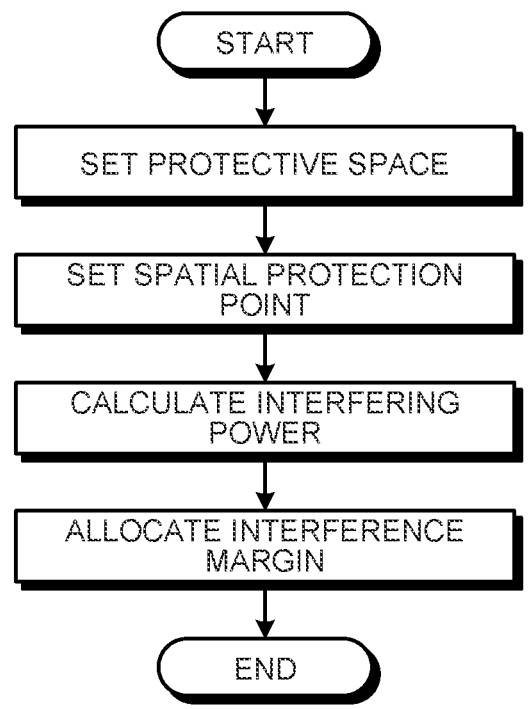
FIG. 17 is a diagram illustrating an operation flow of interference calculation according to the present embodiment.

FIG. 17 is a diagram illustrating an operation flow of interference calculation in the present embodiment. Details of each flow will be described below.

In each operation of the present embodiment illustrated in FIG. 17, on the premise of ensuring the protection of the primary system, various methods that can reduce the calculation amount can be selected and used depending on the situation.

<4-3. Method of Setting Protective Space>

As illustrated in FIG. 17, the communication control device 130 first sets a protective space in interference calculation. In a case where the moving range of the aerial communication device is given in advance, it is desirable to set the protective space based on this. The moving range of the aerial communication device can be acquired from the communication control device 130, the communication device 110 of the communication network system 100, and the terminal device 120, and can also be acquired from entities other than the communication control device 130, the communication device 110 of the communication network system 100, and the terminal device 120. Specifically, for example, information can be acquired from a database managed or operated by a radio administration agency of a country or a region, a third party agency, a business operator using an aerial communication device, or the like.

The moving range of the aerial communication device can be represented by, for example, vector data such as a polygon mesh, and a range of coordinates in an orthogonal coordinate system, a polar coordinate system, a geographic coordinate system, or the like.

Furthermore, it is allowable to set a dynamic protective space (DPS) obtained by extending the concept of the dynamic protection area (DPA) disclosed in Non Patent Literature 2. The DPS may be given in advance from the above-described database, or may be generated by dividing the protective space on a certain criterion. The division criterion may be a numerical value defined in advance by law, a value acquired from a database, a value independently generated by the communication control device, or the like. Note that the data acquisition method is not limited thereto.

In the case of using the DPS, a list of communication devices that require parameter change and transmission stop is created for each DPS. When a sensor such as Environmental Sensing Capability (ESC) used in the CBRS detects the use of an aerial communication device in the DPS or when the use of the aerial communication device is notified by a preset scheduler, the communication device is requested to change the parameter or suspension of the radio waves according to the created list.

<4-3-1. Method of Predicting Protective Space>

Figure 18:
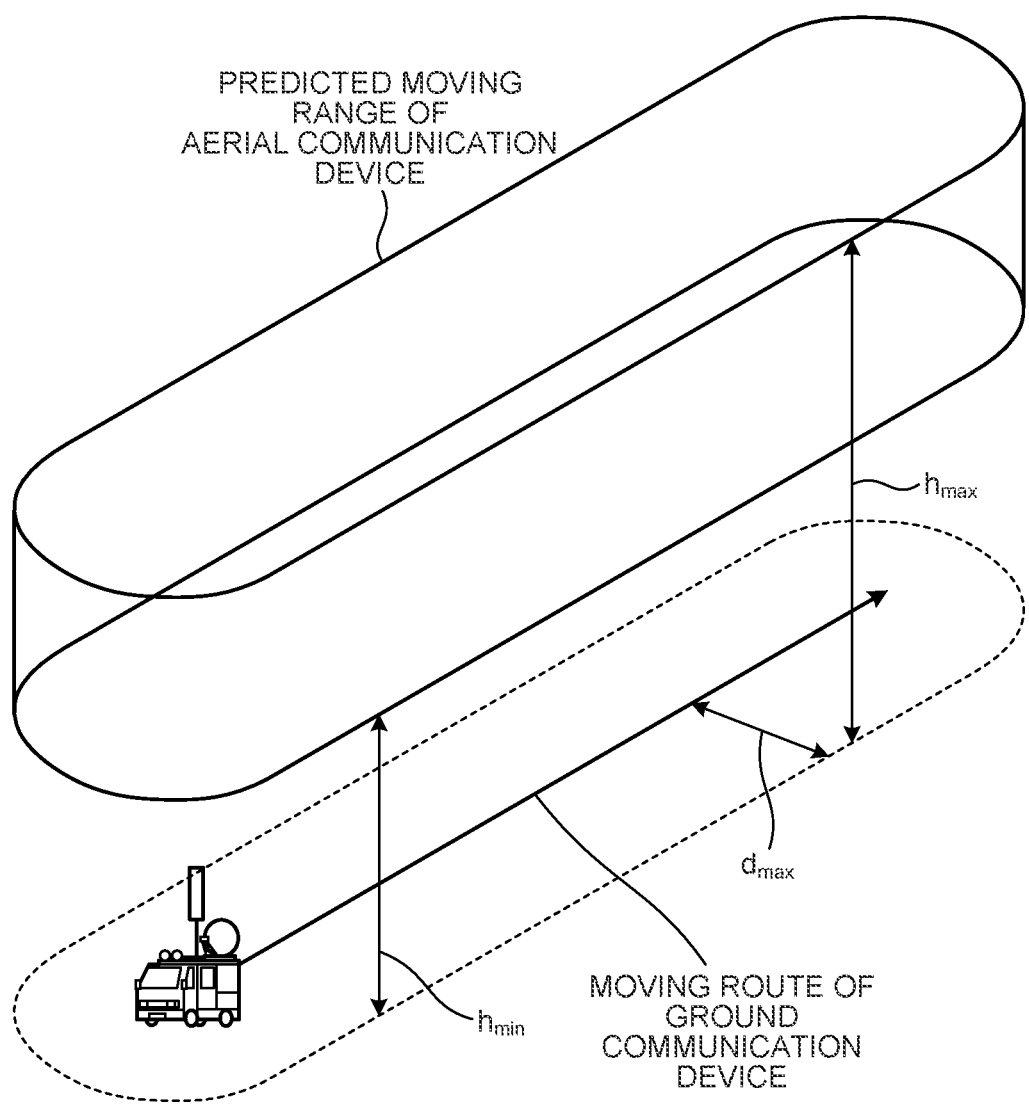
FIG. 18 is a diagram illustrating a moving range of an aerial communication device.

In a case where the moving range of the aerial communication device is unknown, the communication control device 130 may predict the moving range of the aerial communication device from the information of the communication partner. That is, the communication control device 130 estimates the moving range of the aerial communication device based on the information acquired from the communication counterpart (a ground communication device in FIG. 14) in the aerial communication device, and sets the protective space based on the estimated moving range. FIG. 18 is a diagram illustrating a moving range of the aerial communication device. For example, as illustrated in FIG. 18, by acquiring information about a moving route of the ground communication device as the communication counterpart, the range of a minimum value $h_{min}$ and a maximum value $h_{max}$ in the altitude direction may be set as the moving range of the aerial communication device within a certain distance $d_{max}$ from the moving route of the ground communication device. In a case where there is no movement of the ground communication device, a certain distance from a certain point may be set as the moving range of the aerial communication device.

Note that, even in a case where the moving range of the aerial communication device has already been given, the moving range may be predicted. The predicted moving range may be used instead of the given moving range, or a range obtained by adding or multiplying the two ranges may be used as the moving range.

Furthermore, the moving route of the ground communication device does not need to be a straight line as illustrated in FIG. 18, and may be a curve. In addition, a similar method may be applied to a flat surface, a curved surface, or a space.

In addition, these values may be selected by the entity itself that performs calculation based on information regarding the surrounding propagation environment. For example, the minimum value $h_{min}$ in the altitude direction may be set as a value obtained by giving a margin of a constant value to the average height or the maximum height of surrounding buildings within the distance $d_{max}$. Note that these values are not necessarily obtained within the distance $d_{max}$, and may be, for example, the average height in a certain administrative district. In addition, a value obtained from an elevation or the like may be used instead of the height of the building.

Instead of the average height or the maximum height, it is allowable to use a value obtained by giving a certain value of margin to the actual elevation or building height of each point within the distance $d_{max}$ obtained by vector or raster data. In addition, instead of the actual value, it is allowable to use a value obtained by averaging or interpolating the actual elevation or building height for each certain range. In this case, the minimum value $h_{min}$ to be used differs depending on the point.

The maximum value $h_{max}$ may be determined independently of the minimum value $h_{min}$, or may be set to a constant altitude based on the minimum value $h_{min}$. That is, the height may be obtained as $h_{max} = h_{min} + \Delta h$. Here, $\Delta h$ may be a value given in advance, or may be obtained by the communication control device 130 or the like according to the surrounding environment.

Figure 19:
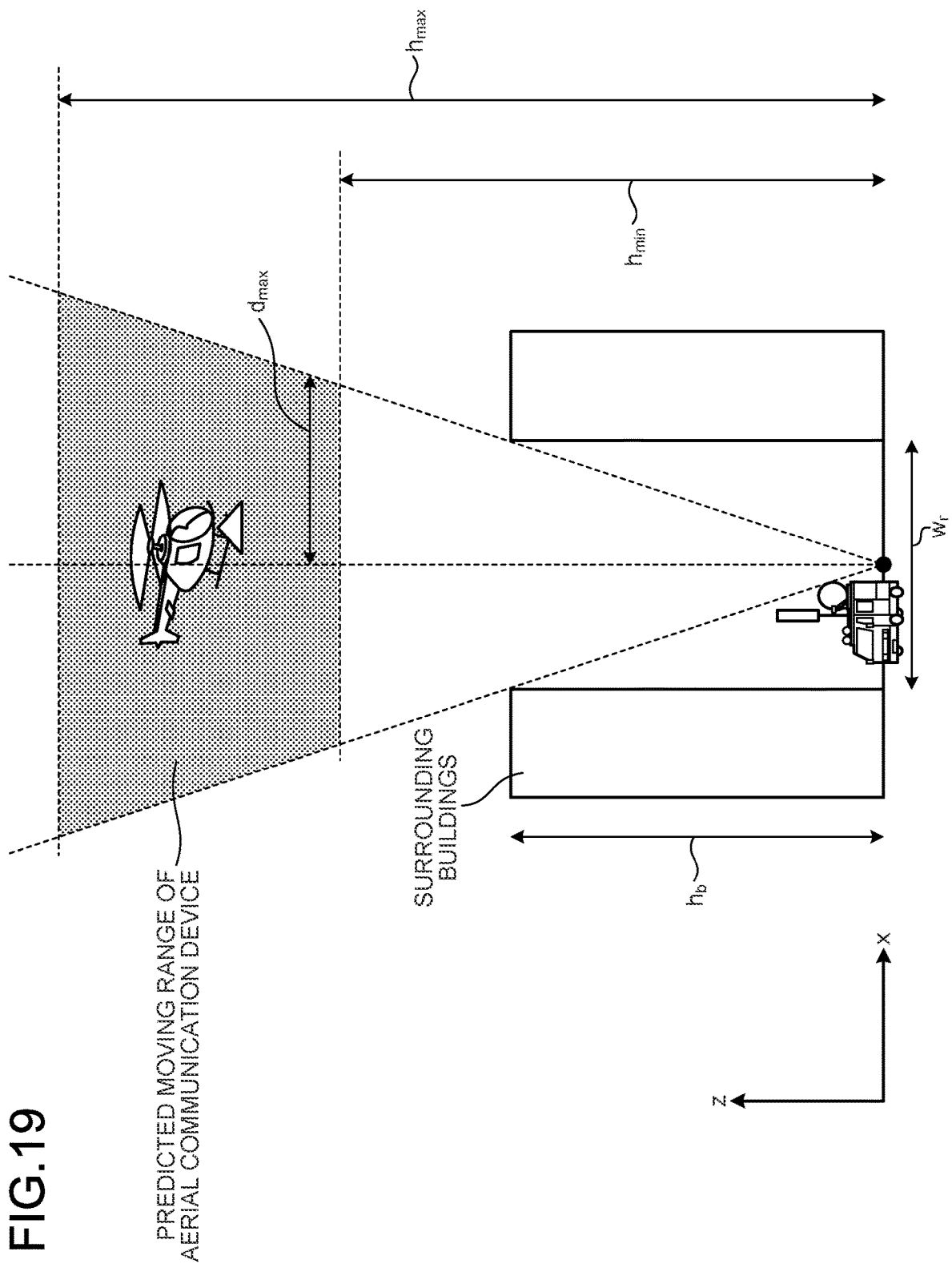
FIG. 19 is a diagram illustrating a moving range of the aerial communication device.

In addition, the maximum value $h_{max}$ may be varied for each altitude. FIG. 19 is a diagram illustrating a moving range of the aerial communication device. For example, when using an average road width of the moving route and an average building height around the moving route, it is possible, as illustrated in FIG. 19, to set a range in which the ground communication device and the aerial communication device at a certain position are within the line-of-sight as the moving range of the aerial communication device in a certain plane. When the average road width of the moving route is $w_r$ and the average building height around is $h_b$, the moving range at this time can also be expressed by a range in x and z with the position of the ground communication device as the origin, as in the following expression. That is, the moving range can be expressed by:

$$(2h_b)/w_r \cdot x \leq z, -(2h_b)/w_r \cdot x \leq z, h_{min} \leq z \leq h_{max}.$$

In addition, it is obvious that this expression can also be applied to a case where the ground communication device maintains a moving range. Furthermore, the calculation may be performed using the actual road width or building height, or the elevation of the peak may be used instead of the building height.

Note that values of $d_{max}$, $h_{max}$, $h_{min}$, $\Delta h$, and the like used for prediction of the protective space, criteria for calculation, and the like are defined by regulations, laws, and the like, and can be acquired by an entity (the communication control device 130 in the present embodiment) that performs calculation, from a database managed or operated by a radio administration agency of a country or a region, a third party agency, a user of an aerial communication device, or the like. In addition, these values may be determined for each area or site such as an administrative district as a target of calculation. For example, different values may be used in an urban area and a suburban area.

In addition, when an aircraft flies in Japan, a moving range may be predicted using a cruise altitude or the like described in a flight plan submitted to an aviation office, and the predicted travel range may be set as a protective space. For example, $h_{max}$ and $h_{min}$ may be obtained by providing a margin in the vertical direction to the cruise altitude.

<4-4. Spatial Protection Point Setting Method>

As illustrated in FIG. 17, the communication control device 130 sets the spatial protection point after setting the protective space. Here, a method of setting the spatial protection point will be described with reference to FIGS. 20 to 30. FIGS. 20 to 30 are diagrams illustrating an exemplary method of setting a spatial protection point. The spatial protection point is a type of interference calculation point. That is, the spatial protection point as the interference calculation point is a target protection point to be a calculation target of the interference power. While the spatial protection point may be set by any entity, the following will describe a case where the spatial protection point is set by the communication control device 130 as an example. Note that the spatial protection point is specified may be specified by acquisition of information regarding the spatial protection point set by another device.

As described above, the protection target system is an aerial communication device, and the transmission point is a radio wave transmission antenna of a communication device. In one example of a method of setting the spatial protection point, as illustrated in FIG. 20, the spatial protection points are set at certain grid intervals within the moving range of the aerial communication device, and the interference margin from the communication device is allocated at each protection point. That is, the communication control device 130 sets a plurality of spatial protection points in each of the altitude direction (Z-axis direction) and the horizontal direction (x-axis direction and/or y-axis direction).

Note that the spatial protection point may be specified based on surrounding environment information. The environment information indicates, for example, information regarding the place such as urban, suburban, and rural used in the radio wave propagation loss model. These differences cause differences in some parameters. For example, Non Patent Literature 10 discloses a table indicating a relationship between a clutter, a reference height, and a reference interval. That is, the communication control device 130 sets a plurality of spatial protection points at intervals according to the surrounding environment of the protective space.

In this example, the communication control device 130 specifies which clutter category the surroundings of the protection target system correspond to. There are various means applicable as a specifying method. For example, when the information corresponding to the clutter category is embedded in digital map information, it is allowable to specify the environment information regarding the surroundings of the protection target system using the embedded information. Furthermore, for example, in a case where an area/space to be protected is designated in advance and a clutter category is designated for each area/space, it is allowable to specify environment information around the protection target system with reference to the designation information. Further, the environment information may have clutter categories such as on the sea and on the lake in addition to on the ground.

Next, the communication control device 130 determines a grid interval on the vertical plane based on the specified clutter category. For example, it can be assumed, in an urban area and the like, that a base station is likely to be placed on a rooftop or a street lamp of a building or on each floor of a building in an indoor area and that terminals exist on the ground or on each floor of the building. In addition, for example, it can be assumed, in case of a suburban, that a radio device is installed on a high steel tower. For example, it can be assumed, on the sea, that the radio device is placed on a ship. In this manner, since the installation position of the radio device can be limited to some extent depending on the environment, it is considered to be possible to set the grid interval so as to ignore places other than the installation position.

The grid interval may be designated in advance for each category by laws and standards. For example, in an urban area, the communication control device 130 may set an average height between individual floors of a building, as the grid interval. As this value, for example, in a case where an upper limit value, a lower limit value, or the like of the height between the floors is defined in the Building Standards Act or the like, the grid interval may be specified with reference to the defined values. In the case of the sea, the grid interval may be specified according to the type of the ship using the protection target system, for example. For example, in the case of a marine radio such as a fishing boat, the grid interval may be specified based on information regarding the height of a general fishing boat or the like. When the protection target system is an in-ship radar, the grid interval may be set based on the height of the ship. Note that the grid interval on the vertical plane does not necessarily have to be constant.

Note that the grid interval on the vertical plane does not necessarily have to be constant. It is allowable to set different grid intervals according to the height. That is, the communication control device 130 sets a plurality of spatial protection points at intervals corresponding to the altitude. It is of course desirable to set the upper limit height at which the grid is provided. When the moving range of the aerial communication device, specifically, the range in the altitude direction, is narrower than the grid interval of the spatial protection point, the protection point in the altitude direction may be omitted.

The setting of the protection point does not necessarily have to be performed in an orthogonal coordinate system as illustrated in FIG. 20, and can be defined in a polar coordinate system or a geographic coordinate system. In the orthogonal coordinate system, grids are set in the x-axis, y-axis, and z-axis directions, but in the polar coordinate system of spherical coordinates, spatial protection points may be set in the axes of r, $\theta$, and $\Phi$. In the case of the geographic coordinate system, for example, the spatial protection point may be set on an axis of latitude, longitude, and altitude.

The range to be protected in the altitude direction is very wide in the protection of the aerial communication device, making it necessary to calculate interference for an enormous number of spatial protection points. Therefore, the calculation volume may be reduced by reducing the protection point based on a certain standard that can ensure the protection of the primary system. That is, the communication control device 130 determines the spatial protection points selected from the plurality of spatial protection points based on the predetermined selection condition as the target protection points to be the interference power calculation target. As a specific method, the following three methods are conceivable. Note that two or more of the following three methods may be combined.

(1) Method of reducing protection points in altitude direction
(2) Method of reducing protection points in horizontal direction in addition to points in altitude direction
(3) Method of omitting by predicting protection points to be intensively protected When setting the DPS, the DPS may be set again after the protection point reduction, or the protection point reduction may be performed for each DPS.

(1) Method of Reducing Protection Points in Altitude Direction

The reduction of the protection points in the altitude direction is performed such that, for example, the protection points are reduced in the z-axis when the spatial protection points are set in the orthogonal coordinate system, reduced in the r axis direction in the case of the polar coordinate system, and in the elevation direction in the case of the geographic coordinate system. In a case where setting of different coordinate axes is used or in a case where another coordinate system is used, reduction may be naturally performed on other axes.

Note that these altitudes may be altitudes from the ground or may be sea levels. In addition, the height may be a relative altitude from a reference point obtained from heights of surrounding buildings, such as an average building height. The reference point may be an actual building height or an average building height within a certain range.

(1-i)

First, the grid interval in the vertical direction can be varied based on the altitude. For example, by using the fact that the variation of the propagation loss decreases with an increase in the propagation distance, a grid interval $\Delta z_g=f(z)$ may be obtained using a function f that the result increases with an increase in an altitude z as illustrated in FIG. 22. In this case, the communication control device 130 may select the target protection point such that the interval increases with an increase in the altitude for the spatial protection points set at equal intervals in advance, or may perform setting such that the interval increases with an increase in the altitude in the setting stage of the spatial protection point. That is, the communication control device 130 determines the target protection point such that the higher the altitude, the longer the interval in the altitude direction. In addition, it is also allowable to use a grid interval for each predetermined altitude. The function to be used and the relationship between the altitude and the grid interval can be defined as a regulation or a law. In addition, the increase in the grid interval does not necessarily need to be regular, may be an irregular increase, and does not necessarily need to be a constant increase.

In addition, the degree of increase in grid interval due to altitude may be changed depending on the surrounding environment (suburban, urban, cities, etc.). For example, an increase in grid interval with the altitude may be reduced in an urban area or an urban area having clutter from buildings.
(1-ii)

Figure 23:
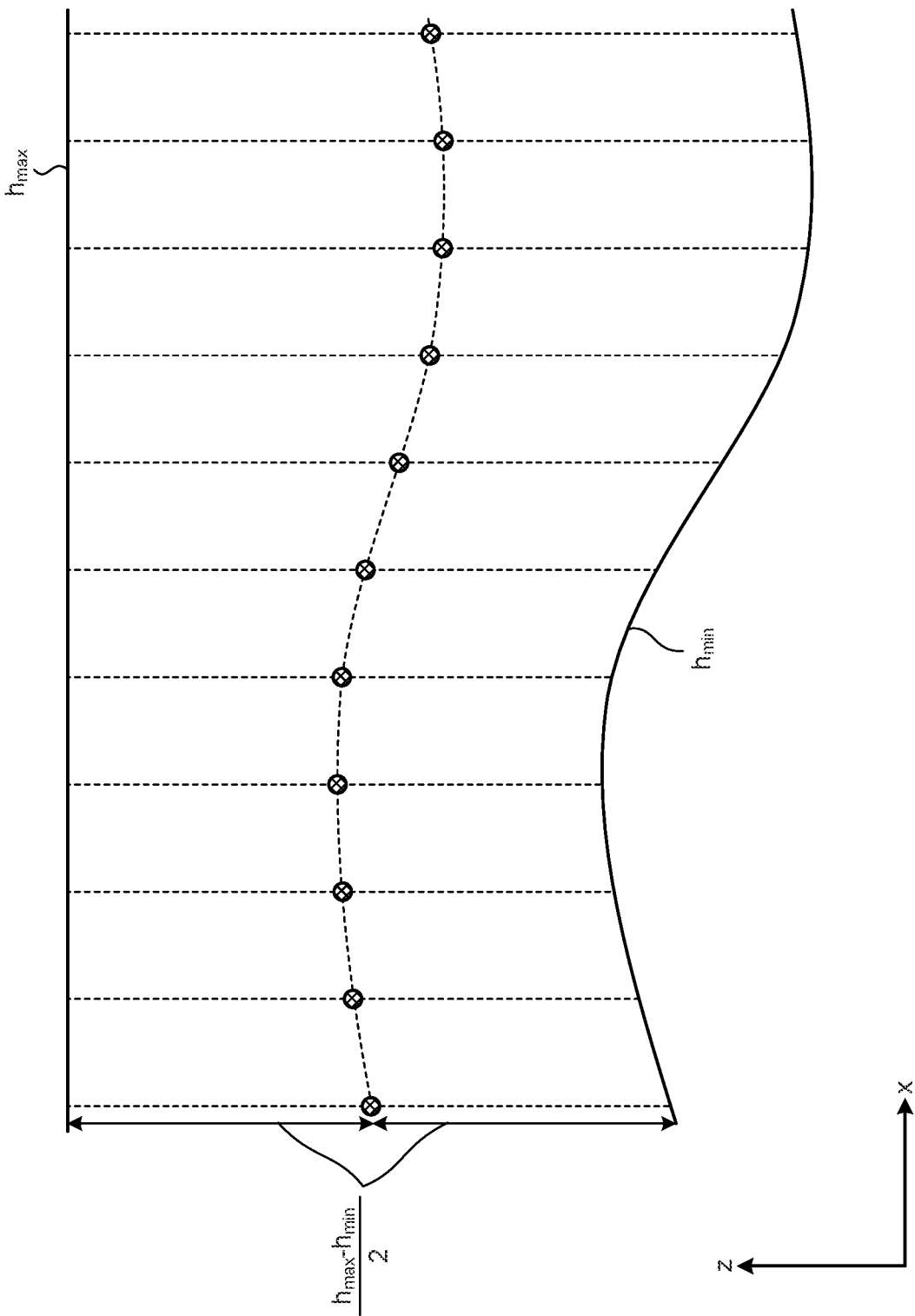
FIG. 23 is a diagram exemplifying a method of setting a spatial protection point.

In addition, it is allowable to perform some data processing in a moving range in the altitude direction of the aerial communication device so as to set a spatial protection point in a new altitude direction. That is, the communication control device 130 sets the spatial protection point to be the target protection point based on the range of the distance in the altitude direction in the protective space. For example, as illustrated in FIG. 23, it is allowable to calculate an average altitude from the moving range in the altitude direction and set the spatial protection point only at the altitude calculated. Similarly, the spatial protection point may be set only at the lowest altitude of the moving range. Note that the data processing method is not limited only to the calculation of the average value or the minimum value.

Figure 24:
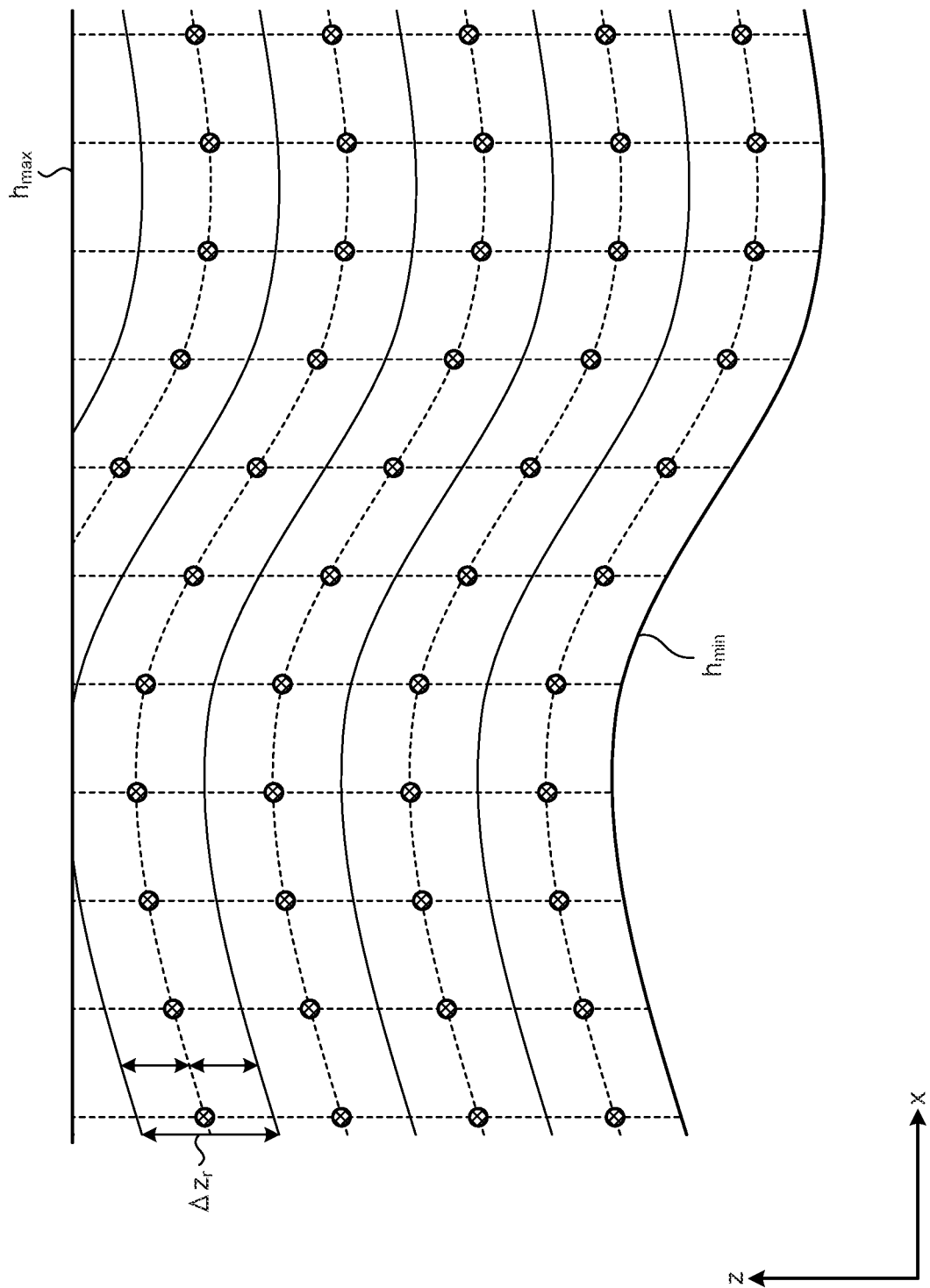
FIG. 24 is a diagram exemplifying a method of setting a spatial protection point.

In addition, the moving range in the altitude direction may be divided into a plurality of ranges at constant intervals, and data processing may be performed within each range to set the spatial protection point in the altitude direction. That is, the communication control device 130 divides the distance in the altitude direction in the protective space into a plurality of ranges at predetermined intervals, and sets the spatial protection point to be the target protection point for each divided range. For example, as illustrated in FIG. 24, it is allowable to divide the distance in the altitude direction into a plurality of ranges at a constant interval $\Delta z_r$, and thereafter set the spatial protection point at the average altitude of each range. Note that the data processing method can include calculation of not only the average value but also the minimum value and other methods.

The interval $\Delta z_r$ may be changed according to the altitude or the surrounding environment (suburban, urban, cities, etc.). For example, the interval $\Delta z_r$ does not have to be constant in the altitude direction, and may be set to a larger value with an increase in the altitude, for example.
(1-iii)

Figure 25:
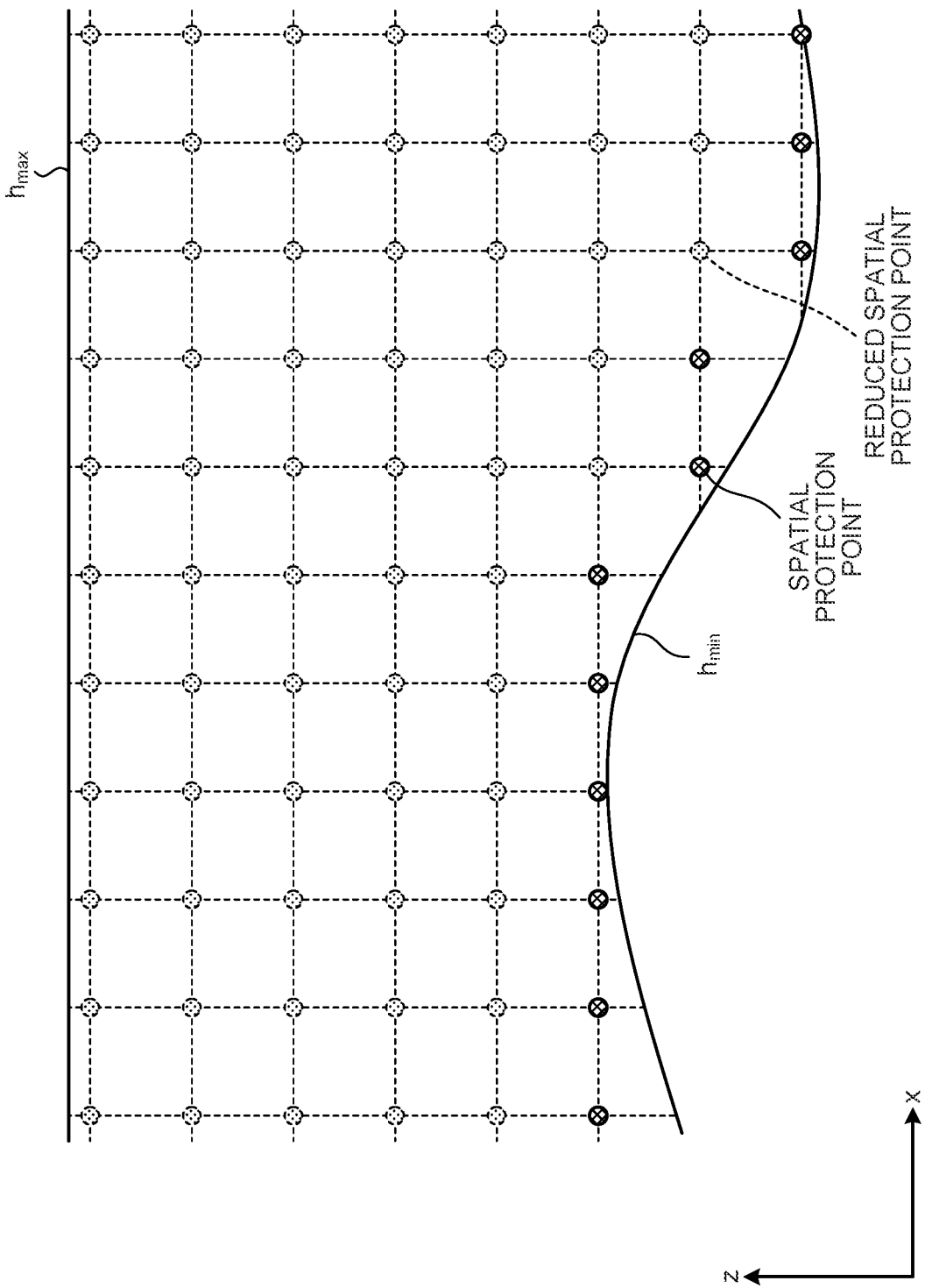
FIG. 25 is a diagram exemplifying a method of setting a spatial protection point.

In addition, some protection points may be extracted and used from a preset spatial protection point based on a certain standard regarding altitude. That is, the communication control device 130 selects a spatial protection point to be the target protection point from among the spatial protection points arranged in the altitude direction at each position in the horizontal direction (x-axis direction in FIG. 25). For example, as illustrated in FIG. 25, it is allowable to use only the protection point having the minimum altitude among the set protection points, as the target protection point. Alternatively, only the protection point having the altitude closest to the median of the altitude may be used. Note that the extraction criterion is not limited to the extraction of the minimum point or the extraction of the protection point close to the median.

Figure 26:
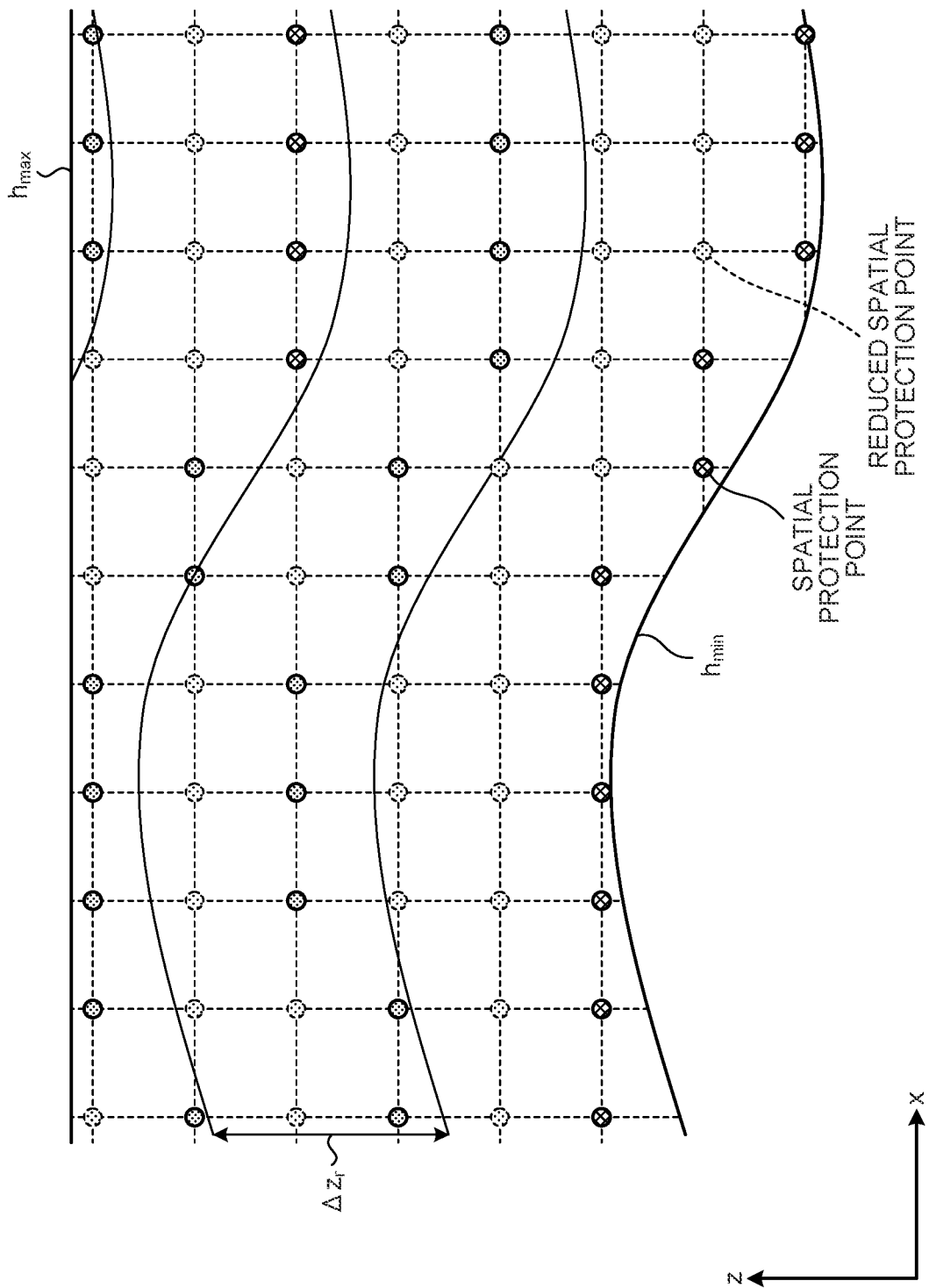
FIG. 26 is a diagram exemplifying a method of setting a spatial protection point.

In addition, it is allowable to first divide the protection points into a plurality of groups at constant intervals in the altitude direction and then use some protection points extracted from the spatial protection points within the group based on a certain standard That is, the communication control device 130 groups the spatial protection points arranged in the altitude direction at each position in the horizontal direction for each predetermined number, and selects the spatial protection point to be the target protection point for each group. For example, as illustrated in FIG. 26, it is allowable to first divide the protection points into a plurality of groups in the altitude direction at a constant interval $\Delta z_r$, and then use only the protection point having the minimum altitude in each group. The interval $\Delta z_r$ may be changed according to the altitude or the surrounding environment (suburban, urban, cities, etc.).

(2) Method of Reducing Protection Points in Horizontal Direction in Addition to Points in Altitude Direction The reduction of the protection points in the horizontal direction indicates here that, for example, the protection points are reduced in the xy-axis when the spatial protection points are set in the orthogonal coordinate system, reduced in the θΦ axis direction in the case of the polar coordinate system, and reduced in the latitude/longitude directions in the case of the geographic coordinate system. In a case where setting of different coordinate axes is used or in a case where another coordinate system is used, reduction may be naturally performed on other axes.
(2-i)

Figure 27:
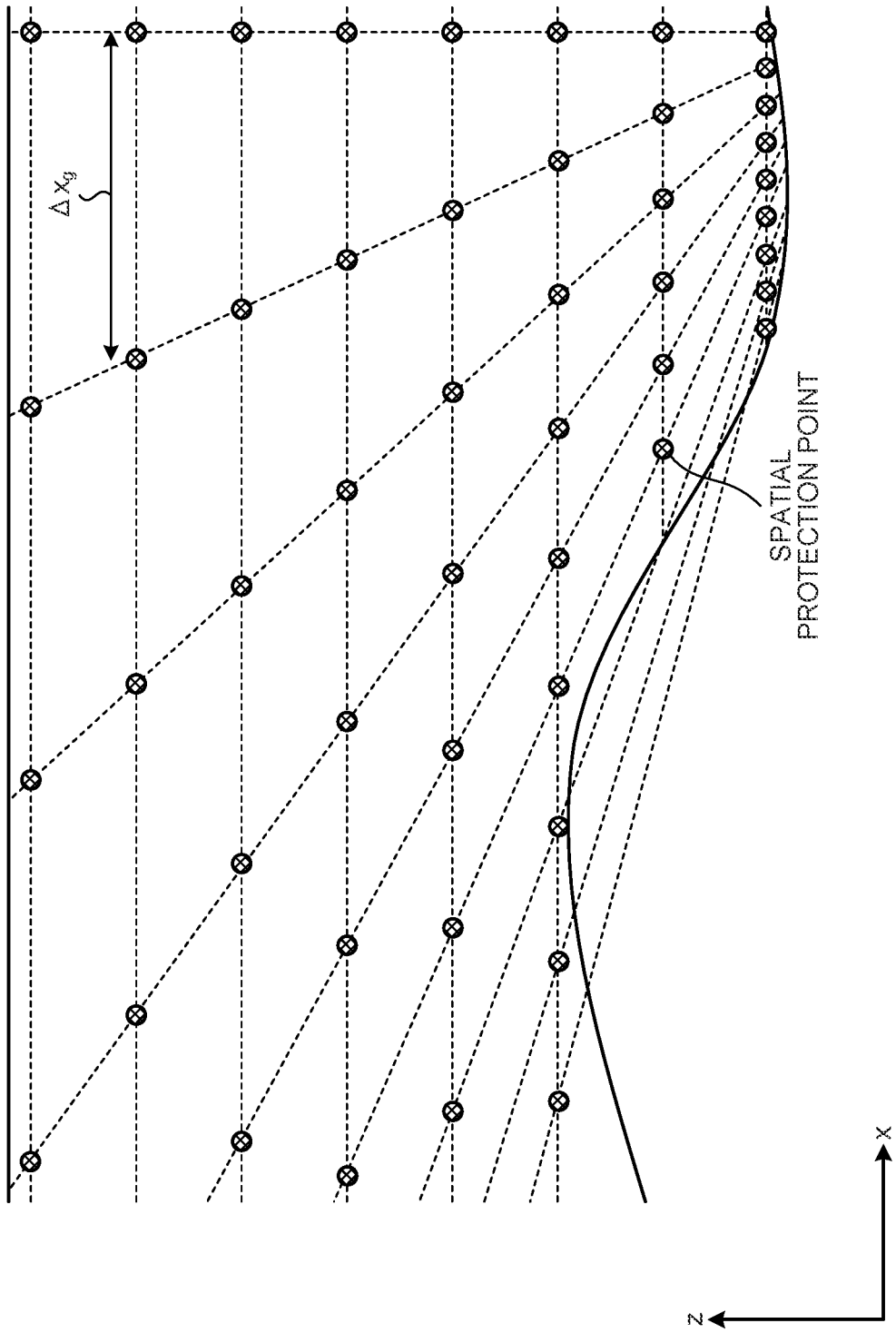
FIG. 27 is a diagram exemplifying a method of setting a spatial protection point.
Figure 28:
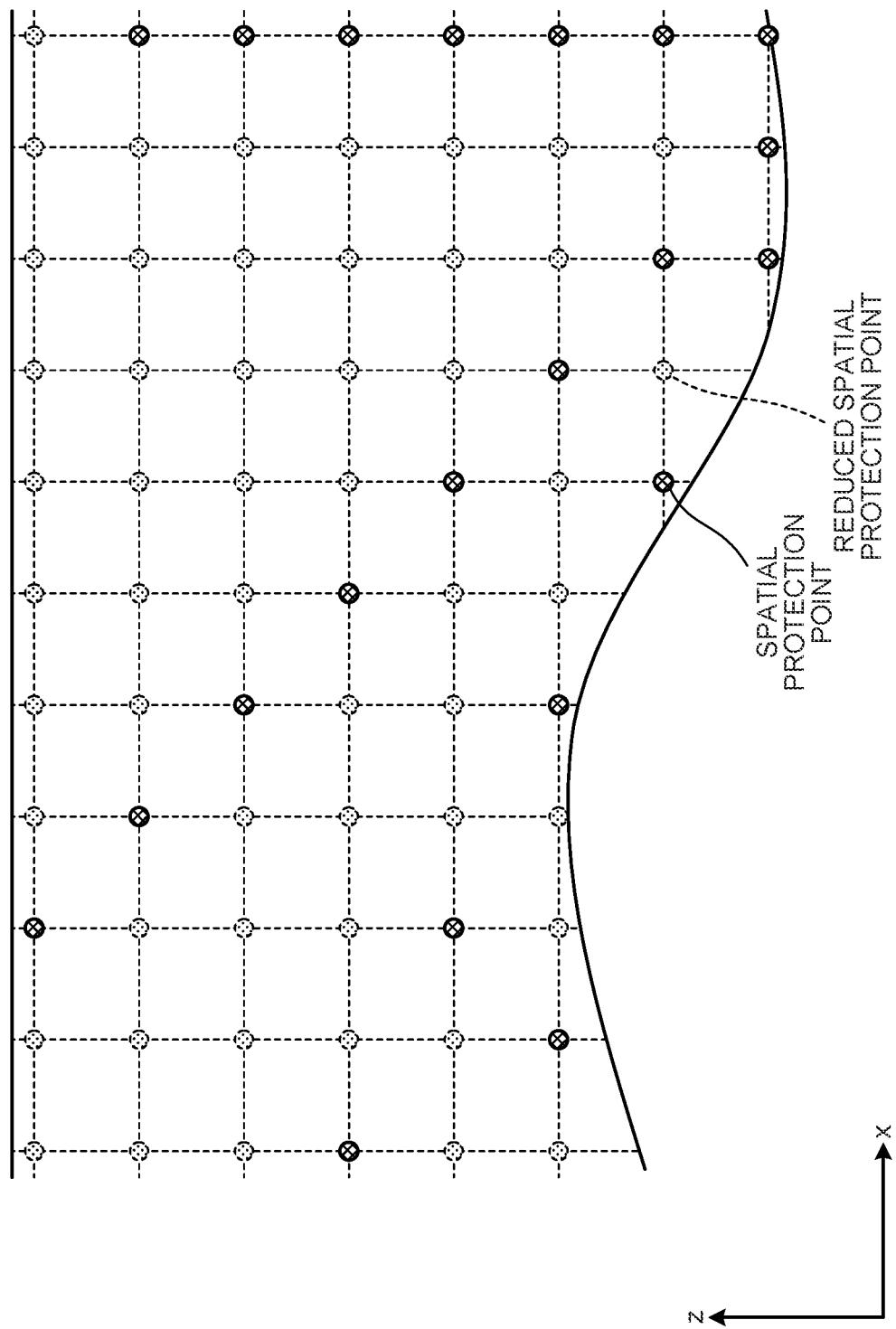
FIG. 28 is a diagram exemplifying a method of setting a spatial protection point.

For example, as illustrated in FIG. 27, the grid interval in the horizontal direction may be increased based on the altitude. That is, for example, a grid interval $\Delta x_g$ may be obtained by using a function f in which the grid interval $\Delta x_g$ increases with an increase in the altitude z, such as $\Delta x_g = f(z)$. In FIG. 27, the function f is given as proportional to the altitude, but it is not always necessary to increase the grid interval in this manner. In addition, the grid interval for each altitude may be determined in advance and used. The function to be used and the relationship between the altitude and the grid interval can be defined as a regulation or a law. Note that similar processing may be performed not only on the x-axis but also on the y-axis and the z-axis. That is, the communication control device 130 determines the target protection point such that the higher the altitude and the longer the distance in the horizontal direction, the longer the interval in the altitude direction or the horizontal direction. In addition, the increase in the grid interval does not necessarily need to be regular, may be an irregular increase, and does not necessarily need to be a constant increase.

In addition, the degree of increase in the grid interval in the horizontal direction depending on the altitude may be changed depending on the surrounding environment (suburban, urban, cities, etc.). For example, an increase in grid interval with the altitude may be reduced in an urban area or an urban area having clutter from buildings.
(2-ii)

Furthermore, the number of protection points in the horizontal direction to be calculated may be reduced according to the altitude. For example, in FIG. 28, the protection points in the horizontal direction to be calculated are selected at constant intervals, and the intervals are increased by one grid with an increase in the altitude. The method of reducing the protection points to be calculated is not limited to the method in FIG. 28. In addition, similar processing may be performed not only on the x-axis but also on the y-axis and the z-axis, although it is not always necessary to reduce the protection points with the same interval in the x-axis and the y-axis. In addition, it is not always necessary to reduce the distance at a constant interval in the horizontal direction, and the interval may be varied in the horizontal direction.

(2-iii)

Figure 29:
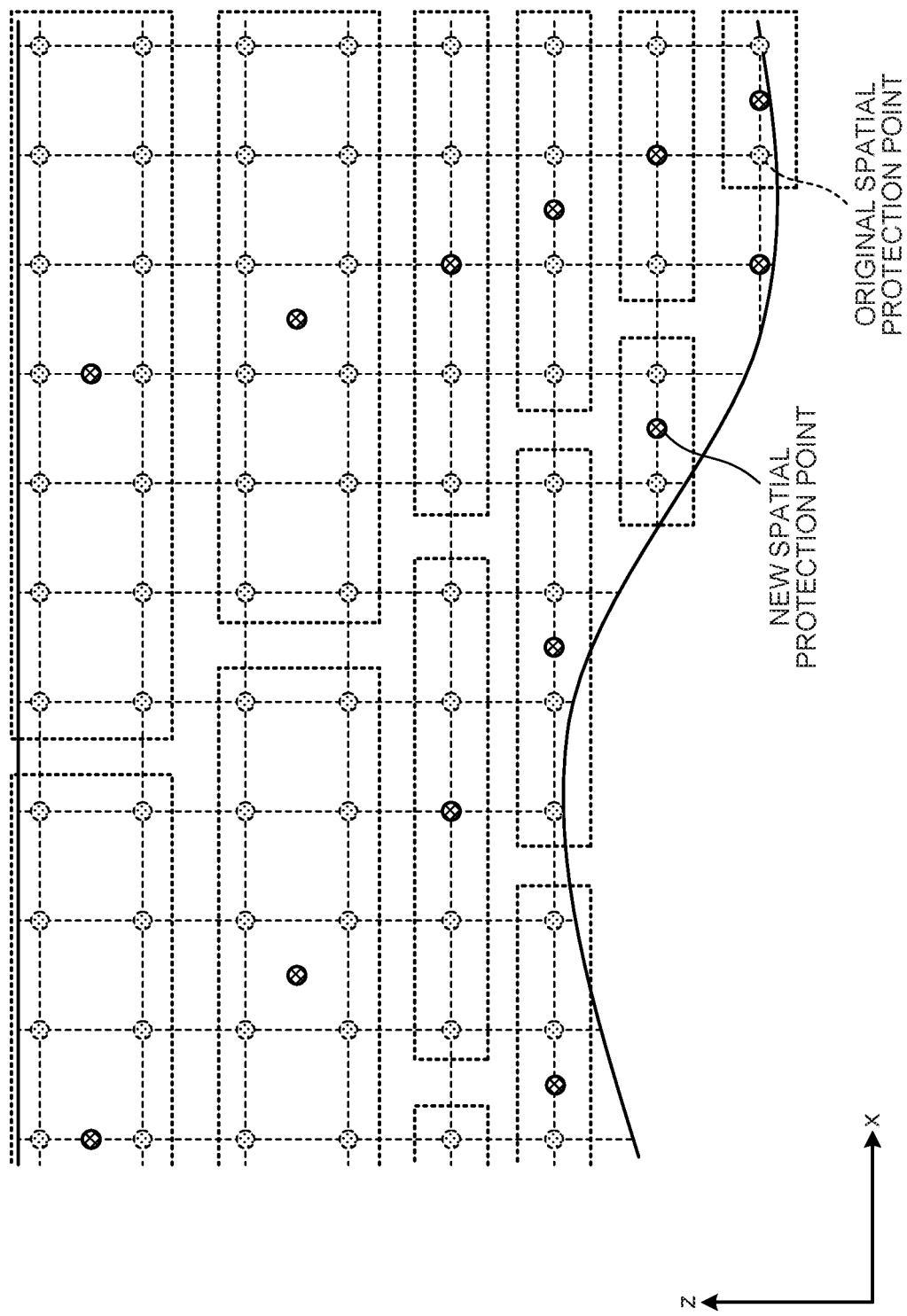
FIG. 29 is a diagram exemplifying a method of setting a spatial protection point.

In addition, it is also allowable to first group the protection points in unit of a certain range, obtain one new protection point representing each group based on the information regarding the protection points in each group, and then sets the obtained new protection point as the interference calculation target. That is, the communication control device 130 generates (or selects) a representative protection point for each predetermined number of spatial protection points based on the plurality of set spatial protection points, and determines the representative protection point as the target protection point. For example, as illustrated in FIG. 29, it is allowable to obtain the center of gravity of a plurality of protection points and set this as a new protection point. Note that the selection of the protection point using the center of gravity does not necessarily have to be performed based on a quadrangle as illustrated in FIG. 29, and may be performed based on a triangle or the like. Furthermore, although the center of gravity is obtained in the xz-axis in the example of FIG. 29, the center of gravity may also be obtained in consideration of the y-axis as well. Furthermore, the size of the range used for selecting the protection point does not need to be uniform, and for example, as illustrated in FIG. 29, the range may be increased in the direction of the xyz-axis with an increase of the altitude.

(2-iv)

Figure 30:
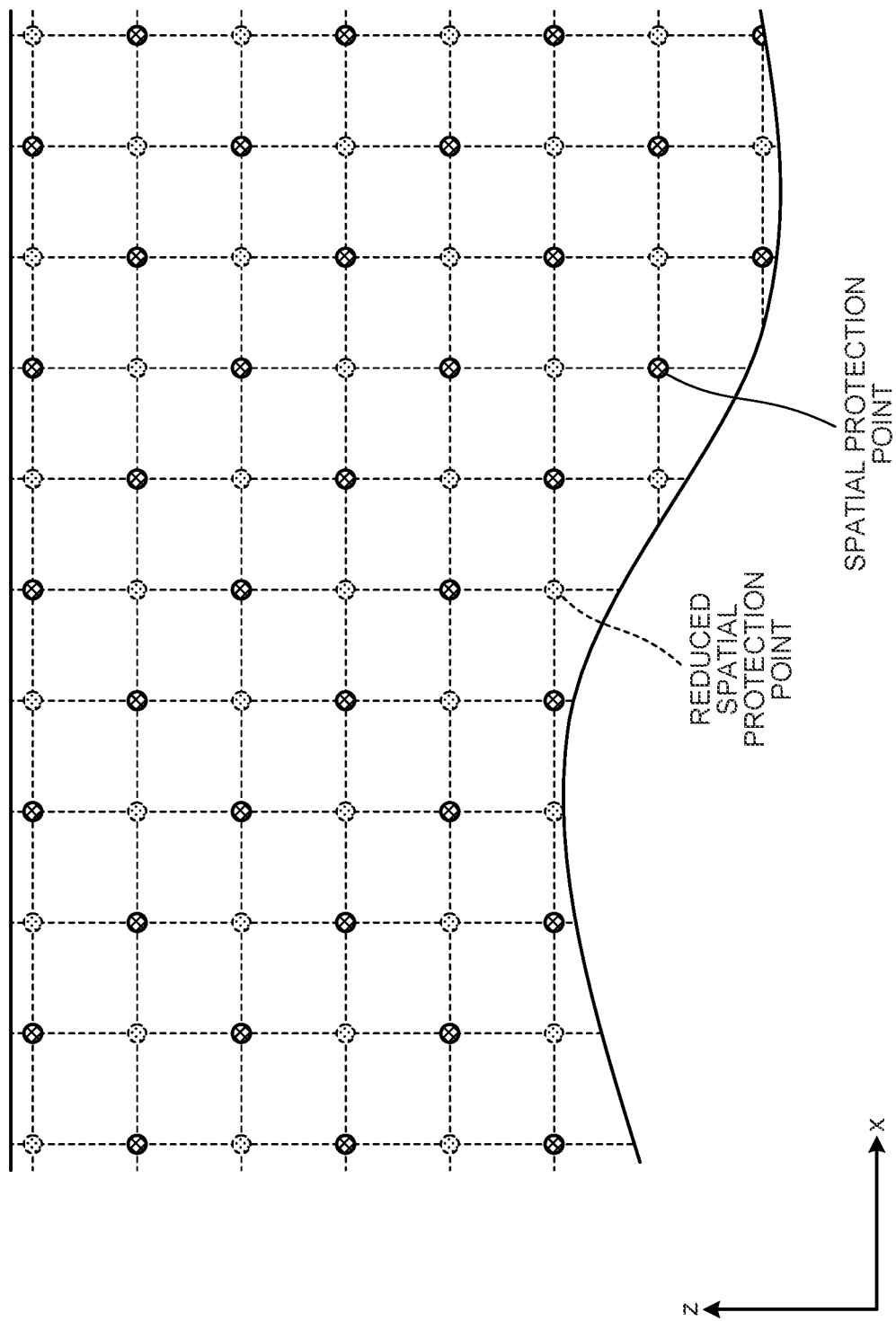
FIG. 30 is a diagram exemplifying a method of setting a spatial protection point.

In addition, as illustrated in FIG. 30, the protection points may be alternately reduced so that the horizontal planes adjacent in the vertical direction do not overlap each other. Note that it is not always necessary to reduce the protection points at all altitudes, and there may be an altitude at which the protection points are not reduced in some criteria. In addition, it is not always necessary to alternately reduce the protection points between two adjacent horizontal planes, and the protection points to be reduced may be arranged so as not to overlap between three or more horizontal planes. In addition, the number of horizontal planes on which the protection points to be reduced do not overlap each other may be increased or decreased according to the altitude, for example. That is, the communication control device 130 determines the spatial protection point selected at a predetermined number of intervals (one interval in FIG. 30) as the target protection point such that there is no adjacent protection point at the shortest distance in each of the altitude direction and the horizontal direction.

(3) Method of Omitting by Predicting Protection Points to be Intensively Protected Even in the protective space, different methods of reducing the protection points may be used based on the importance of protection and the required protection accuracy. For example, it is allowable to set, in the protective space, such that the protection points are not reduced in a part of the space where the importance of protection or the required protection accuracy is a certain threshold or more, while the protection points to be calculated are reduced using any one of the protection point reduction methods described in (1) and (2) or the calculation of all the protection points is omitted in a part of the space where the protection accuracy is the threshold or less. That is, the communication control device 130 determines the number of spatial protection points corresponding to the accuracy required for protection of the primary system, as the target protection points.

In addition, the reduction amount may be changed based on the importance of protection and the required protection accuracy while using the same method of reducing the protection points. For example, in a reduction method of changing the grid interval, it is allowable to use a method in which the set grid interval is used as it is or a narrower grid interval is used in a space in which the importance of protection or the required protection accuracy is a certain threshold or more, and a grid interval wider than the set grid interval is used or a grid interval as it is used in a space in which the importance of protection or the required protection accuracy is the threshold or less. In addition, in the method of reducing the number of protection points to be calculated, the number to be reduced may be made larger or smaller than the determined value according to the importance of protection and the required protection accuracy.

Meanwhile, in dividing the space by changing the reduction method or changing the reduction amount, it is allowable to divide the space not only into two spaces by one threshold but into three or more spaces by providing two or more thresholds.

The threshold to be used may be different depending on the surrounding environment. For example, thresholds used may be different between urban and suburban areas. Note that the threshold at this time can be defined as a regulation or a law. These pieces of information can be acquired by the communication control device or another entity from a database managed or operated by a radio administration agency in a country or a region, a third party agency, a business operator using the aerial communication device, or the like.

In addition, the importance of protection and the required protection accuracy may be determined based on the existence probability of the aerial communication device in the protective space. For example, it is allowable to set, in the protective space, such that the higher the probability that the aerial communication device exists in the space, the higher the protection accuracy will be required, or the higher the importance of protection will be. In addition, the existence probability of the aerial communication device may be used as it is instead of the importance of protection and the required protection accuracy. That is, the communication control device 130 determines the spatial protection point selected based on the existence probability in the protective space of the primary system, as the target protection point.

Furthermore, the existence probability of the aerial communication device may be determined based on the altitude or the horizontal position in the protective space. Furthermore, the existence probability of the spatial communication device with respect to the altitude or the horizontal position in the protective space may be different depending on the surrounding environment. For example, criteria to be provided may be different between urban and suburban areas.

Note that the existence probability at this time can be defined as a regulation or a law. These pieces of information can be acquired by the communication control device or another entity from a database managed or operated by a radio administration agency in a country or a region, a third party agency, a business operator using the aerial communication device, or the like.

In addition, these values may be determined by an entity that performs interference calculation, in addition to be obtained from an external entity. For example, the existence probability may be predicted from information such as a relationship between a surrounding building height and flight altitude of a general helicopter and past moving route information regarding an actual aerial communication device. Furthermore, in a case where the aerial communication device is an aircraft, the existence probability may be predicted from prior information such as a cruising altitude described in the flight plan. For example, the existence probability may be represented by a normal distribution having a cruising altitude as a median.

In addition, the importance of protection and the required protection accuracy may be determined based on an estimated magnitude of interference to be received. For example, in a space in which interference from the secondary base station is estimated to increase, the importance of protection is considered to be high and the protection accuracy required is considered to be high. An assumable example of a location having a large interference from the secondary base station would be a moving range of the aerial communication device in which the secondary radio station is within the line-of-sight.

<4-5. Calculating Interfering Power>

Figure 31:
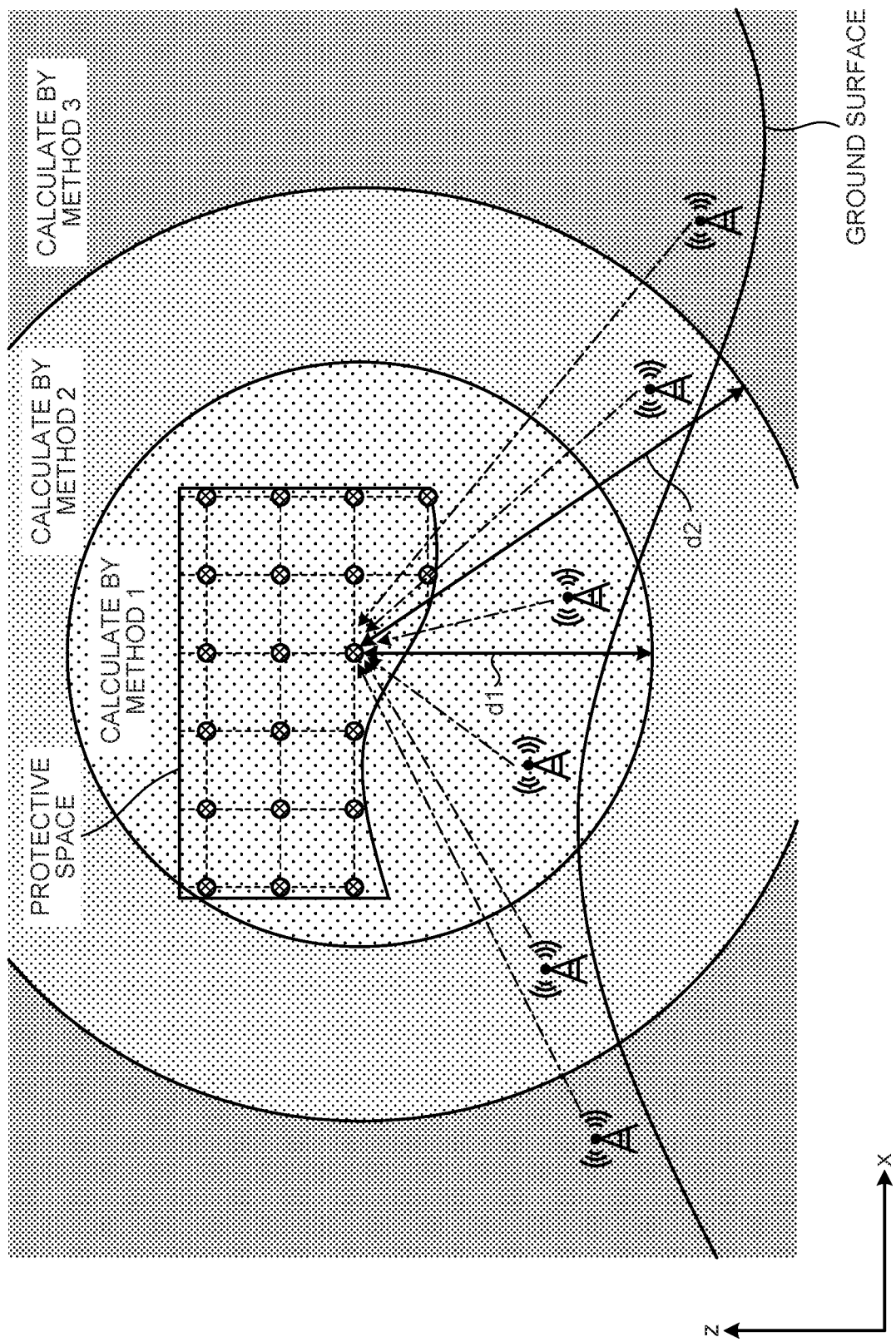
FIG. 31 is a diagram illustrating a method of calculating interfering power.
Figure 32:
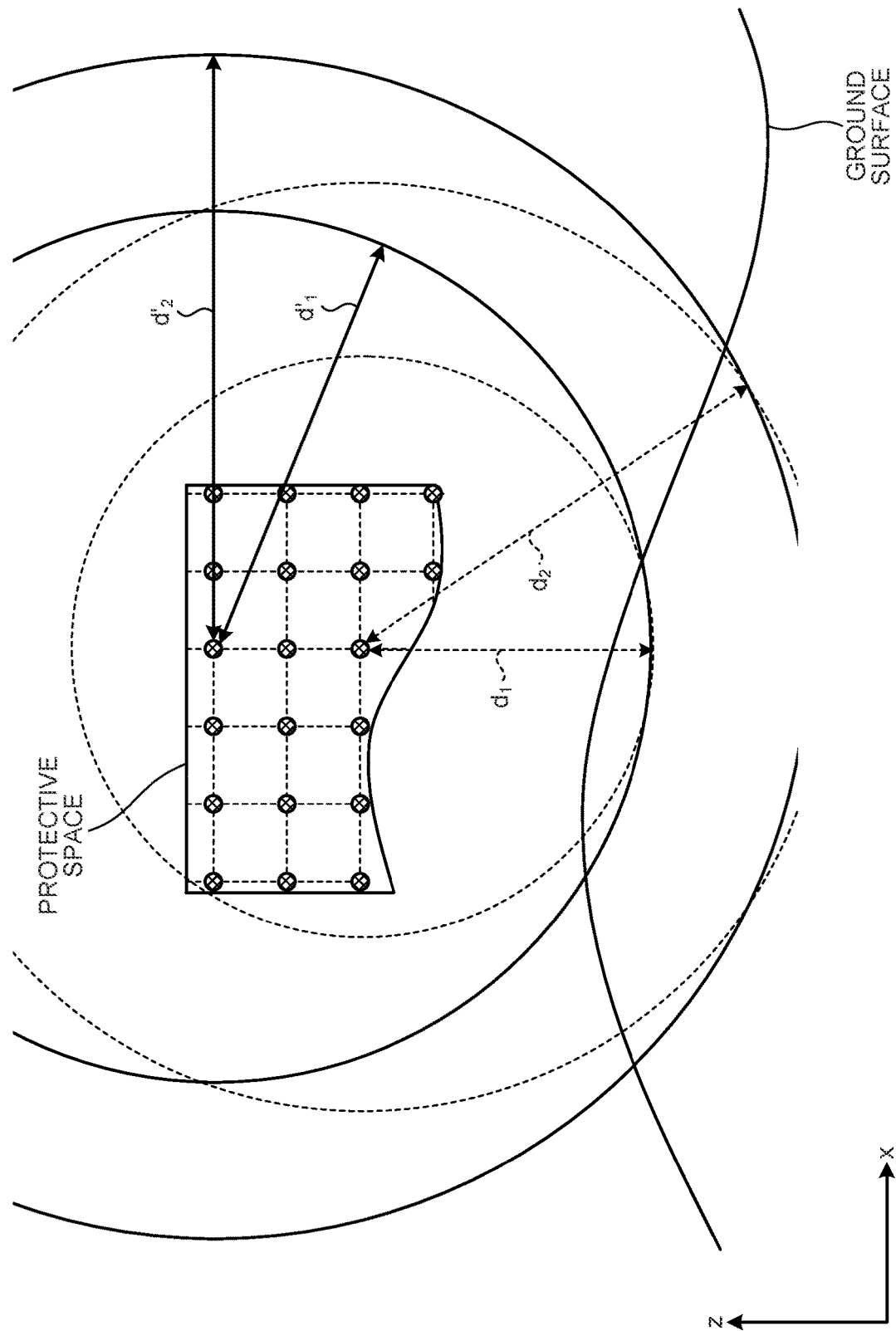
FIG. 32 is a diagram illustrating a method of calculating interfering power.

Next, a method of calculating interfering power will be described with reference to FIGS. 31 and 32. FIGS. 31 and 32 are diagrams illustrating a method of calculating interfering power. The communication control device 130 calculates interference power received at each set spatial protection point from the secondary radio station (secondary system) (hereinafter, referred to as interfering power in some cases). The interfering power can be obtained by subtracting various losses including the propagation loss from the transmission power of the secondary radio station and then adding antenna gains of the secondary radio station and the primary radio station (primary system). At that time, it is possible to use a method in which the calculation amount of the propagation loss calculation is reduced by flexibly selecting the method of calculating the propagation loss between the secondary radio station and the primary radio station or a method in which the calculation amount for the allocation of the interference margin is reduced by calculating the representative value in the spatial direction. Even in a case where a plurality of spatial protection points has not been set and only one point of the space is to be protected, it is still allowable to perform the selection of the method of calculating the propagation loss.

In addition, when calculating interference power from a plurality of secondary radio stations to a certain protection point, it is allowable to select a different method of propagation loss calculation for each secondary radio station based on a three-dimensional propagation distance from the protection point. That is, the communication control device 130 selects a calculation method according to the distance from the target protection point to the secondary radio station among predetermined calculation methods (propagation loss calculation methods) for calculating the interference power. For example, as illustrated in FIG. 31, Method 1 is selected when the three-dimensional propagation distance from the target protection point is less than $d_1$, Method 2 is selected when the distance is greater than $d_1$ and less than $d_2$, and Method 3 is selected when the three-dimensional propagation distance is $d_2$ or more. Note that Methods 1 to 3 are set such that the shorter propagation distance the secondary radio station has, the more conservative, that is, smaller estimation of the propagation loss is performed. Although FIG. 31 illustrates a case of setting two ($d_1$ and $d_2$) propagation distance thresholds, the number of thresholds may be one or any integer of three or more.

In addition, the selection of the propagation loss calculation method for each secondary radio station may be performed independently at all protection points, or the calculation method selected at a certain protection point may be applied to other protection points. That is, the communication control device 130 may select a calculation method for each target protection point, or may select a calculation method selected at a specific target protection point to be used as a calculation method at another target protection point. For example, the protection points may be divided into a plurality of groups, and the propagation loss calculation method may be selected for each group. In the selection of the calculation method at this time, for example, a representative protection point in the group may be determined and selected based on the protection point determined.

In addition, the propagation loss calculation method includes theoretical formulas such as a free space path loss and a 2-ray ground reflection model, experimental formulas such as an Okumura-Hata model and a Walfisch-Ikegami model, various models obtained by extending these to other frequencies, a model that performs site-specific calculation using a terrain profile such as an Irregular Terrain Model (ITM), a propagation model indicated in ITU-R Recommendations such as P.452 and P.1411, and a propagation model reported in a 3GPP technical report or the like. Additionally, a constant value may be used as the propagation loss without performing calculation using the propagation model. For example, when the propagation distance to the secondary radio station is a certain distance or more and the interference power is infinitely negligible, the propagation loss from the secondary radio station may be set to be infinite. Conversely, the propagation loss from the secondary radio station having a very large interference power within a certain distance may be set to 0.

Note that the threshold of the propagation distance and the calculation method used in each method can be defined as a regulation or a law. The communication control device or another entity can acquire information from a database managed or operated by a radio administration agency in a country or a region, a third party organization, a company using the aerial communication device, or the like.

In addition, the threshold of the propagation distance may be determined by setting a different value for each protection point based on the surrounding environment and the altitude. For example, different thresholds may be used depending on a surrounding environment such as an urban area or a suburban area. In addition, different thresholds may be used for each altitude as illustrated as $d'_1$ and $d'_2$ in FIG. 32. For example, it is allowable to set such that the higher the altitude of the protection point, the larger the threshold to be used in a conservative propagation loss calculation method.

In addition, the propagation loss calculation method may be selected based on the status of the propagation path between the protection point and the secondary radio station. For example, the propagation loss calculation method to be selected may be different between a secondary radio station whose propagation path to the protection point is within a line-of-sight and a secondary radio station whose propagation path beyond the line-of-sight. Here, whether the propagation path is within line-of-sight or beyond line-of-sight may be obtained by using actual topography or building information. Further, different propagation loss calculation methods may be selected among the secondary radio stations that are installed indoors and having the propagation path within the line-of-sight with high probability. In addition, a propagation loss calculation method may be selected by using altitude information of a building or terrain existing between the protection point and the secondary radio station. For example, in a case where there is a building having an altitude of a certain value or more in the propagation path, or in a case where there is a certain number of buildings having an altitude of a certain value or more, different calculation methods may be selected. In addition, these threshold values may be determined based on the protection point and the antenna height of the secondary radio station. For example, a value obtained by adding a margin to the protection point or the antenna height of the secondary radio station may be set as the threshold. In addition, the calculation method may be selected based on an angle formed by any two straight lines including the protection point or the antenna position of the secondary base station in the path at the protection point or the antenna position of the secondary base station. For example, the calculation method may be selected based on an angle formed by a straight line connecting the protection point and the secondary base station and a straight line connecting the protection point and a certain point on the topography between the protection point and the secondary base station and the protection point or the secondary base station, at the antenna position of the secondary base station, or a maximum value thereof. In addition, regarding the selection criteria based on the status of these propagation paths, a calculation method may be selected by flexibly combining a plurality of criteria.

In addition, a propagation loss calculation method may be selected based on the positional relationship between the protective space and the secondary radio station. For example, the secondary radio station immediately below or near the set protective space may be regarded as a location having a very small propagation loss, and thus, a conservative propagation loss calculation method may be used.

In addition, the selection of the calculation method using these metrics may be used together with the selection of the calculation method using the threshold of the propagation distance. For example, as the propagation distance, even in a secondary radio station that needs to use a conservative propagation loss calculation method, another calculation method may be used when the secondary radio station is beyond the line-of-sight. Conversely, even in a secondary radio station having a large propagation distance, another calculation method may be used when the secondary radio station is in the line-of-sight. Furthermore, the calculation method may be selected by using the references other than the propagation distance in combination.

In addition, it is also allowable to select a method of calculating the interference power itself instead of the propagation loss. For example, the interference power from the secondary radio station away from the protection point by a certain distance or more may be set to 0, or the interference power of the secondary radio station within a certain distance may be set to a very large value.

<4-6. Method of Allocating Interference Margin>

Finally, the communication control device 130 calculates allowable power indicating interfering power allowable at the target protection point based on the calculated interfering power (or a representative value of the interfering power). Specifically, the communication control device 130 allocates the interference margin (allowable power) to each secondary radio station such that the sum of the interference power from each secondary radio station k to each target protection point p does not exceed an allowable margin $I_{accept}$ of the interference power. The total of the interference power is calculated by the following Formula (3).

$$\sum_k I_{k \to p} \quad (3)$$

Note that examples of the method of distributing the interference margin include: a simultaneous distribution interference margin distribution method such as a method disclosed in Non Patent Literature 3 (for example, a calculation method of the maximum allowable EIRP); and a simultaneous allocation interference margin distribution method such as an iterative allocation process (IAP) disclosed in Non Patent Literature 2. Other methods may be used as the method of allocating the interference margin.

In addition, it is also allowable to use a method of calculating a secondary radio station that stops transmission of radio waves, such as DPA Protection disclosed in Non Patent Literature 2, instead of the interference margin allocation.

Since a plurality of protection points is set in the altitude direction in the protection of the aerial communication device, calculation of the secondary radio station that stops transmission by the IAP and the calculation of the cumulative interference power described above also needs to be performed at each protection point. However, when the number of protection points in the altitude direction increases, the calculation volume also increases proportionally.

To handle this, after the protective space is divided into several spaces, the representative value of the interference power to the protection point in each space is calculated for each secondary radio station, and the IAP or calculation of the secondary radio station that stops transmission is performed for each space. Note that the representative value to be calculated is not necessarily limited to the representative value of interference power, and may be any representative value of values obtained in the process of calculating the interference power such as a propagation loss and a coupling loss. Hereinafter, a case of calculating the representative value of the interference power will be described as an example as a whole.

Specifically, the following three methods can be considered. Furthermore, there are conceivable methods combining several methods including the following three methods.

Figure 33:
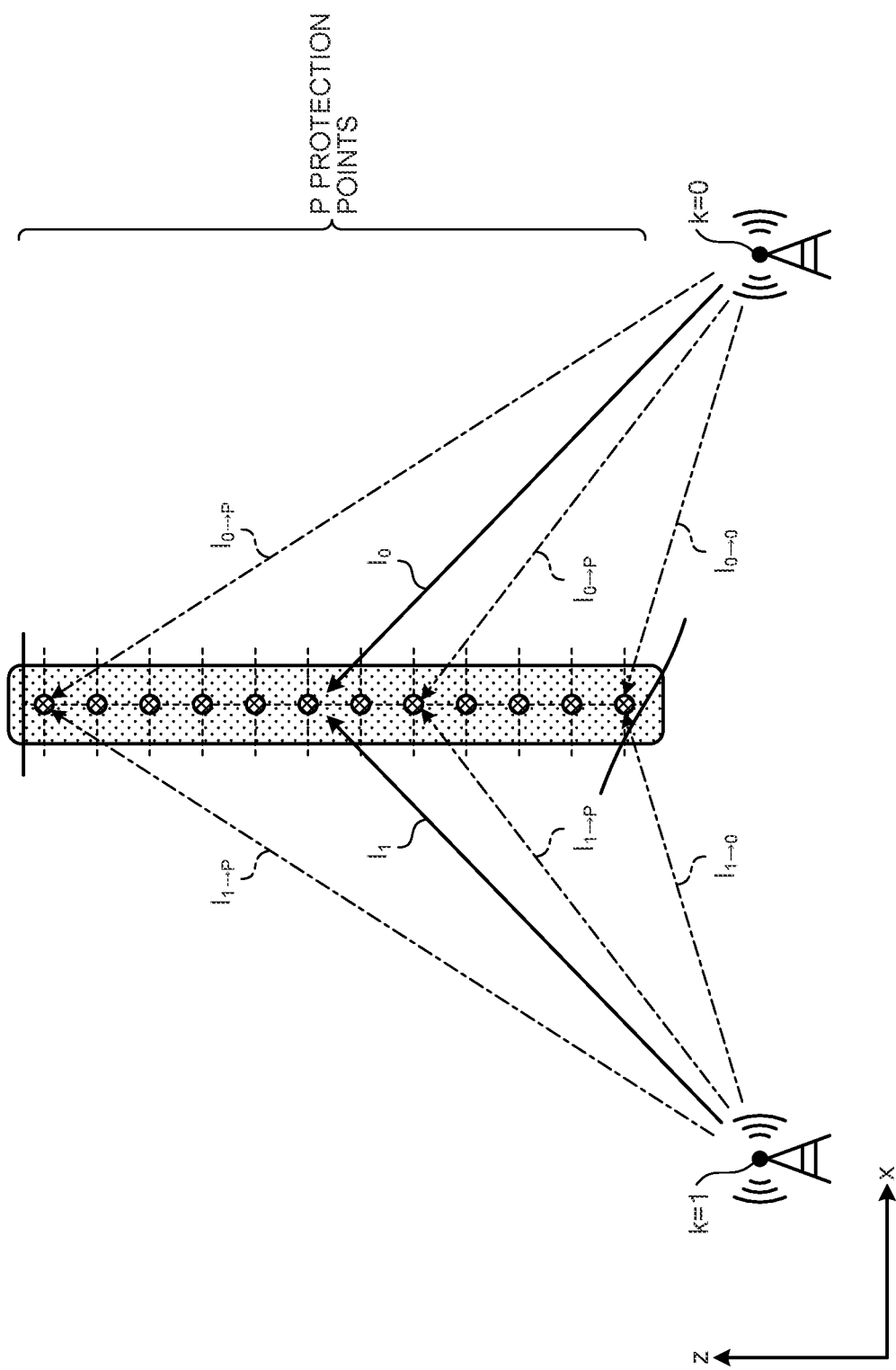
FIG. 33 is a diagram illustrating a method of calculating a representative value of interfering power.
Figure 34:
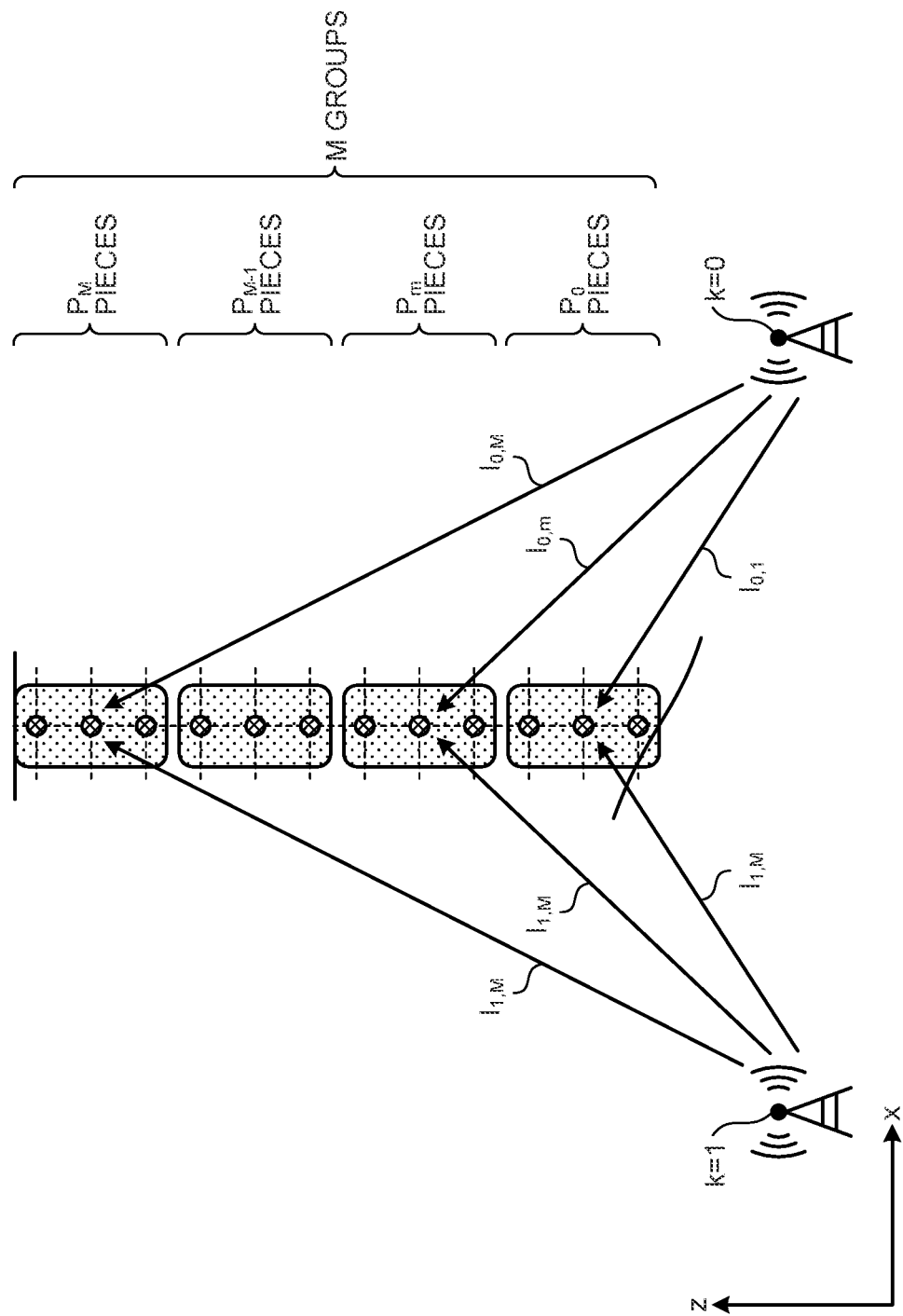
FIG. 34 is a diagram illustrating a method of calculating a representative value of interfering power.
Figure 35:
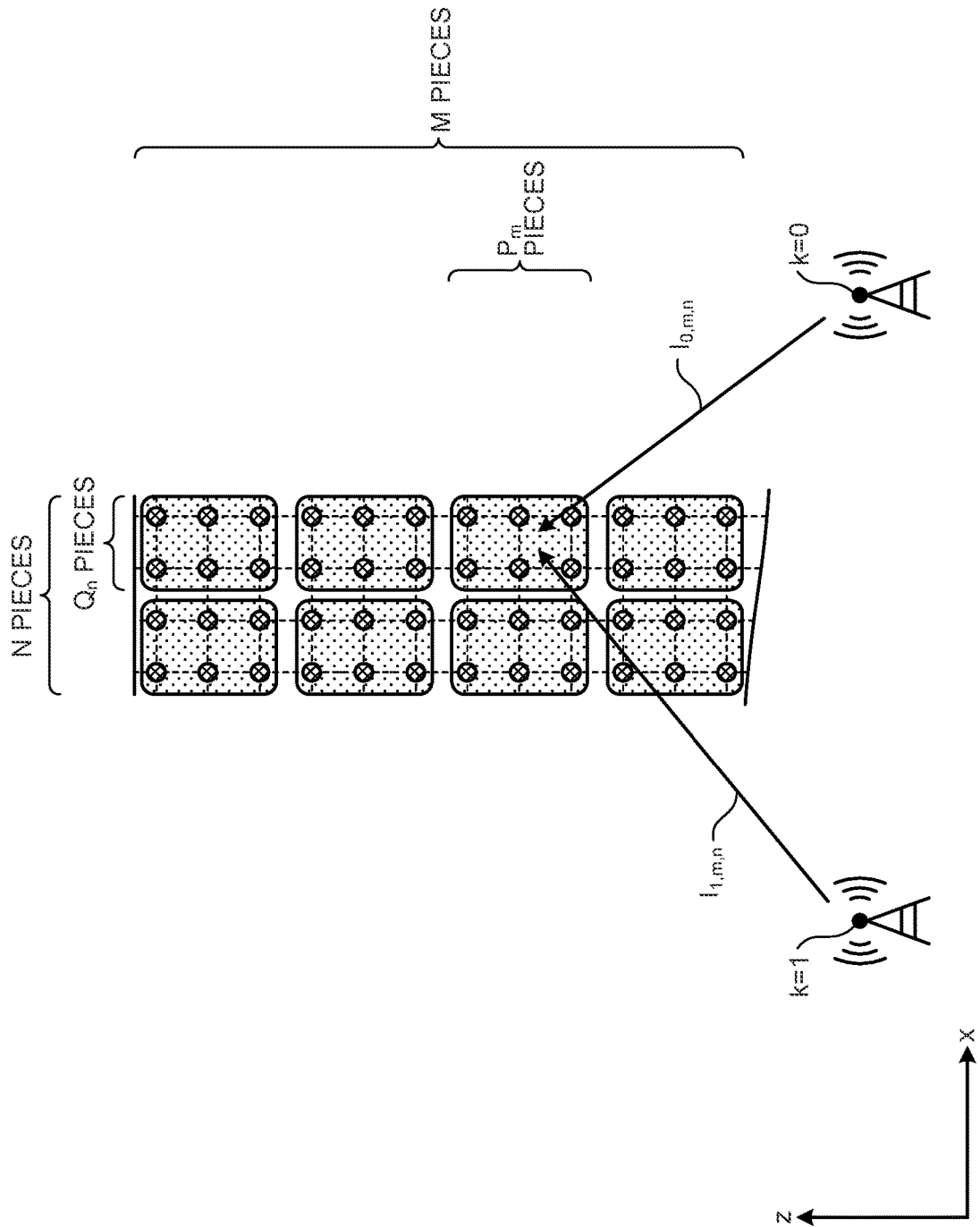
FIG. 35 is a diagram illustrating a method of calculating a representative value of interfering power.

(1) Method for calculating representative value in altitude direction (2) Method for calculating representative value in horizontal direction in addition to altitude direction (3) Method of extracting protection points based on magnitude of interference power and calculating representative value Hereinafter, a method of calculating the representative value of the interference power will be described with reference to FIGS. 33 to 35. FIGS. 33 to 35 are diagrams illustrating a method of calculating a representative value of the interfering power.

When the DPS is set, the processing may be performed separately for each DPS.

(1) Method for Calculating Representative Value in Altitude Direction

Here, the calculation of the representative value in the altitude direction indicates calculation in which, for example, the representative value is calculated in the z-axis when the spatial protection points are set in the orthogonal coordinate system, calculated in the r axis direction in the case of the polar coordinate system, and calculated in the elevation direction in the case of the geographic coordinate system. In a case where setting of different coordinate axes is used or in a case where another coordinate system is used, calculation of representative values may be naturally performed on other axes.

Note that these altitudes may be altitudes from the ground or may be sea levels. In addition, the height may be a relative altitude from a reference point obtained from heights of surrounding buildings, such as an average building height. The reference point may be an actual building height or an average building height within a certain range.

One method of calculating the representative value in the altitude direction is a method, as illustrated in FIG. 33, in which one representative value $I_k$ is calculated by performing data processing on interference power $I_{k \rightarrow p}$ from a certain secondary radio station k to P protection points p=0, 1, . . . , P, which have the same coordinates in the horizontal direction and are different only in height. For example, the average value of the interference power to all the protection points in the altitude direction may be set as the representative value of the coordinates in the horizontal direction. Similarly, the maximum value of the interference power to all the protection points in the altitude direction may be calculated and used as the representative value. Note that the method of the statistical processing is not limited only to the calculation of the average value or the maximum value.

In addition, as illustrated in FIG. 34, it is also allowable to calculate a representative value $I_{k,m}$ by dividing the protection points in the altitude direction into M groups (m=0, 1, . . . , M), and performing data processing on interference power $I_{k \rightarrow m,p}$ from a secondary radio station k to $P_m$ protection points (p=0, 1, . . . , Pm), which have the same coordinates in the horizontal direction and are different only in height in each group. For example, the average value of the interference power may be calculated in each range and used as the representative value. Similarly, the maximum value of the interference power may be calculated and used as the representative value. Note that the statistical processing method can include calculation of not only the average value but also the minimum value and other methods.

The interval of grouping may be changed according to the altitude or the surrounding environment (suburban, urban, cities, etc.). In addition, the interval does not have to be constant in the altitude direction, and may be set to a larger value with an increase in the altitude, for example.

(2) Method of Calculating Representative Value Including Horizontal Direction

The calculation of the representative value in the horizontal direction indicates here that, for example, the representative value is calculated in the xy-axis when the spatial protection points are set in the orthogonal coordinate system, calculated in the θΦ-axis direction in the case of the polar coordinate system, and calculated in the latitude/longitude directions in the case of the geographic coordinate system. In a case where setting of different coordinate axes is used or in a case where another coordinate system is used, calculation may be naturally performed on other axes.

For example, as illustrated in FIG. 35, even in the horizontal direction in addition to the altitude direction, it is also allowable to calculate a representative value $I_{k,m,n}$ by dividing the protection points into a plurality of (M×N) groups (m=0, 1, . . . , M, n=0, 1, . . . , N), and performing data processing on interference power $I_{k \rightarrow m,n,p,q}$ from the secondary radio station k to $P_m \times Q_n$ protection points (p=0, 1, . . . , $P_m$, q=0, 1, . . . , $Q_n$) existing in each group. For example, the average value of the interference power may be calculated in each range and used as the representative value. Similarly, the maximum value of the interference power may be calculated and used as the representative value. Note that the statistical processing method can include calculation of not only the average value but also the minimum value and other methods.

Incidentally, the protection points may be divided into a plurality of M×N×O groups (m=0, 1, . . . , M, n=0, 1, . . . , N, o=0, 1, . . . , O), and similar processing may be performed not only on the x-axis but also on the y-axis. The grouping is not necessarily have to be performed in the horizontal direction, and the representative value may be calculated in the entire horizontal direction after the grouping is performed only in the altitude direction.

The interval of grouping may be changed according to the altitude or the surrounding environment (suburban, urban, cities, etc.). In addition, the interval does not have to be constant in the altitude direction, and may be set to a larger value with an increase in the altitude, for example.

(3) Method of Extracting Protection Points Based on Magnitude of Interference Power and Calculating Representative Value In addition, a protection point may be extracted from a certain space based on the magnitude of the interference power from the secondary radio station, and the result of data processing performed only on the interference power to the extracted protection point may be defined as the representative value of the interference power in the space.

Data processing includes calculation of an average value or a median. In addition, as a criterion for extracting a protection point with large interference, for example, it is conceivable to extract a protection point at which interference power is a preset threshold or more or extract only a protection point within a line-of-sight. Note that these criteria need not be constant, and may be changed depending on the surrounding environment or the like.

A protection point having large interference may be extracted for all protection points set in the moving range of a certain aerial communication device, and data processing may be performed on the interference power to obtain a value to be the representative value of the interference power from a certain secondary radio station to all protection points.

In addition, a protection point having a large interference power may be extracted among protection points having the same coordinates in the horizontal direction and different only in height to calculate a representative value of the interference power from a certain secondary radio station. Furthermore, the protection points having the same coordinate in the horizontal direction and different only in height may be divided into several groups to calculate the representative value in each group.

Furthermore, grouping may be performed in the horizontal direction in addition to the altitude direction, and a protection point having large interference among the grouping may be extracted to calculate the representative value.

Note that the communication control device 130 may calculate the representative value from the interference power for each of a predetermined number of target protection points, or may directly use the interference power calculated for the representative protection point as the representative value.

In addition, such data processing does not need to be performed on all the protection points set in the moving range of a certain aerial communication device, and in some cases, interference margin allocation may be performed as usual on some protection points. For example, in a case where it is difficult to reliably protect the primary system or in a case where many secondary radio stations cannot be used due to the omission of calculation, the interference margin allocation may be performed as usual according to the calculation capability of the communication control device.

5. MODIFICATION

The communication control device 130 of the present embodiment is not limited to the device described in the above-described embodiment. For example, the communication control device 130 may be a device having a function other than controlling the communication device 110 that performs secondary use of a frequency band in which spectrum sharing is performed. For example, the function of the communication control device 130 of the present embodiment may be provided in a network manager. At this time, the network manager may be, for example, a centralized base band unit (C-BBU) having a network configuration referred to as a centralized radio access network (C-RAN) or a device including the C-BBU. Furthermore, the function of the network manager may be provided in a base station (including an access point). These devices (such as a network manager) can also be regarded as communication control devices.

Furthermore, in the above-described embodiment, the communication control device 130 is a device belonging to the communication network system 100, but does not necessarily have to be a device belonging to the communication network system 100. The communication control device 130 may be a device outside the communication network system 100. The communication control device 130 may indirectly control the communication device 110 via a device constituting the communication network system 100 rather than directly controlling the communication device 110. In addition, there may be a plurality of secondary systems (communication network systems 100). At this time, the communication control device 130 may manage the plurality of secondary systems. In this case, each of the secondary systems can be regarded as the second radio system.

As general naming in spectrum sharing, an incumbent system using a target band is referred to as a primary system, and a secondary user is referred to as a secondary system. However, the primary system and the secondary system may be each replaced with different terms. A macro cell in a Heterogeneous Network (HetNET) may be defined as the primary system, and a small cell or a relay station may be defined as the secondary system. In addition, a base station may be defined as the primary system, and relay user equipment (Relay UE) or vehicle user equipment (Vehicle UE) that implements D2D or vehicle-to-everything (V2X) existing in the coverage may be defined as the secondary system. The base station is not limited to a fixed type, and may be a portable/mobile type.

Furthermore, the interface between the entities may be either wired or wireless. For example, the interface between the entities (communication device, communication control device, or terminal device) described in the present embodiment may be a wireless interface that does not depend on spectrum sharing. Examples of the wireless interface that does not depend on spectrum sharing include a wireless communication line provided by a mobile communication carrier (network operator) via a licensed band, and wireless LAN communication using an incumbent license-exempt band.

The control device that controls the terminal device 120, the communication device 110, the intermediate device 110C, or the communication control device 130 according to the present embodiment may be implemented by a dedicated computer system or a general-purpose computer system.

For example, a program for executing the above-described operations is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be a device (for example, a personal computer) outside the terminal device 120, communication device 110, the intermediate device 110C, or the communication control device 130. Furthermore, the control device may be the device (for example, the control unit 124, the control unit 114, the control unit 114c, or the control unit 134) inside the terminal device 120, the communication device 110, the intermediate device 110C, or the communication control device 130.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processing described in the above embodiments, all or a part of the processing described as being performed automatically may be manually performed, or the processing described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the sequence diagram or the flowchart of the present embodiment can be changed as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (components), or the like), and whether all the components are in the same housing would not be a big issue. For example, a plurality of devices housed in separate housings and connected via a network or the like, and one device in which a plurality of modules is housed in one housing, are both systems.

Furthermore, for example, the present embodiment can adopt a configuration of cloud computing in which one function is cooperatively shared and processed by a plurality of devices via a network.

6. CONCLUSION

As described above, according to an embodiment of the present disclosure, the communication control device 130 includes: the setting unit 1341 that sets a plurality of protection points in a protective space that protects a first radio system from a second radio system that performs shared use of the radio wave used by the first radio system; the determination unit 1342 that determines a target protection point to be a calculation target of the interference power received from the second radio system based on the plurality of protection points set by the setting unit 1341; the interference power calculation unit 1344 that calculates a representative value of the interference power based on the interference power calculated for the target protection point determined by the determination unit 1342; and the allowable power calculation unit 1345 that calculates the allowable power indicating the allowable interference power at the target protection point based on the representative value of the interference power calculated by the interference power calculation unit 1344. This configuration makes it possible to reduce the calculation volume while ensuring the protection accuracy of the primary system.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technique can also have the following configurations.

(1) A communication control device comprising:
  a setting unit that sets a plurality of protection points in a protective space that protects a first radio system from a second radio system that performs shared use of a radio wave used by the first radio system;
  a determination unit that determines a target protection point to be a calculation target of interference power received from the second radio system based on the plurality of protection points set by the setting unit;
  an interference power calculation unit that calculates a representative value of the interference power based on the interference power calculated for the target protection point determined by the determination unit; and
  an allowable power calculation unit that calculates allowable power indicating allowable interference power at the target protection point based on the representative value of the interference power calculated by the interference power calculation unit.

(2) The communication control device according to the above-described (1),
  wherein the setting unit
  arranges the plurality of protection points individually in an altitude direction and a horizontal direction, and
  the determination unit
  determines the protection point selected from among the plurality of protection points based on a predetermined selection condition, as the target protection point.

(3) The communication control device according to the above-described (2),
  wherein the determination unit
  selects the protection point to be the target protection point from among the protection points arranged in the altitude direction at each position in the horizontal direction.

(4) The communication control device according to the above-described (3),
  wherein the determination unit
  groups the protection points arranged in the altitude direction for each predetermined number at each position in the horizontal direction, and selects the protection point to be the target protection point for each group.

(5) The communication control device according to the above-described (2) to (4),
  wherein the determination unit
  determines the target protection point such that an interval in the altitude direction becomes longer with an increase in the altitude.

(6) The communication control device according to the above-described (5),
  wherein the determination unit
  determines the target protection point such that an interval in the horizontal direction becomes longer with an increase in the altitude and an increase in a distance in the horizontal direction.

(7) The communication control device according to the above-described (2) to (6),
  wherein the determination unit
  determines the protection point selected at a predetermined number of intervals as the target protection point such that none of the protection points exists to be adjacent to each other at a shortest distance in each of the altitude direction and the horizontal direction.

(8) The communication control device according to the above-described (2) to (7),
  wherein the determination unit
  determines the protection points having a number corresponding to accuracy required for protection of the first radio system, as the target protection points.

(9) The communication control device according to the above-described (2) to (8),
  wherein the determination unit
  determines the protection point selected based on an existence probability of the first radio system in the protective space, as the target protection point.

(10) The communication control device according to the above-described (9),
  wherein the determination unit
  calculates the existence probability based on at least one piece of information out of: a building height around the protective space; flight altitude of the first radio system; and a past moving route of the first radio system.

(11) The communication control device according to the above-described (1) to (10),
  wherein the determination unit
  generates a representative protection point for each of a predetermined number of the protection points based on the plurality of protection points set by the setting unit, and determines the generated representative protection point as the target protection point.

(12) The communication control device according to the above-described (1) to (11),
wherein the setting unit
sets the plurality of protection points at intervals according to an altitude.

(13) The communication control device according to the above-described (1) to (12),
wherein the setting unit
sets the plurality of protection points at intervals according to a surrounding environment of the protective space.

(14) The communication control device according to the above-described (1) to (13),
wherein the setting unit
sets the protection point based on a range of a distance in an altitude direction in the protective space.

(15) The communication control device according to the above-described (14),
wherein the setting unit
divides the distance in the altitude direction in the protective space into a plurality of ranges at predetermined intervals, and sets the protection point for each of the divided ranges.

(16) The communication control device according to the above-described (1) to (15), further comprising
a selection unit that selects, among predetermined calculation methods for calculating the interference power, the calculation method based on at least one of a distance from the target protection point to the second radio system and a propagation path,
wherein the interference power calculation unit calculates the interference power by using the calculation method selected by the selection unit.

(17) The communication control device according to the above-described (16),
wherein the selection unit
selects the calculation method for each target protection point.

(18) The communication control device according to the above-described (16) to (17),
wherein the selection unit
selects the calculation method selected at the protection point being a specific point, as the calculation method at another one of the target protection point.

(19) The communication control device according to the above-described (1) to (18),
wherein the setting unit
estimates a moving range of the first radio system based on information acquired from a communication counterpart in the first radio system, and sets the protective space based on the estimated moving range.

(20) A communication control method comprising:
setting a plurality of protection points in a protective space that protects a first radio system from a second radio system that performs shared use of a radio wave used by the first radio system;
determining a target protection point to be a calculation target of interference power received from the second radio system based on the plurality of protection points that have been set;
calculating a representative value of the interference power based on the interference power calculated for the target protection point that has been determined; and
calculating allowable power indicating allowable interference power at the target protection point based on the representative value of the interference power that has been calculated.

REFERENCE SIGNS LIST

100 COMMUNICATION NETWORK SYSTEM
110 COMMUNICATION DEVICE
110C INTERMEDIATE DEVICE
120 TERMINAL DEVICE
130 COMMUNICATION CONTROL DEVICE
1341 SETTING UNIT
1342 DETERMINATION UNIT
1343 SELECTION UNIT
1344 INTERFERENCE POWER CALCULATION UNIT
1345 ALLOWABLE POWER CALCULATION UNIT

The invention claimed is:

1. A communication control device, comprising:
a setting unit configured to set a plurality of protection points in a protective space that protects a first radio system from a second radio system that performs shared use of a radio wave used by the first radio system;
a determination unit configured to determine a target protection point to be a calculation target of interference power received from the second radio system based on the plurality of protection points set by the setting unit;
an interference power calculation unit configured to calculate a representative value of the interference power based on the interference power calculated for the target protection point determined by the determination unit; and
an allowable power calculation unit configured to calculate allowable power indicating allowable interference power at the target protection point based on the representative value of the interference power calculated by the interference power calculation unit.

2. The communication control device according to claim 1, wherein
the setting unit is further configured to arrange the plurality of protection points individually in an altitude direction and a horizontal direction, and
the determination unit is further configured to determine the protection point selected from among the plurality of protection points based on a selection condition, as the target protection point.

3. The communication control device according to claim 2, wherein the determination unit is further configured to select the protection point to be the target protection point from among the protection points arranged in the altitude direction at each position in the horizontal direction.

4. The communication control device according to claim 3, wherein the determination unit is further configured to:
group the protection points arranged in the altitude direction for each number at each position in the horizontal direction, and
select the protection point to be the target protection point for each group.

5. The communication control device according to claim 2, wherein the determination unit is further configured to determine the target protection point such that an interval in the altitude direction becomes longer with an increase in an altitude.

6. The communication control device according to claim 5, wherein the determination unit is further configured to determine the target protection point such that an interval in the horizontal direction becomes longer with an increase in the altitude and an increase in a distance in the horizontal direction.

7. The communication control device according to claim 2, wherein the determination unit is further configured to determine the protection point selected at a number of intervals as the target protection point such that none of the protection points exists to be adjacent to each other at a shortest distance in each of the altitude direction and the horizontal direction.

8. The communication control device according to claim 2, wherein the determination unit is further configured to determine the protection points having a number corresponding to accuracy required for protection of the first radio system, as target protection points.

9. The communication control device according to claim 2, wherein the determination unit is further configured to determine the protection point selected based on an existence probability of the first radio system in the protective space, as the target protection point.

10. The communication control device according to claim 9, wherein the determination unit is further configured to calculate the existence probability based on at least one piece of information out of: a building height around the protective space; flight altitude of the first radio system; and a past moving route of the first radio system.

11. The communication control device according to claim 1, wherein the determination unit is further configured to:
generate a representative protection point for each of a predetermined number of the protection points based on the plurality of protection points set by the setting unit; and
determine the generated representative protection point as the target protection point.

12. The communication control device according to claim 1, wherein the setting unit is further configured to set the plurality of protection points at intervals according to an altitude.

13. The communication control device according to claim 1, wherein the setting unit is further configured to set the plurality of protection points at intervals according to a surrounding environment of the protective space.

14. The communication control device according to claim 1, wherein the setting unit is further configured to set the protection point based on a range of a distance in an altitude direction in the protective space.

15. The communication control device according to claim 14, wherein the setting unit is further configured to:
divide the distance in the altitude direction in the protective space into a plurality of ranges at specific intervals; and
set the protection point for each of the divided ranges.

16. The communication control device according to claim 1, further comprising
a selection unit configured to select, among a plurality of calculation methods to calculate the interference power, a calculation method based on at least one of a distance from the target protection point to the second radio system and a propagation path, wherein the interference power calculation unit is further configured to calculate the interference power by using the calculation method selected by the selection unit.

17. The communication control device according to claim 16, wherein the selection unit is further configured to select the calculation method for each of target protection points.

18. The communication control device according to claim 16, wherein the selection unit is further configured to select the calculation method selected at the protection point being a specific point, as the calculation method at another one of the target protection point.

19. The communication control device according to claim 1, wherein the setting unit is further configured to:
estimate a moving range of the first radio system based on information acquired from a communication counterpart in the first radio system, and
set the protective space based on the estimated moving range.

20. A communication control method, comprising:
setting a plurality of protection points in a protective space that protects a first radio system from a second radio system that performs shared use of a radio wave used by the first radio system;
determining a target protection point to be a calculation target of interference power received from the second radio system based on the plurality of protection points that have been set;
calculating a representative value of the interference power based on the interference power calculated for the target protection point that has been determined; and
calculating allowable power indicating allowable interference power at the target protection point based on the representative value of the interference power that has been calculated.

* * * * *